Jan. 9, 1923.                                                                 1,441,469
                              W. WILKINS.
       MEANS FOR PRODUCING OR REPRODUCING DESIGNS, LETTERPRESS, ETC.
                          FILED MAR. 2, 1921.                22 SHEETS-SHEET 1
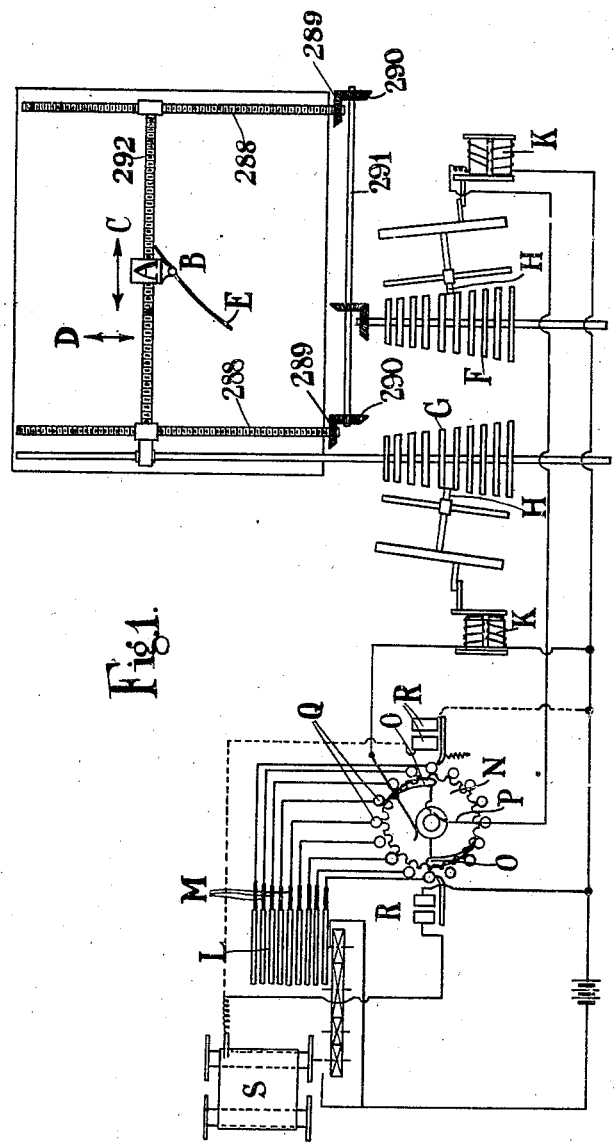
INVENTOR
W. Wilkins,
BY Marks & Clerk
ATTORNEYS

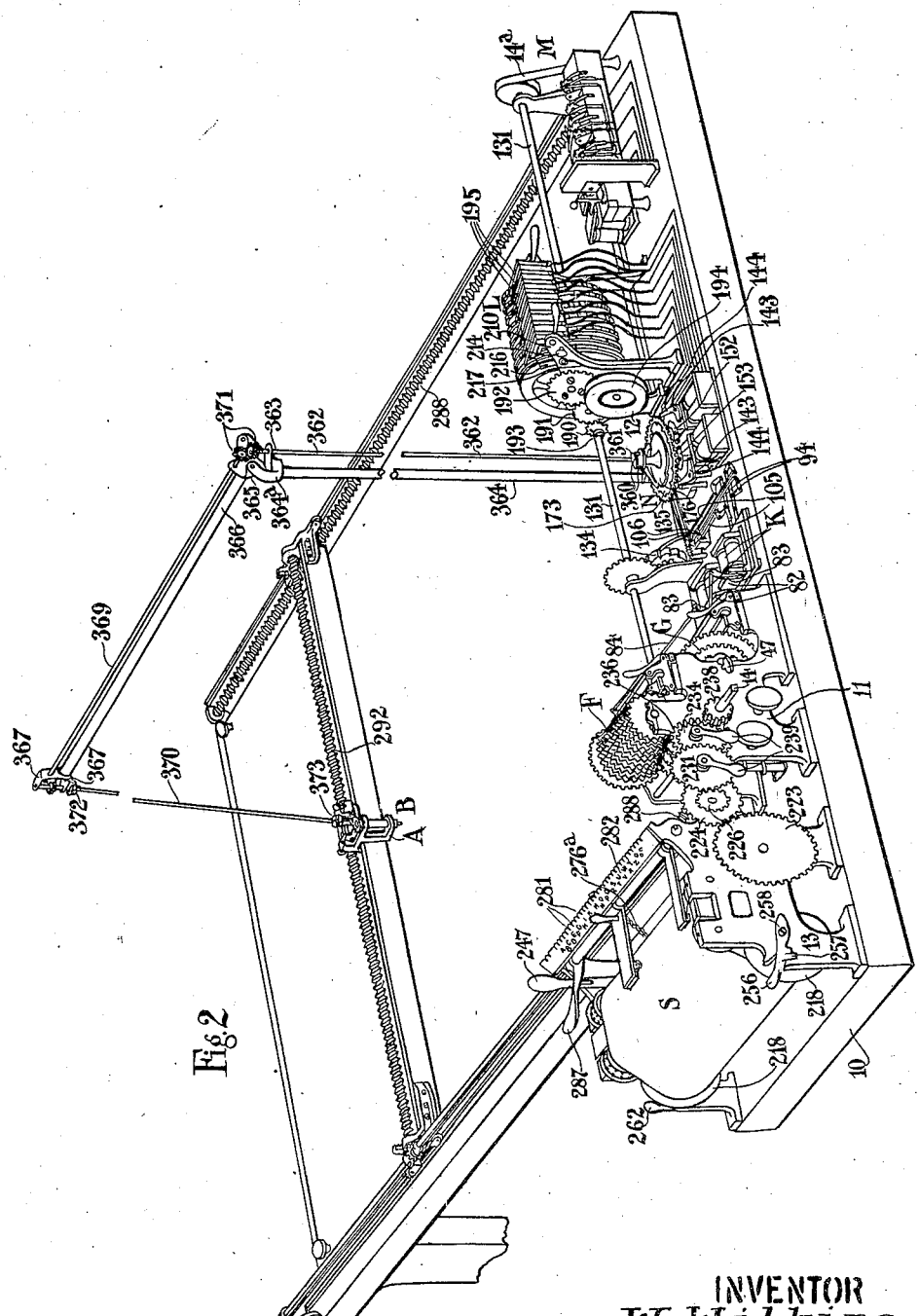

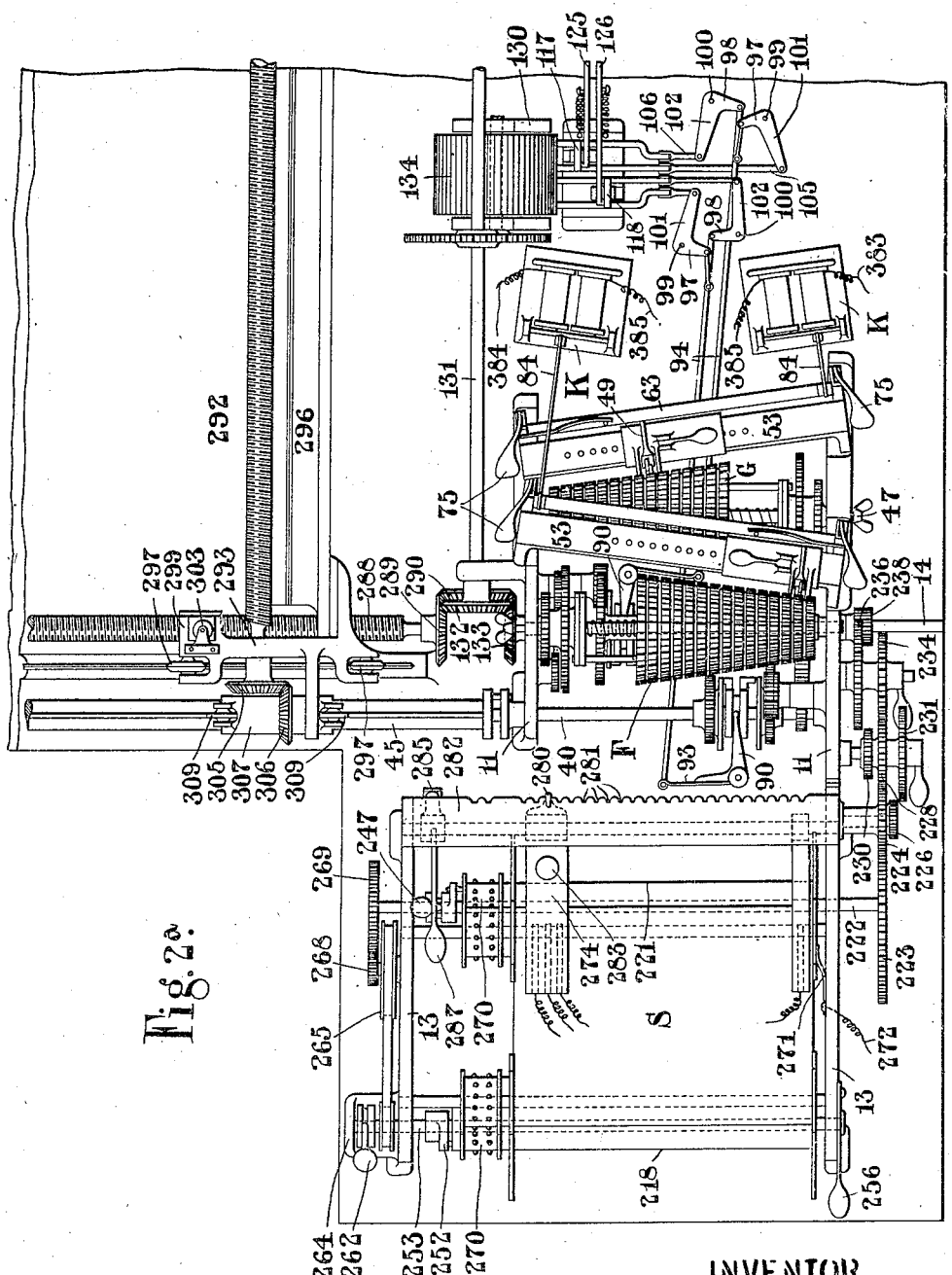

Jan. 9, 1923.

W. WILKINS.

MEANS FOR PRODUCING OR REPRODUCING DESIGNS, LETTERPRESS, ETC.
FILED MAR. 2, 1921.

INVENTOR
W. Wilkins
BY Marks&Clerk
ATTORNEYS

Jan. 9, 1923.
W. WILKINS.
MEANS FOR PRODUCING OR REPRODUCING DESIGNS, LETTERPRESS, ETC.
FILED MAR. 2, 1921.
1,441,469
22 SHEETS-SHEET 5
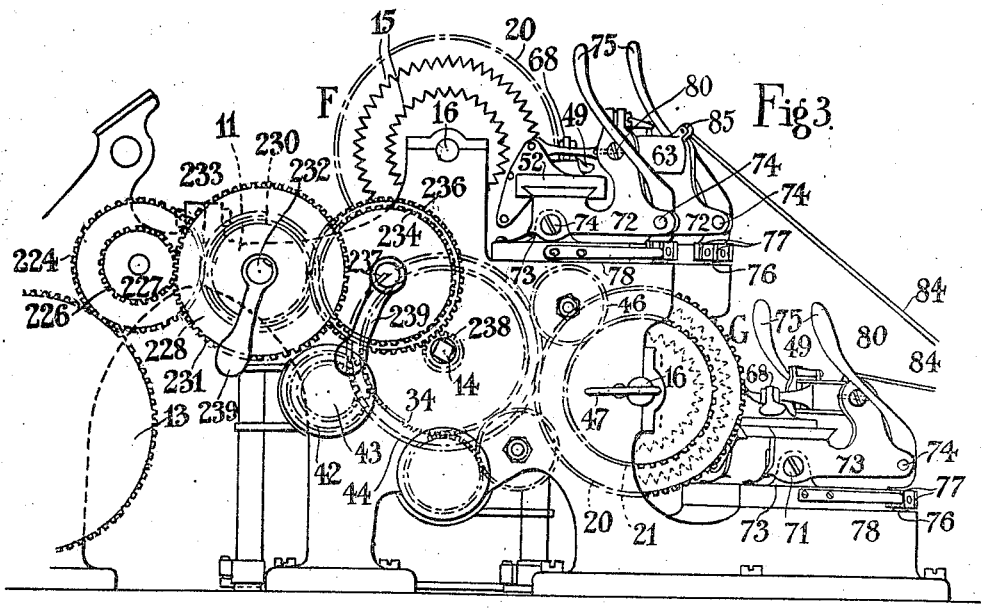
INVENTOR
W. Wilkins,
BY Marks & Clerk
ATTORNEYS

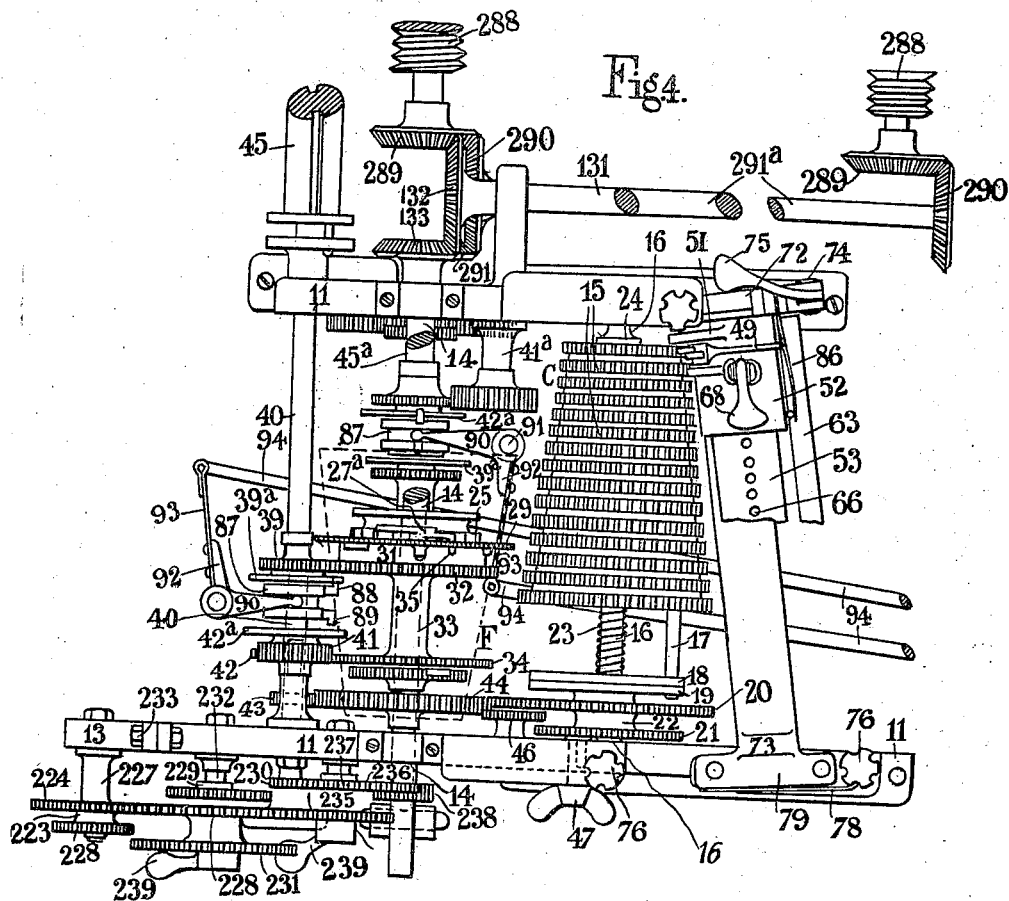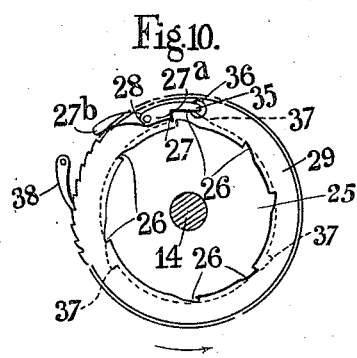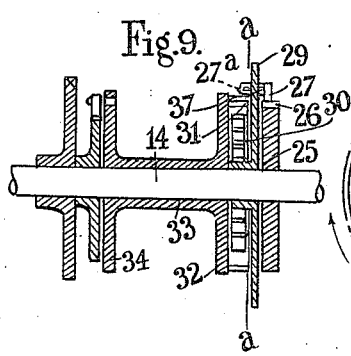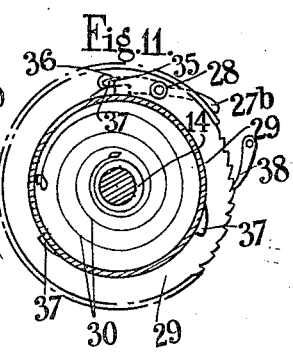

Jan. 9, 1923. 1,441,469
W. WILKINS.
MEANS FOR PRODUCING OR REPRODUCING DESIGNS, LETTERPRESS, ETC.
FILED MAR. 2, 1921. 22 SHEETS-SHEET 8
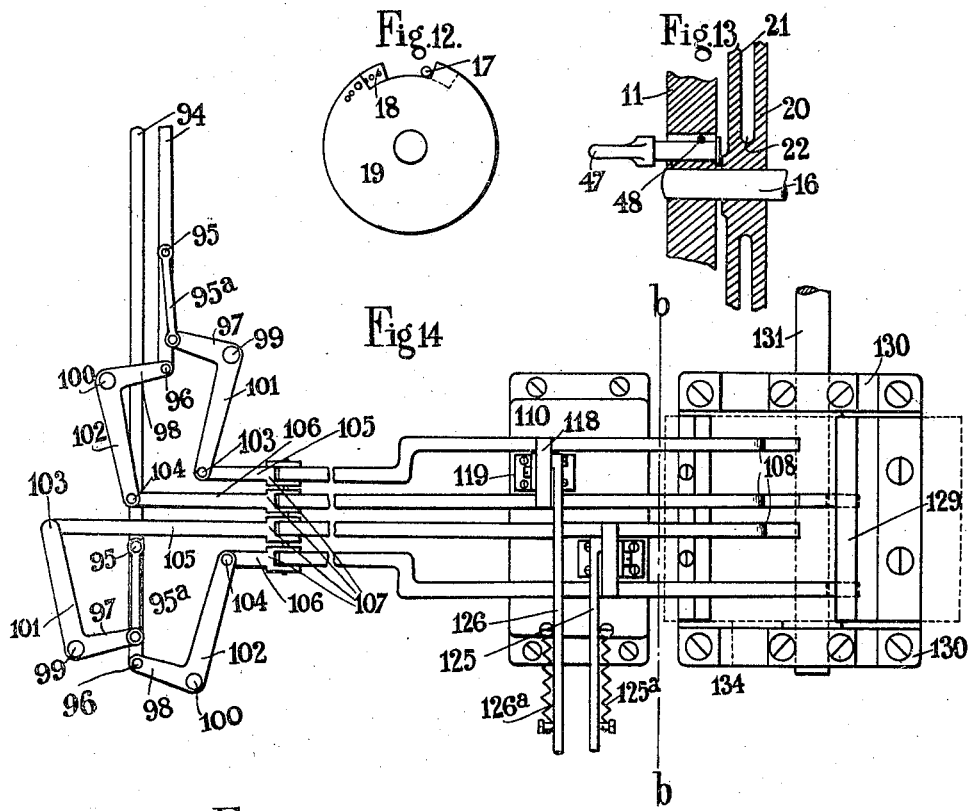
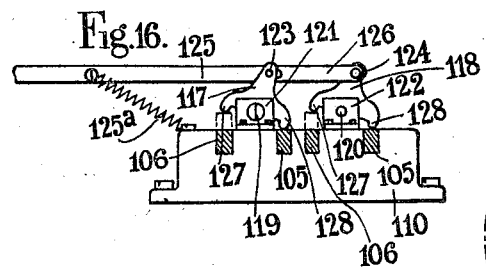
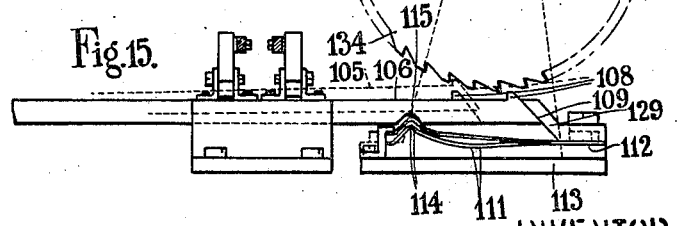
INVENTOR
BY W. Wilkins
ATTORNEYS Jan. 9, 1923.
W. WILKINS.
MEANS FOR PRODUCING OR REPRODUCING DESIGNS, LETTERPRESS, ETC.
FILED MAR. 2, 1921.
1,441,469
22 SHEETS-SHEET 9
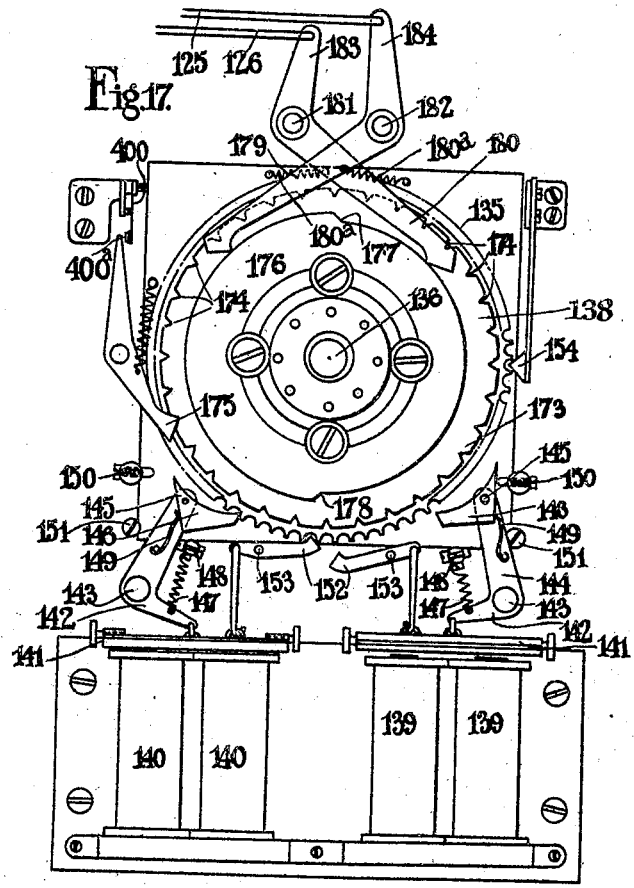
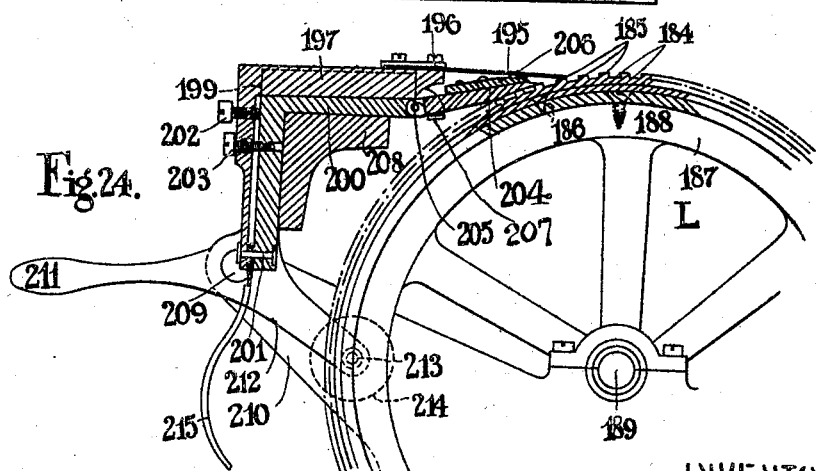
INVENTOR
W. Wilkins,
BY Marks & Clerk
ATTORNEYS Jan. 9, 1923.
W. WILKINS.
MEANS FOR PRODUCING OR REPRODUCING DESIGNS, LETTERPRESS, ETC.
FILED MAR. 2, 1921.
1,441,469
22 SHEETS-SHEET 10
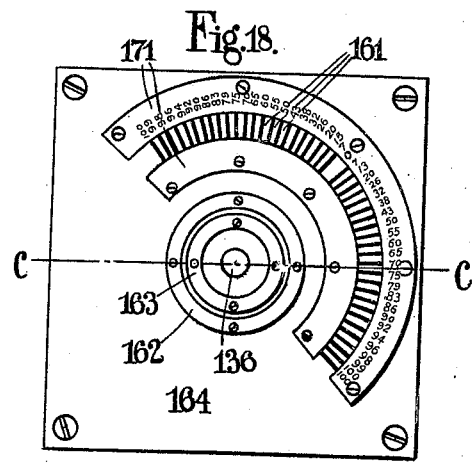
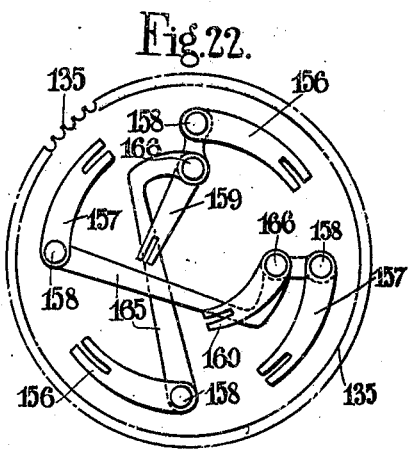
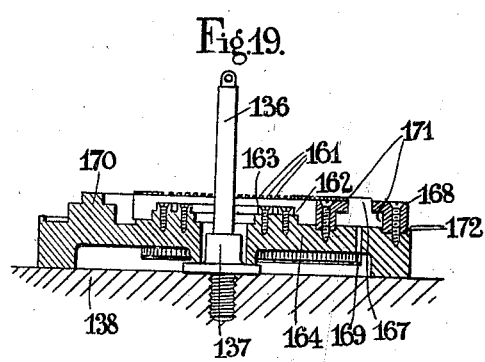
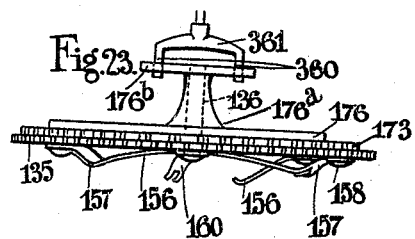
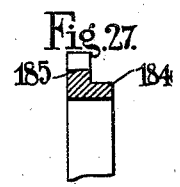
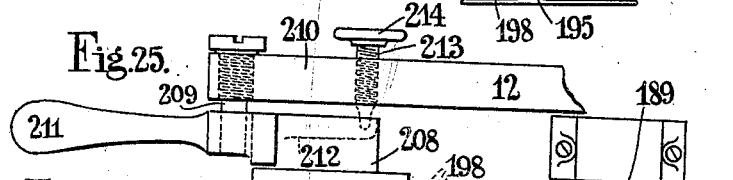
INVENTOR
W. Wilkins,
BY Market Clerk
ATTORNEYS Jan. 9, 1923.
W. WILKINS.
MEANS FOR PRODUCING OR REPRODUCING DESIGNS, LETTERPRESS, ETC.
FILED MAR. 2, 1921.
1,441,469
22 SHEETS-SHEET 11
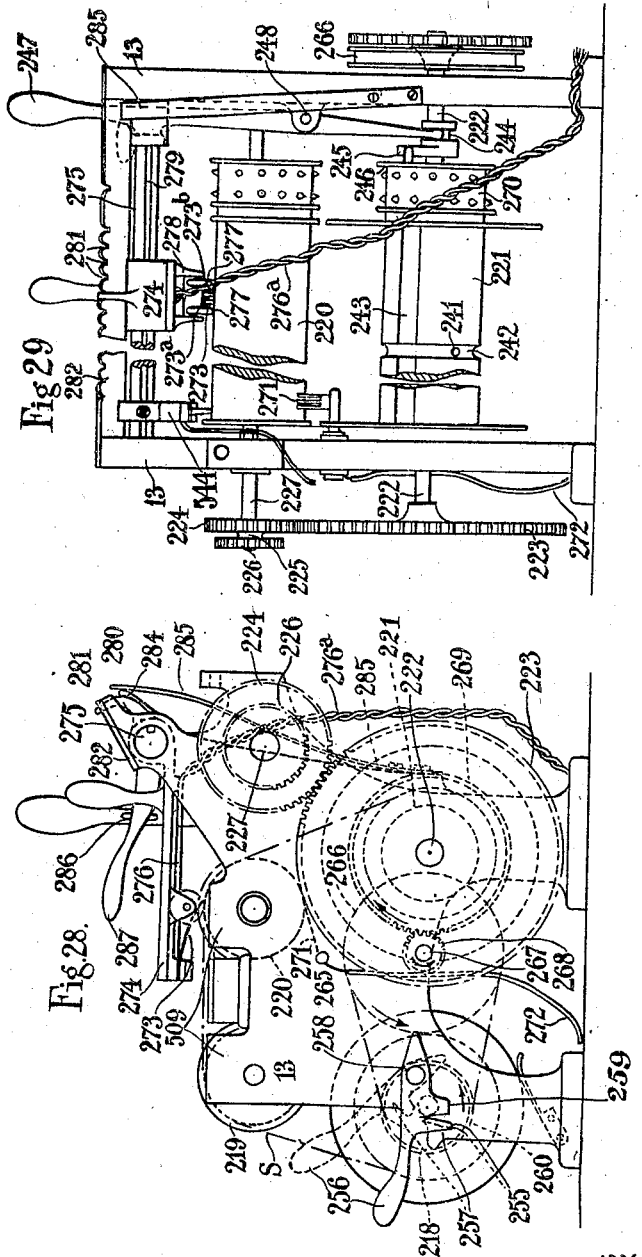
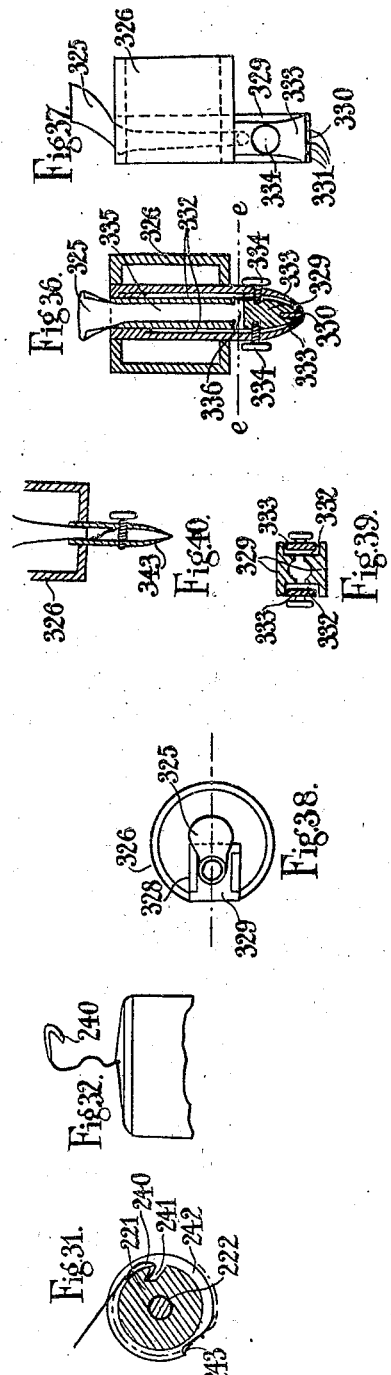

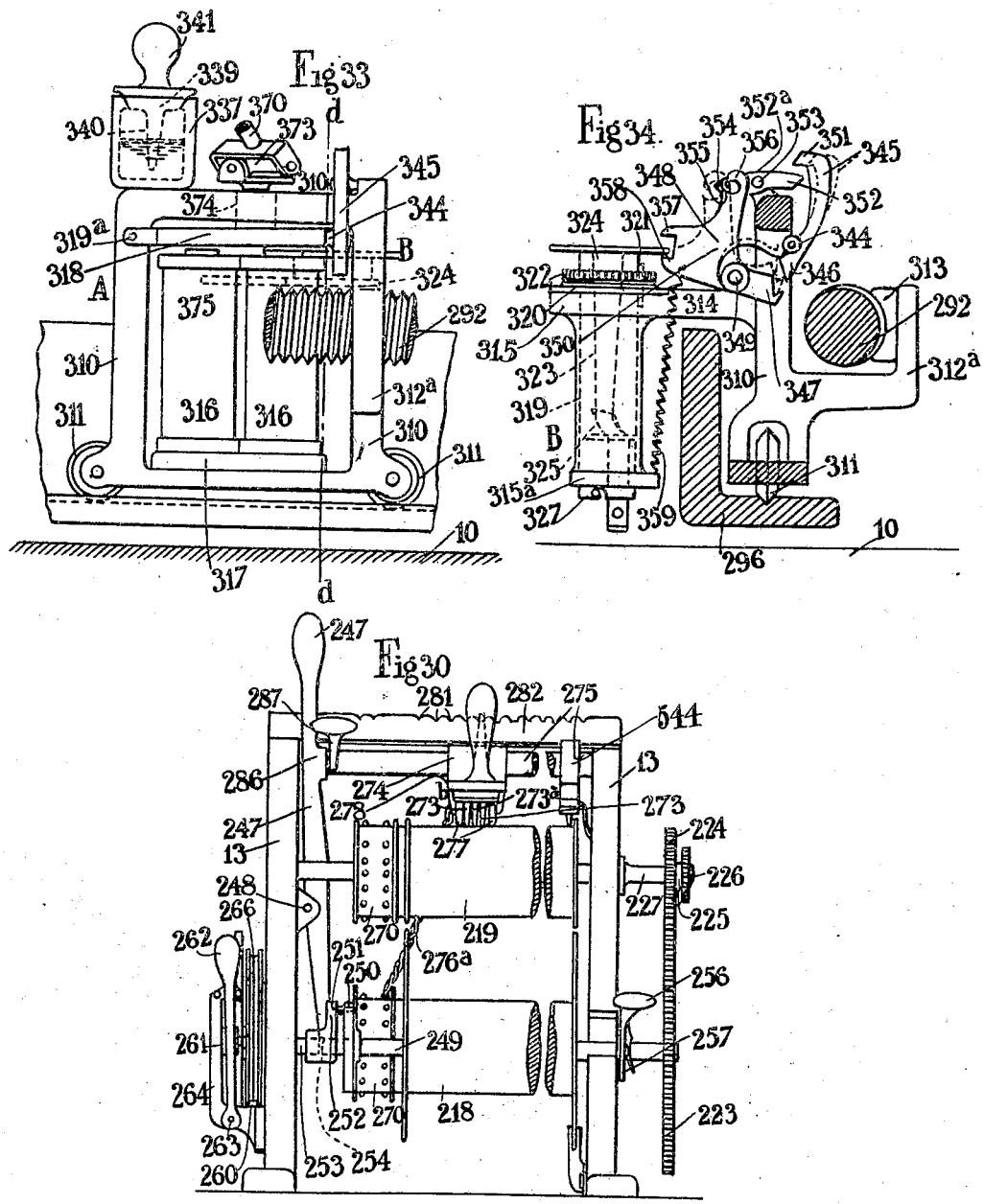

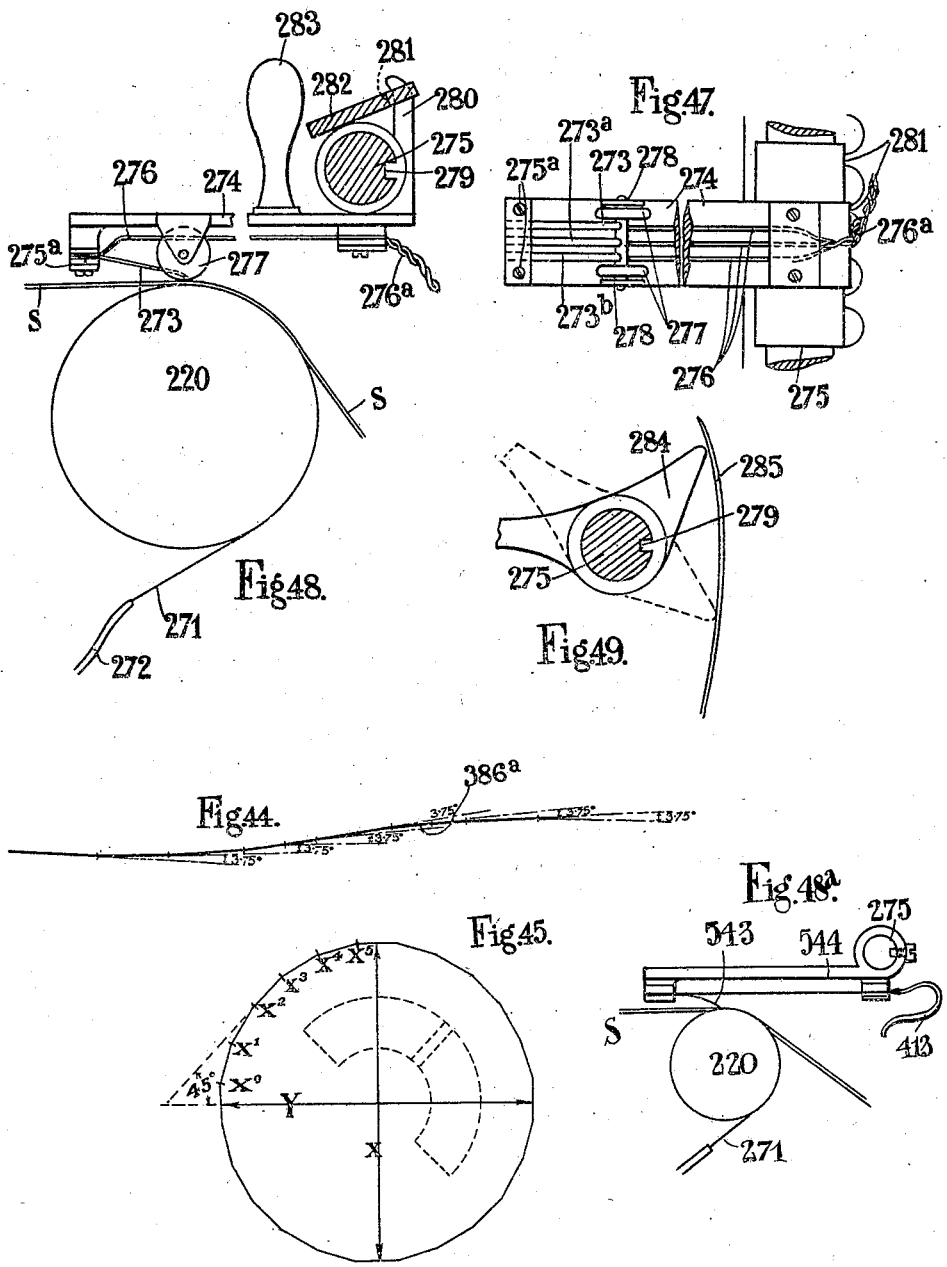

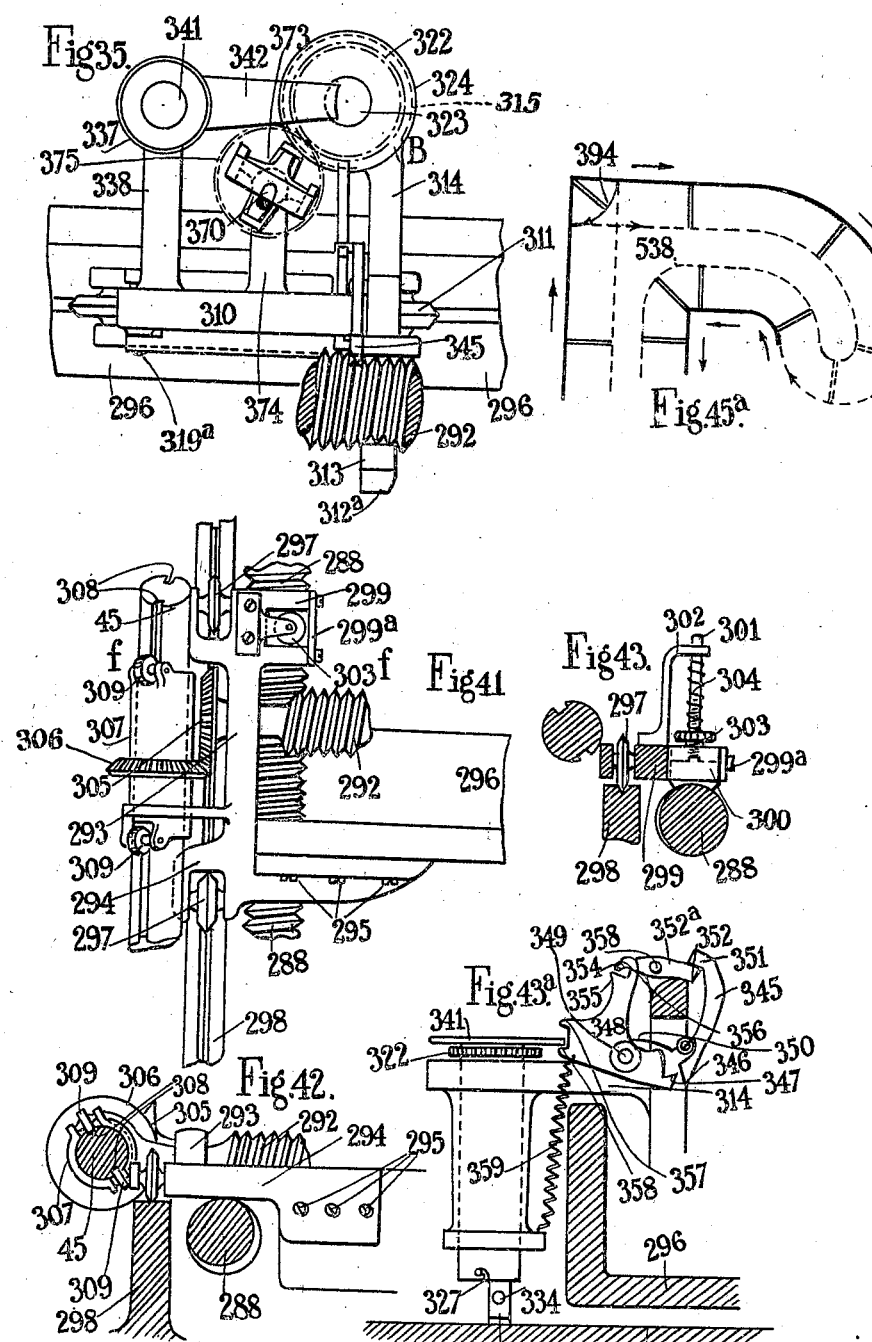

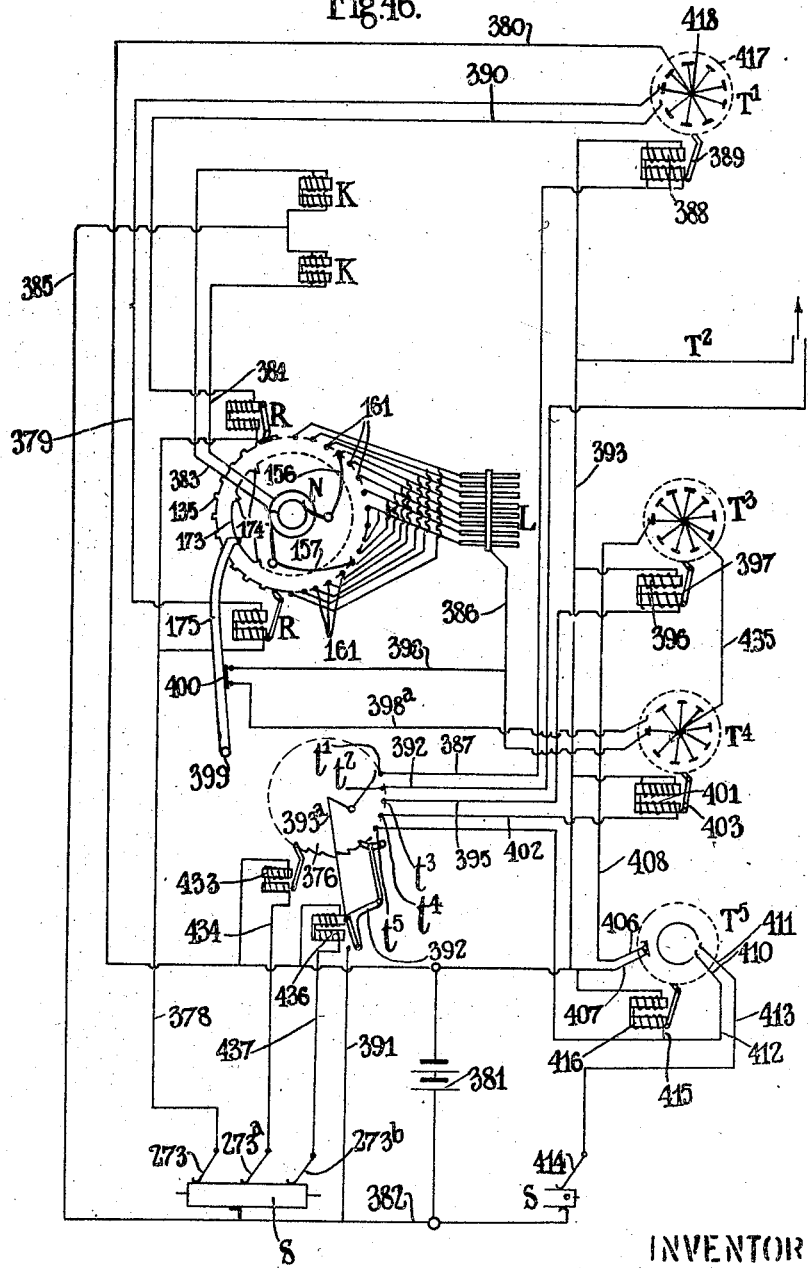

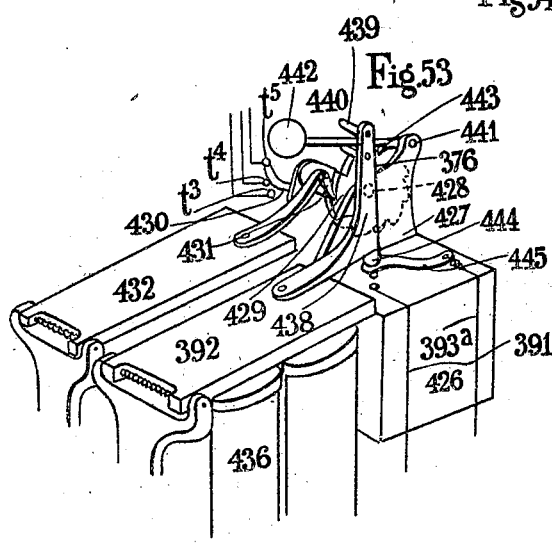
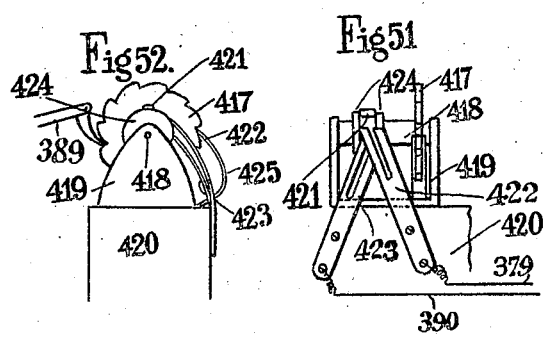
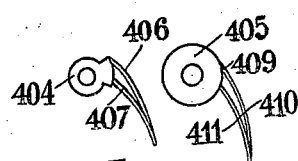

Jan. 9, 1923. 1,441,469
W. WILKINS.
MEANS FOR PRODUCING OR REPRODUCING DESIGNS, LETTERPRESS, ETC.
FILED MAR. 2, 1921. 22 SHEETS-SHEET 17
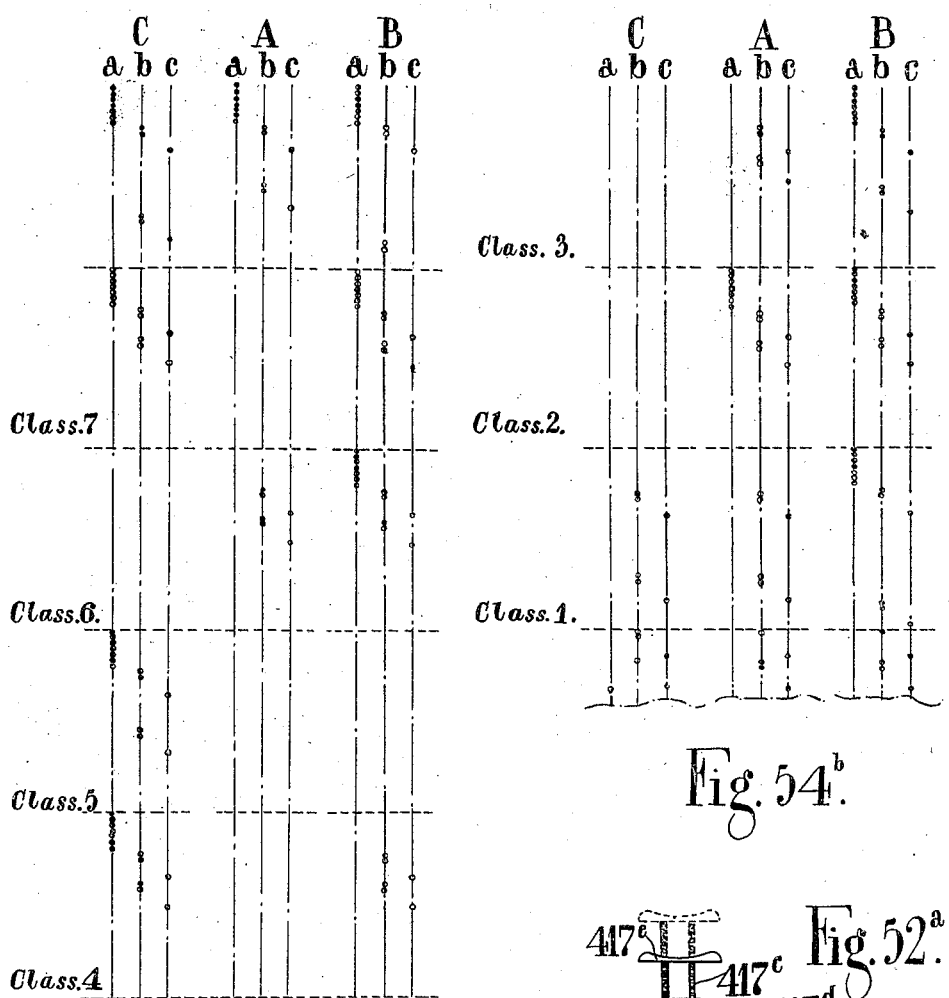
Fig. 54ᵃ.
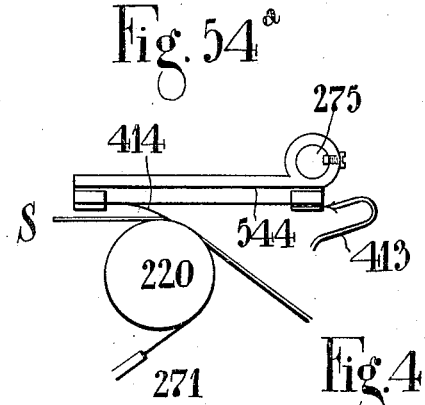
Fig. 48ᵃ
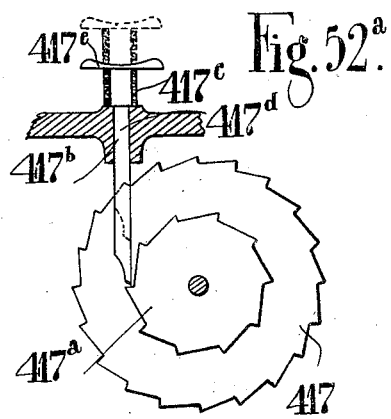
INVENTOR
W. Wilkins,
BY Marks&Clark
ATTORNEYS

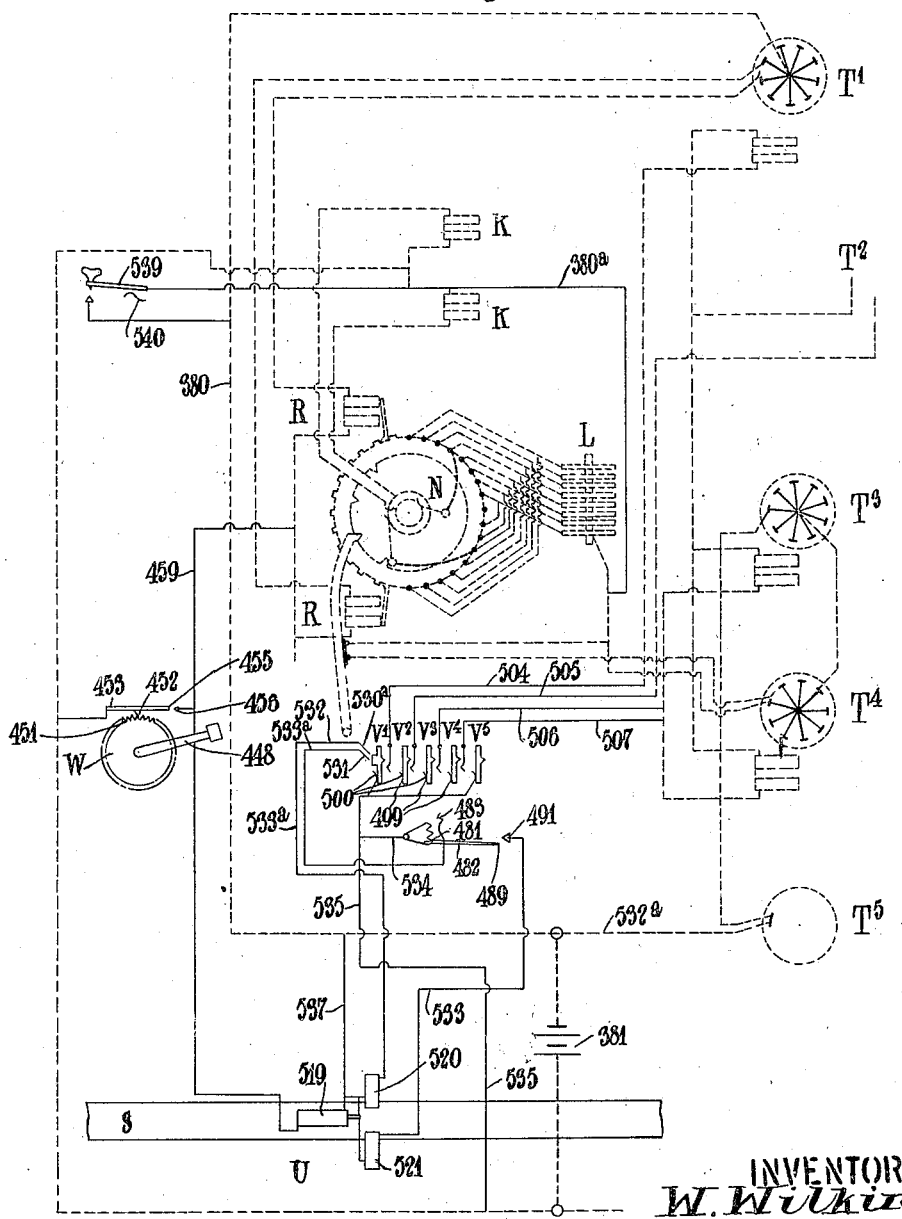

Jan. 9, 1923. 1,441,469
W. WILKINS.
Means for Producing or Reproducing Designs, Letterpress, Etc.
Filed Mar. 2, 1921. 22 sheets-sheet 19
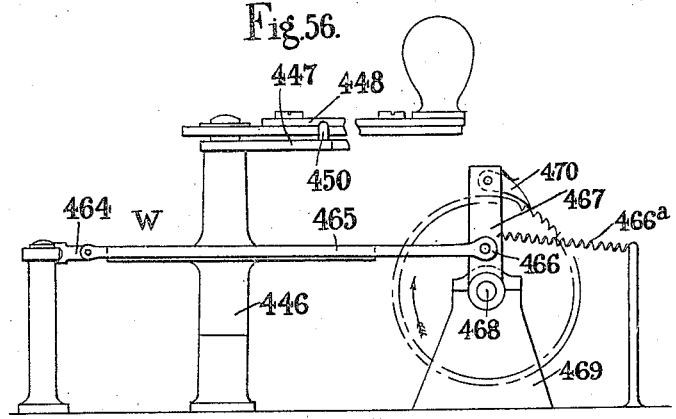
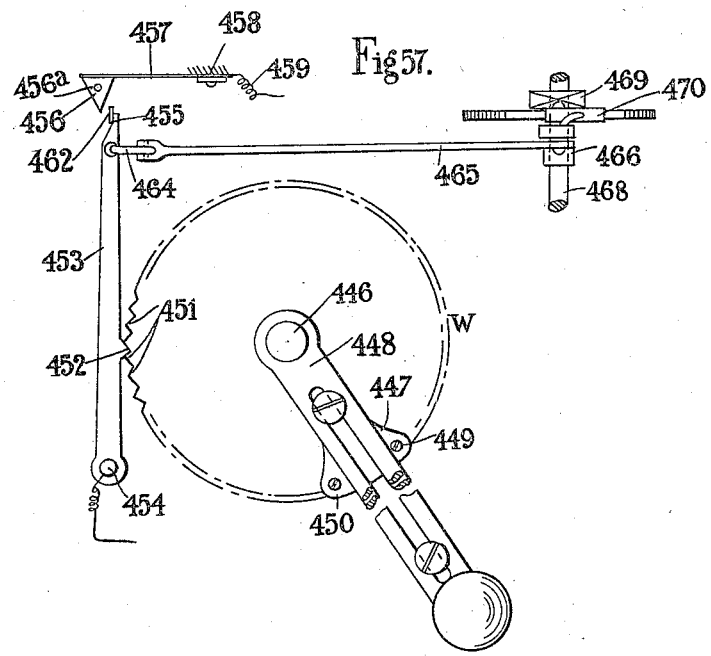
INVENTOR
BY W. Wilkins,
Marks & Clerk
ATTORNEYS Jan. 9, 1923. 1,441,469
W. WILKINS.
MEANS FOR PRODUCING OR REPRODUCING DESIGNS, LETTERPRESS, ETC.
FILED MAR. 2, 1921. 22 SHEETS-SHEET 20
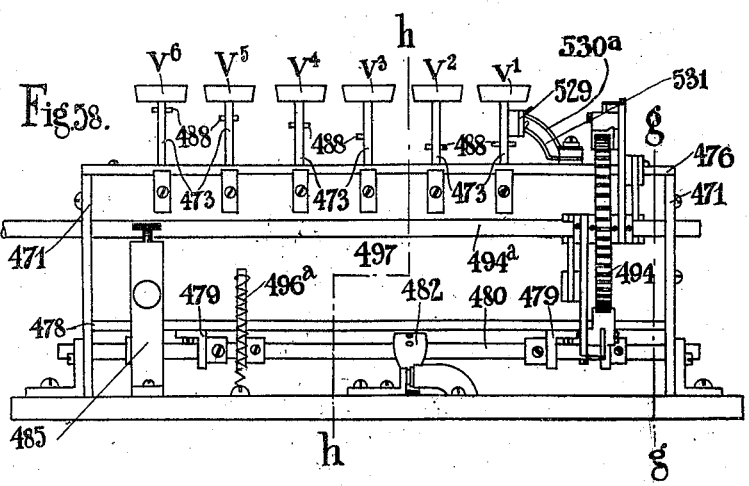
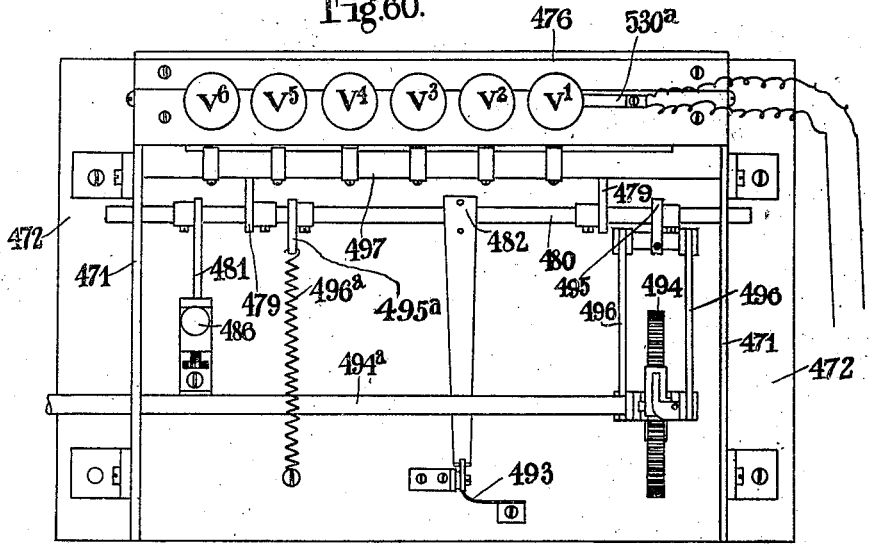
INVENTOR
W. Wilkins,
BY Marks & Clerk
ATTORNEYS

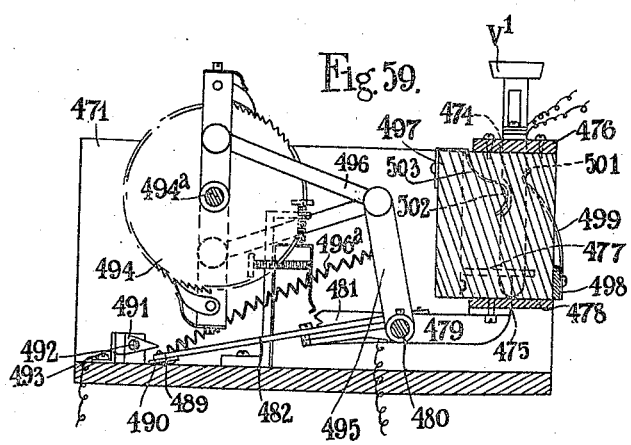
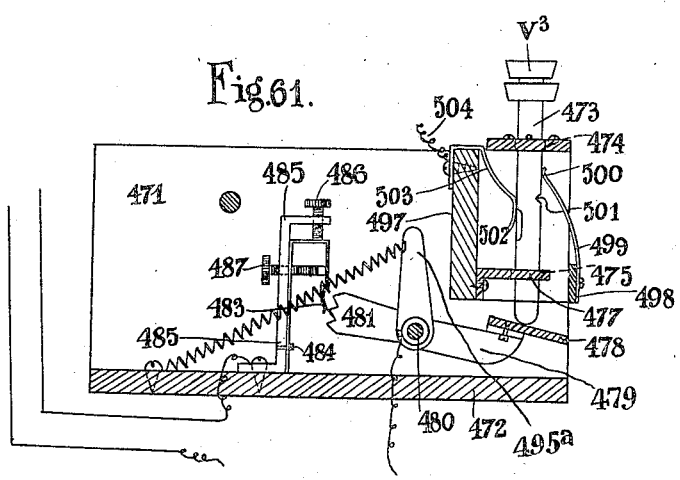

Jan. 9, 1923. 1,441,469
W. WILKINS.
MEANS FOR PRODUCING OR REPRODUCING DESIGNS, LETTERPRESS, ETC.
FILED MAR. 2, 1921. 22 SHEETS-SHEET 22

INVENTOR
W. Wilkins,
BY Marks & Clerk
ATTORNEYS

Patented Jan. 9, 1923.

1,441,469

UNITED STATES PATENT OFFICE.

WALTER WILKINS, OF FINCHLEY, ENGLAND.

MEANS FOR PRODUCING OR REPRODUCING DESIGNS, LETTERPRESS, ETC.

Application filed March 2, 1921. Serial No. 449,190.

*To all whom it may concern:*

Be it known that I, WALTER WILKINS, a subject of the King of Great Britain, and residing at 96, Squires Lane, Church End, Finchley, in the county of Middlesex, England, have invented a certain new and useful Improved Means for Producing or Reproducing Designs, Letterpress, Etc., of which the following is a specification.

This invention relates to a method of and apparatus for drawing, engraving, copying or reproducing designs, letter press, numerals and other forms on any suitable material, of the type in which a moving record band controls by perforations therein, the actuation of a drawing, engraving or the like instrument in relatively right or other angled directions to produce a resultant line or a right line on the working surface.

More particularly the invention has reference, for example, to the production of lithographic poster work, enamelled sheet iron plates, facia or sign plates, stencil plates or stencil designs, fretwork or the like, and which often bear or comprise an announcement in letter press and numerals accompanied or not by a sketch or design.

For producing lithographic work, for example, it is usually necessary for the lithographer or designer to draw or engrave each letter or line separately on the stone or transfer it thereto on the same or another scale and each letter or numeral has to be accurately spaced from the next; it also frequently happens that the work has to be done backwards. This involves considerable time, work and expense and comprises after all only a considerable amount of repetition work since many of the letters and so forth are repeated.

One object of the present invention is to increase the speed of production of such kinds of work and lessen the working costs.

Another object of the invention is to provide for accurate spacing between the characters or forms it is desired to produce which as is well known varies according to whatever character is arranged to be adjacent the next.

Another object is to vary the size or scale of the work produced.

A still further object is to provide a mechanism by which one or more original records may be manufactured for use in subsequent reproductions.

The present invention principally consists in a drawing or engraving machine comprising in combination, a work support, a marking implement, lead screws which are adapted to co-operate and move said implement in any desired direction over said support, a plurality of impulse wheels for driving the lead screws independently at variable speeds, and means whereby any two of such wheels are adapted to control the operation of the screws.

Reference will now be made to the accompanying drawings in which:—

Figure 1 is a diagram of the general action of the machine.

Figure 2 is a perspective view of the whole machine.

Fig. 2ª is a plan view of the left hand half of the machine.

Fig. 2ᵇ is a plan view of the right hand half of the machine.

Figure 3 is an end elevation of the escapement gear.

Figure 4 is a plan of Figure 3 with some of the parts omitted.

Figure 5:
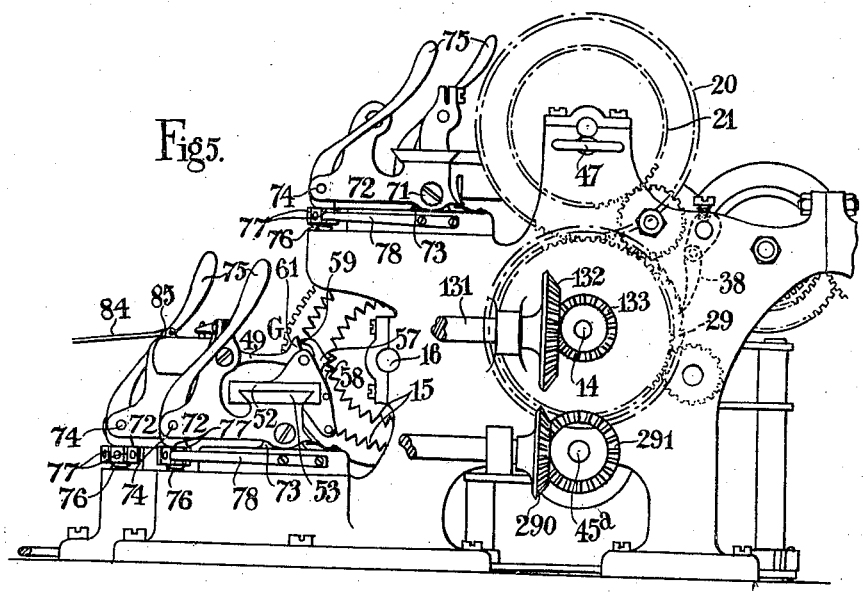

Figure 5 is similar to Figure 3 as viewed from the other end.

Figure 6:
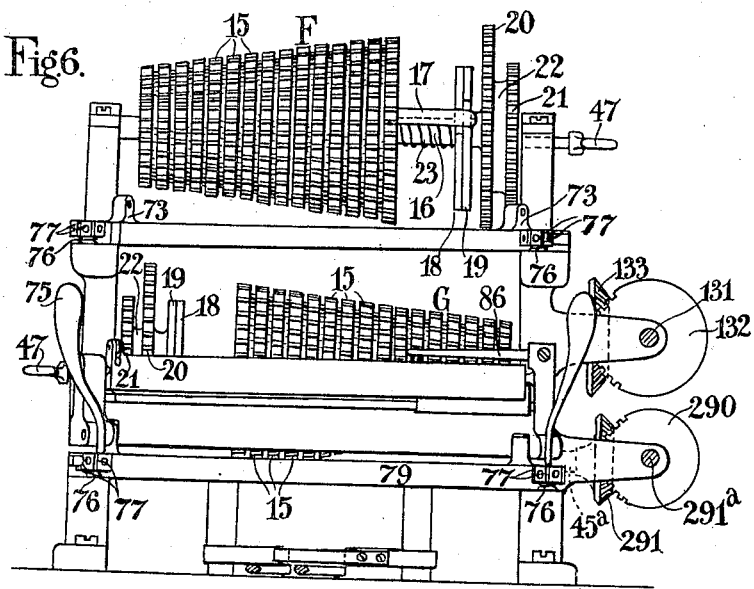

Figure 6 is a side elevation of the escapement gear as viewed from the left of Figure 5.

Figures 7 and 8 are end and side elevations of the escapement levers.

Figure 9 is an elevation of the primary drive shaft and the spring winding mechanism.

Figure 10 is an end view as seen from the right of Figure 9.

Figure 11 is a section on the line *a—a* Figure 9.

Figures 12 and 13 are details of the escapement driving mechanism hereinafter described.

Figure 14 is a plan view of the reversing mechanism.

Figure 15 is a side elevation thereof.

Figure 16 is a vertical transverse section on the line *b—b*, Figure 14.

Figure 17 is a plan of the direction wheel.

Figure 18 is a plan of a contact block co-acting with the direction wheel.

Figure 19 is a vertical transverse section on the line c—c, Figure 18.

Figures 20 and 21 are a plan and side elevation of a single contact member detached.

Figure 22 is a reverse plan view of the direction wheel.

Figure 23 is a correct side elevation of the direction wheel.

Figure 24 is a side elevation of part of one of the ratio wheels, with the parts co-acting therewith in section.

Figure 25 is a corresponding plan of a part of three ratio wheels.

Figures 26 and 27 are details.

Figure 28 is a side elevation of the record mechanism.

Figures 29 and 30 are rear and front elevations respectively of such mechanism.

Figures 31 and 32 are details of the record band and one of the reels.

Figure 33 is an elevation of the instrument carriage.

Figure 34 a vertical section on the line d—d, Figure 33.

Figure 35 is a plan view of the carriage.

Figures 36, 37 and 38 are a vertical section, side elevation and plan view respectively of the pen.

Figure 39 is a horizontal section on e—e, Figure 36.

Figure 40 is side elevation of a modified form of pen.

Figure 41 is a plan view of the driving means for one of the lead screws.

Figure 42 is a side elevation of Figure 41.

Figure 43 is a vertical section on the line f—f, Figure 41.

Figure 43a shows the parts of Figure 34 in a different position.

Figure 44 is a portion of a curved line as drawn by the machine.

Figure 45 represents a circle drawn in the same way.

Figure 45a illustrates a portion of a drawn letter.

Figure 46 is a diagram of the electric circuits.

Figures 47 and 48 are a reverse plan and side elevation respectively of a contact device for the record band.

Figure 48a is a detail connected with the recording mechanism.

Figure 49 is a detail.

Figure 50 is a detail of a double contact.

Figures 51 and 52 are a side elevation and end view of a contact make and break.

Figure 53 is a perspective view of a switch device and a circuit make and break.

Figure 54 is a diagram of the spacing system.

Figures 54a, 54b and 54c show the commencing portions of three record bands.

Figure 55 is a diagram of electric circuits when manufacturing a record.

Figures 56 and 57 are an elevation and plan view respectively of a steering wheel for originating a record.

Figure 58 is an elevation of the punching keys.

Figure 59 is a section on line g—g, Figure 58.

Figure 60 is a plan of Figure 58.

Figure 61 is a section on line h—h, Figure 58.

Figure 62:
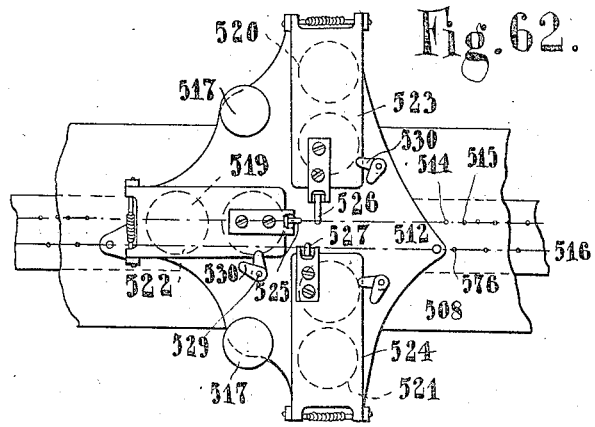
Figure 63:
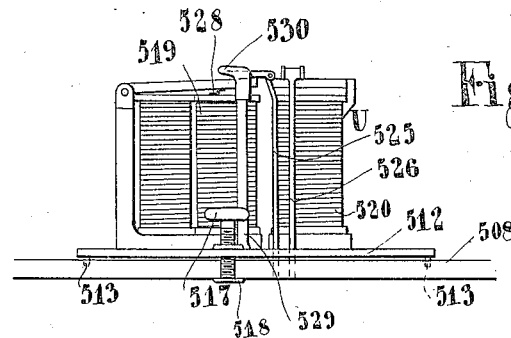

Figures 62 and 63 are a plan and elevation of the punching magnets.

Figure 64:
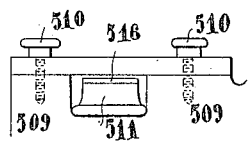

Figure 64 is a detail.

As will hereinafter be described the production or reproduction of any desired shape or form will be found as being based upon the principle of imparting movement to a drawing or engraving device in one of two directions, which are at a right or other convenient angle to one another or in both directions, simultaneously to produce a resultant stroke or line at an angle which depends upon the relative ratio of movement in each direction. For making a curved line it is proposed to form an approximation thereto by drawing a series of short straight lines arranged relatively to one another at an obtuse or other angle of about three or four degrees, the approximation to a complete circle comprising for example 96 short strokes or lines and which may vary in length according to the radius of the curve to be produced. In this way curves can be sufficiently approximated by a line made up in this way so that in place of a curve a polygonal figure either closed or open is produced which cannot be distinguished at a casual glance from a true circle or arc of a circle or other curve.

A brief general description will first be given of the machine which will afterwards be described in greater detail.

Referring to Figure 1 the apparatus comprises a carriage A (hereafter called the instrument carriage) on which a writing, cutting, or other implement or implements B is or are mounted according to the kind of work to be done and the material used, and which is caused to move in various directions as a result of the application thereto of one or two forces C, D, conveyed by the lead screws shown and acting at a relative right angle as shown by the arrows.

These forces are adapted to be varied relatively to one another and are hereinafter referred to as primary motions whilst the actual movement of the instrument due to the combined action of the two forces is called the resultant motions and is indicated by the curve E which has been traced by the implement B.

The primary motions are regulated by two series of spring driven escapement wheels F, G, the co-acting escapement levers H of which are under the control of electromagnets K so that the extent of a primary motion varies according to the number of times which the armatures of the magnet controlling it has been oscillated by the fluctuations in, or the frequency of the current impulses supplied to the said magnet and also according to the amount of movement allowed by each oscillation. These electromagnets K (hereinafter called the escapement magnets) receive impulses of predetermined frequency through a series of wheels L (hereinafter called ratio wheels) which revolve together at the same rate and have various numbers of teeth which by intermittently coming into contact with suitable wipers M, make and break the circuits to the magnets K. As these two magnets are usually connected in circuit with two different ratio wheels, the primary motions will vary in extent relatively one to another according to the numbers of the teeth of the wheels to which the said magnets are electrically connected which have passed the respective wipers M, and therefore the direction of the resultant motion is adapted to be varied by connecting the circuits to the escapement magnets K through different wheels, changing according as the resultant motion is required to change. The changing of these connections is effected by a rotating wheel N (hereinafter called the direction wheel) which carries two wipers or brushes O which are in electrical connection respectively, through the central shaft wipers P, with each escapement magnet K, one for each and insulated from one another. These make contact in turn with studs Q corresponding in number with the number of ratio wheels L, of which only a few with their electrical connections are shown. The direction wheel N is rotated step by step in one or the other direction by magnets R controlled by one row of perforations on a record band S. The ratio wheels L and the record S are driven simultaneously by suitable mechanism and the wipers O on the direction wheel N make contact successively with a series of studs Q and energize the escapement magnets at definite frequencies depending upon which pair of ratio wheels are in circuit. The escapement wheels are graduated in size so as to resemble cones and the levers H may be adjusted to engage any separate wheel desired to vary the size or scale of the work to be produced.

The machine will now be described in detail:—

Referring to the general perspective view in Figure 2, the machine is carried upon a suitable table 10 along one side of which the controlling mechanism is carried, the rest of the table supporting the lead screws, and the instrument carriage, denoted generally at A, above the surface to be drawn upon, engraved, lithographed or otherwise, and which may be a lithograpic stone.

The escapement cones F, G, together with their coacting devices are all carried in a frame or casing 11; the ratio wheels L are supported by a frame 12; the moving record band S and its co-operating parts are supported by a frame 13 whilst the direction wheel N and its associated mechanism is centrally arranged upon a suitable support carried by the table 10. The main drive shaft 14 drives the ratio wheels and the record band and keeps the springs of the escapement wheels fully wound.

Escapement gear.

Referring to Figures 3, 4, 5 and 6, the escapement cones F, G, each comprises a series of fifteen graduated toothed wheels 15 carried upon shafts 16 supported by suitable bearings in the frame 11. In Figure 4 only one cone is shown, the other being indicated by dotted lines. They are loose on their respective shafts 16 and are arranged in opposite directions as shown in Figure 6 the largest wheel in each cone having a pin 17 extending therefrom parallel with the axis, its free end engaging a notch in two relatively adjustable discs 18 and 19 to provide a certain amount of lost motion to overcome the effect of backlash affecting the lead screws. These discs together with spur wheels 20, 21 which serve as transmission gear wheels for the cones, are all carried by a central hollow sleeve 22 fitting upon the shaft 16. The larger end of the cone is spaced apart from the disc 18 and a spring 23 is coiled around the shaft with its respective ends abutting against the largest escapement wheel and the disc 18, one function of said spring being to yieldingly press the cone forward against a collar 24 on the other end of the shaft. As shown one cone is arranged at the upper part of the frame, the other being arranged in the lower part, but they are both in operable engagement with the main drive shaft 14 arranged at about the centre of the frame, and parallel with the cone shafts 16, through the gear train to be now described.

Referring to Figure 4 the shaft 14 extends across the frame 11, being carried by suitable bearings therein, the front end projecting beyond the frame and being squared or otherwise formed so that it is adapted to be driven by a suitable prime mover such as an electric motor (not shown) such driving movement being utilized to wind up springs, the unwinding effort of which causes the rotation of the escapement cones and the lead screws. For this purpose and referring to Figures 9, 10, and 11, there is keyed upon the shaft 14 at about the middle of its length a ratchet wheel 25, the teeth 26 of which are adapted to engage with a pawl 27, carried on a lever having two arms 27ª—27ᵇ both pivoted at 28 upon a ratchet wheel 29 mounted loosely upon the shaft 14. To a central boss on the ratchet wheel 29 is firmly fastened the inner end of a spiral spring 30 whose outer end is attached to a flange 31 carried by a spur wheel 32. This wheel is connected by a sleeve 33 to a spur wheel 34 and both of the wheels and the sleeve are all loosely mounted on the shaft 14. The pawl lever arm 27ª is arranged on one side of the ratchet wheel 29 and is extended beyond the pawl 27 to carry an off-set tooth 35 passing through an opening 36 of the wheel 29, said tooth being adapted to engage one of a series of spaced cams 37 (three being shown) formed on the exterior of the flange 31 of the wheel on the other side of the ratchet wheel 29. The lever arm 27ᵇ forms a finger lever as shown. By such a described arrangement when the wheel 25 is turned by the driving shaft 14 in the direction of the arrow, Figure 10, one of the teeth 26 by engaging the pawl 27 forces it and the ratchet wheel 29 round in the same direction thus winding up the spring 30, which when wound up should have a tendency to rotate the spur wheel 32, but as this wheel does not yield entirely to this movement the pawl 27 and its double arm lever revolves relatively to the wheel 32 and its flange 31 until the tooth 35 rides up one of the cams 37 thereby disengaging the pawl 27 from the wheel 25 and the wheel 29 is prevented from now flying back, by its teeth engaging the detent 38, carried by a part of the rigid frame. The spring 30 is thus constantly wound up by the drive of the shaft 14, which drive is automatically thrown out to prevent overwinding. As the spring unwinds due to the action of the escapement, the pawl 27 will again engage the driving wheel and the winding up will be resumed. The arrangement described also permits the operator to manually adjust the springs. If desired, the motive power may be applied at the end of shaft 131 as shown at 14ª (Fig. 2) such shaft 131 being in driving connection with shaft 14 by means of bevel wheels 132, 133 (Fig. 4).

The above described spring winding mechanism and the wheels 32, 34 are duplicated on the other half of the shaft 14 so as to serve the other escapement cone. To transmit the unwinding effort of one of the springs to its respective escapement cone the wheel 32 engages with a pinion 39 mounted loosely upon a shaft 40, whilst wheel 34 engages with an idler pinion 41, that in turn engages a pinion 42 also loosely mounted on shaft 40, the two pinions 39 and 42 thus rotating in opposite directions. Another pinion 43 is also carried on shaft 40 which is in gear with an idle spur wheel 44 which in turn engages with the spur wheel 20 on one of the escapement cones. The shaft 40 is carried in suitable bearings in the frame 11 and is in driving connection with a shaft 45 to drive the leading screw for one of the primary motions. Between the pinions 39 and 42 a clutch is arranged which will be described, so that either of the pinions may be clutched to the shaft 40 to rotate it in one or the other direction, and at the same time rotate the escapement cone through 43, 44 and 20. This transmission arrangement is duplicated for the other cone from the other half of the driving shaft 14, the drive being imparted to a shaft 45ª which is in driving connection with the lead screw for the other primary motion. The idler pinion 41 is in each case carried on a stub shaft 41ª mounted on the frame 11.

In order that the cones may impart a variable drive, the wheels 20 and 21 and their sleeve 22, are adapted to be shifted axially on the cone shaft 16, so that either the wheels 44 and 20 are in engagement or wheel 44 drives an idler 46 which in turn operates wheel 21. The action of the spring 23 maintains the first gear in its operative position, but allows the second gear to be brought into action by a plug 47 in the frame, which when pushed in and turned causes a pin 48, Figure 13, to take behind the frame 11 thus holding the second gear in position.

For controlling the rotation of the escapement cones, an escapement lever 49, Figures 7 and 8, is provided for each cone and is capable of being adjusted along the side of the cone so as to co-act with any particular escapement wheel 15 as desired. It is pivotally mounted on a pin 50 carried by a bracket 51 forming part of a carriage 52 sliding on a support or bed 53 extending parallel with the side of the cone, see Figure 4. The lever 49 is not oscillated directly by the particular escapement wheel 15 with which it is cooperating, but through the movement of pawls 54, 55 both pivoted at 56 at one end, and shaped at the other end at 57, 58 to engage in the teeth of the escapement wheel 15, so that as the latter rotates they are pushed backwards and forwards alternately so that while one is moving inwards, the other is moving outwards and vice versa. They also have projections 59—60 adapted to engage flat faces 61—62 on each side of the pivot 50, so that as 62 is forced back, the other end of the lever is raised and throws forward the flat face 61 and vice versa. The arrangement described forms a system whereby the movements of the pawls 54 and 55 are followed and constrained by the flat faces on the lever 49, so that when the latter is prevented from moving, as will be described, neither the pawls nor consequently the escapement wheel can move. It will be seen from Fig. 7 of the drawings that whereas the ends 57, 58 of the levers 54, 55 are practically the same distance from the pivotal point 56 of such levers, the difference between the distances of points 59, 60 from the aforesaid pivotal point 56 is considerable. Consequently, as ends 57, 58 should move through the same distance when operating to release the teeth of the escapement wheel, the points 59, 60 must move through different distances. To allow of the correct movement of these points so that there will be a minimum of play between the faces 61, 62 and the points 59, 60 and also between the ends 57, 58 and the teeth of the escapement wheel, the distances between the points 59, 60 and the pivotal point must be of a definite proportion. Such proportion is preferably obtained as follows:—

Let the distances 59—56, 57—56, 60—56, 58—56, 59—50, and 60—50, be respectively represented by the letters $a, b, c, d, e, f$.

Then $e:f::a/b:c/d$.

The other end of the lever 49 when in mid-position as shown in Figure 7 is engaged by a controller 63 which is of the channel cross section shown and is illustrated as at one limit of its rocking movement engaging the lower edge of the enlarged end of the lever 49. The upper and lower surfaces of such enlarged end are such that they allow the controller 63 to go through a complete oscillation shown by the dotted lines 64 and engaging the upper surface of the end of lever 49 before releasing the lower surface and conversely. Therefore the lever 49 can only move through a complete oscillation if the controller also performs a complete oscillation, and the escapement wheel 15 can only move the distance of one tooth at the same time. The teeth of all of the escapement wheels 15 are of a pointed V-shape and while no precise angle is defined as being contained by the sides it should be noted that the more acute the angle, the greater the movement possible to the pawls 54, 55 and consequently the greater will be the bearing surfaces in contact when the wheel is checked. On the other hand, the more obtuse the angle, the easier will the pawls 54, 55 be moved by the wheel, but on account of the smaller depth of tooth greater accuracy will be required in all parts. It is possible with advantage to increase the length of the lever 49 especially with a machine requiring a more powerful drive. The greater leverage would throw more work on to the escapement wheel, but on the other hand, the movement of the controller is eased and it is advisable to give as little work as possible to the electro-magnet which as will be seen operates the controller.

The series of escapement wheels 15 used to secure different dimensions of work from the same record, have their teeth as nearly alike in size and shape as possible, and a single set of pawls with their corresponding lever are used for each cone. As before described these parts are mounted on the sliding carriage 52 which can be temporarily fixed opposite any escapement wheel required, by means of the pin 65 which is pressed down into one of a series of holes 66 in the bed 53 by the spring 67 and lifted out by means of the cam lever 68 pivoted at 69 in the forked upper end of the pin 65, and acting on the fixed abutment 70, when it is required to adjust the sliding carriage to a new position on the base 53. The latter forms a bar with undercut edges to receive the sliding carriage, and is carried by a central trunnion pin 71 at each end (see Figures 3 to 6) to bring the pawls clear of the escapement wheels when changing position of the carriage. For this purpose the base 53 is extended to form a cheek 72 at each end, to which is secured the trunnion pins 71 each being supported in a fixed bearing 73. To raise or lower the cheeks 72 and thus engage or disengage the pawls, their free ends are pivoted at 74 to a cam lever 75 abutting against the head of an adjusting screw 76 having notches 77 by which it may be turned, the said notches also serving to lock the heads by engaging successively a spring 78 fixed to the frame. The bearings 73 for pivotally supporting the bed 53 form part of a bar 79 which is secured to, and bridges, the frame members 11.

The controller 63 is not shiftable with the carriage but is extended longitudinally and parallel with the side of the escapement cone, so that some part of it does duty for each position of the sliding carriage with its lever 49. The controller is carried by trunnion pins 80 which are carried by the cheeks 72, said pins engaging with openings in filling pieces 81 which close in the open ends of the channel. One of the pins should be adjustable to permit the controller to oscillate freely and also to allow of dismounting the latter when necessary. The internal faces of the upper and lower sides of the controller which come into contact with the enlarged end of the lever 49, are tangential to the oscillating radius, so that the lever neither assists nor hinders the oscillation of the controller to any appreciable extent. Each controller is made of as thin a section as possible consistent with the necessary strength so as to throw but little work on to the armatures of the electric magnets K, K, Figure 2 which operate them. For this purpose the armatures 82 are pivotally mounted in the usual way and carry extensions 83 to increase the leverage, the movement being transmitted to the controllers by tie rods 84 pivoted at 85 to lugs on the controllers, see Figures 3 and 5. A spring 86 moves each controller against the pull of its armature 82 in the other direction. It is preferred to arrange for a small armature movement so as to secure a high rate of vibration.

From the foregoing it will be understood that according to the impulses received by the magnets K, K, so both of the escapement cones will be moved step by step by the unwinding effort of the springs 30, and this step movement is transmitted by shafts 40 and 45ª to the lead screws. To allow these to be rotated in a right or left hand direction the following reversing mechanism is used. Referring to Figure 4 there is arranged on each of shafts 40 and 45ª between the loose pinions 39 and 42 a clutch member 87 keyed to the shaft, which carries at opposite ends driving lugs 88 and 89 adapted to engage respectively with a notch or recess in discs 39ª or 42ª integral with the pinions 39 and 42. The clutch member 87 is adapted to be slidden on the shaft 40 so as to engage one or the other of the discs by means of a clutch fork 90 forming one arm of a bell crank lever pivoted at 91, the other arm 92 being attached by a leaf spring 93 to a clutch rod 94. Both of these clutch rods arranged in the lower part of frame 11 extend to a position which is adjacent the direction wheel N Figure 2, and are actuated by the mechanism shown in Figures 14, 15 and 16.

The end of each clutch rod is jointed at 95, 96 to arms 97, 98 respectively, of bell crank levers fulcrumed at 99, 100, and the other arms 101, 102 are each connected at 103, 104 to the transversely arranged rods 105, 106. To effect sufficient clearance the connection between 95 and arm 97 is effected by a link 95ª in both cases. The rods 105, 106 are knuckle jointed at 107 to extension rods arranged in pairs as shown and provided with ends each having a hook 108 and an oblique end face 109. They are adapted to be slidden backward and forward in grooves in a guide block 110, and at their free ends are under the control of leaf springs 111 arranged beneath them. The said springs are anchored at one end at 112 within a foundation piece 113 which is recessed to allow necessary "play" to the springs, while towards their other ends they are each fitted with a nose or projection 114 adapted to engage with a recess 115 in the underside of the respective pairs of rods 105 and 106. The upward movement of the free ends of the springs is limited by a series of stops 116.

From the foregoing description it will be seen that each clutch rod 94 is under the control of a pair of rods 105, 106, the link attachment 95ª serving to pull, while the attachment 96 serves to push the rod. The rods 105, 106 are normally so relatively displaced longitudinally that one is in a position ready to operate, while the other is held out of operation, as shown in Figure 14. For this purpose the rods are under the control of cross heads 117, 118 each centrally pivoted at 119, 120 to brackets 121, 122 secured rigidly to the guide block 110, and each cross head being connected at 123 and 124 to its own locking rod 125, 126 respectively. Each cross head is triangular in form, the opposite ends 127 and 128 of the base alternately pressing the rod 105 down into the groove in the base 110 while leaving the other rod free to rise and vice versa, according to the position of the locking rod 125 or 126. The springs 125ª and 126ª pull the crossheads into the positions shown in Figure 16. In the position of the parts shown in Figure 14 the two rods 105, in the forward position are shown as being held down by the corners 128 of the cross heads, while the two rods 106 in the backward position are held down by their oblique end faces 109 coming beneath the overhanging stop member 129 which is common to all of the four rods. Arranged in suitable bearings 130 is a continuously rotating shaft 131, driven through bevel gearing 132, 133 from the primary drive shaft 14, (see Figures 3 and 6), which shaft 131 may carry a broad faced ratchet wheel 134, or as shown in Figure 2 the ratchet wheel is carried on a counter shaft driven through a reducing gear. The lower part of the circumference of this wheel which is common to all of the four rods, is positioned immediately above the hooked ends of the pairs of rods 105, 106 and if either of the cross heads 117 or 118 is actuated by its locking rod 125 or 126, either of the extension rods 105 will rise by its spring 111 and raising the hook 108 into engagement with the teeth of the rotating ratchet wheel 134. This causes the rod to be drawn back and pulls the clutch rod 94 to operate its clutch, until stopped by the overhanging stop 129. In the meantime the other rod 106 has been drawn forward by the action of the bell crank levers 98 and 102, but its free end is prevented from rising and engaging the teeth of the ratchet wheel 134 by the reversed cross head.

From that stated above it will be seen that each clutch rod 94 is operable by two rods, one for backward and the other for forward movement and one of these rods is always in position ready for operation. The two rods 125 and 126 are actuated from the direction wheel as will be seen.

When the clutch has been fully operated, the corresponding extension rod 105 or 106 in being drawn to the right (see Figure 15) should allow its spring 111 to project into the notch 115, so that the rod is no longer forced upward. The clutch might not immediately engage however, and then the movement of rod 94 will be taken up by the spring 93 (see Figure 4) and the incomplete movement of the extension rod still enables it to be raised by its spring 111 into engagement again with the ratchet wheel 134 so that it will receive another actuation, which will be repeated until the clutch is properly engaged. The same will happen should the clutch become accidentally disengaged. By such an arrangement there is no necessity to provide separate mechanism for locking the clutch in position.

The direction wheel.

Referring to Figures 17 to 23, the direction wheel denoted generally by N, Figure 2, consists of a toothed contact wheel 135 horizontally mounted loosely on a vertical stub shaft 136 firmly secured to a footstep 137 screwed into a base 138, Figure 19. The wheel has 96 or 64 teeth according to the system of ratios adopted as hereafter described, 96 teeth being assumed in the example shown. It is rotated stepwise one tooth at a time in a clockwise direction by the electromagnet 139 and in an anti-clockwise direction by the magnet 140. For this purpose, the pivoted armature 141 of magnet 139 is linked to one arm 142 of a bell crank lever fulcrumed at 143, the other arm 144 at its free end being pivotally secured at 145 to a pawl 146, the arrangement being such that when the armature 141 is drawn down, the pawl engages the radial teeth of the contact wheel 135 to rotate it the distance of one tooth in a clockwise direction. Such action of the pawl takes place against the force of the spring 147 secured at one end to a fixed abutment 148, and at the other end to the arm 142 of the bell crank lever. The arm 144 is somewhat longer than 142 so that the movement of the armature 141 is multiplied in order to obtain the necessary stroke. In the position of rest as shown, the pawl 146, which is under the influence of spring 149 on one side of the pivot 145, is kept clear of the teeth of the contact wheel, by the adjustable stop 150 arranged at the other side of the pivot and against which it strikes as it swings back. 151 is a stop to definitely limit the swinging back movement by striking against the arm 144. To prevent the wheel moving more than the distance of one tooth by its own inertia, one end of a locking lever 152 fulcrumed at 153 is also linked to the armature 141 and is operated at the same time as the bell crank lever. The other end of the locking lever engages the teeth of the contact wheel but not until the arm 144 has moved the pawl far enough to ensure the locking lever engaging the space between the two proper teeth. The locking lever is then forced in between these teeth to finally stop the contact wheel. When both the pawl and the locking lever are again clear of the contact wheel, the latter is held in its adjusted position by a spring detent 154 fastened to the base 138 and engaging between two teeth of the wheel 135. The shape and resistance of this detent will not, however, prevent the contact wheel being positively moved in either direction. The mechanism for the other magnet 140 is the same but the arrangement of the pawl 146 is such that it imparts an anti-clockwise movement to the contact wheel, and Figure 17 shows such pawl in action.

Depending from the underside of the contact wheel are two pairs of wipers 156 and 157 secured to the wheel at 158 and insulated therefrom. Both of the wipers 156 are provided with an auxiliary wiper 159 whilst a similar auxiliary wiper 160 is used in connection with both wipers 157. The pairs of wipers 156 and 157 are adapted to engage in turn with a series of studs 161 arranged in a semicircle beneath the contact wheel and the auxiliary wipers 159 and 160 respectively engage two collecting rings 162, 163 in the centre of an insulating block 164 beneath the contact wheel and centrally through which the stub shaft 136 extends. The two wipers 156 are arranged at 90° relatively to the other two wipers 157 so that the respective members of each pair are 180° apart, both said members being connected together by bridge pieces 165 secured by screws 166 to the underside of the wheel 135 and which also carry the auxiliary wipers 159 and 160. The collecting rings are respectively in circuit with the escapement magnets K, K.

The contacts 161 are arranged in two duplicate groups as shown, around a semicircle, and each contact of a group is in circuit with its own ratio wheel as will be seen. The contacts are numbered in the order and value shown, viz:—

100. 99. 98. 96. 94. 92. 90. 86. 83. 79. 75. 70. 65. 60. 55. 50. 43. 38. 32. 26. 20. 13. 7. 0.

7. 13. 20. 26. 32. 38. 43. 50. 55. 60. 65. 70. 75. 79. 83. 86. 90. 92. 94. 96. 98. 99. 100. 100.

and the two groups are numbered according to their respective ratio in opposite directions from the central zero or neutral position indicated. The wipers 156, 157 being fixed at 180° apart in each pair it follows that one wiper takes up the work of making contact at one end of the semicircle as the other wiper leaves it at the other end, and that as a member of each pair are 90° apart, contact will be established with one of the contacts 161 in each group simultaneously, such contacts being situated at 90° apart.

The various contacts 161 as shown in Figures 20 and 21 each comprise a head 167, shoulders 168, and a shank or pin 169. The insulating block is perforated, and each perforation receives one of the shanks 169, and the ends of all the shanks project into a recess in the base of the block and are each conveniently attached to its own circuit lead passing away to its corresponding ratio wheel. The head and shoulders of each contact are accommodated in radial slots cut in a ring 170 turned on the block 164, and are held in position by two half rings or flanged keeps 171 fitting upon the shoulders. These half rings are secured by screws 172, leaving the heads slightly projecting as shown.

Arranged above the contact wheel 135, is a wheel 173 which is provided with notches 174 arranged at spaced intervals to engage a contact arm 175 for a purpose to be described, while superposed on this wheel 173 is a cam wheel 176 having two steps 177, 178 adapted to respectively actuate crossed levers 179, 180 against the action of springs 180$^a$. These are each pivoted at 181, 182, the arms 183 and 184 extending therefrom being attached to the ends of the clutch operating rods 125, 126 already described. The free ends of levers 179, 180 which are 90° apart, where they will contact with the cam steps, are positioned to coincide with the zero position between the two groups of contacts so that reversal of the primary motions will take place when a wiper on the direction or contact wheel 135 is passing from the contact giving the lowest ratio to the position having no contact or zero, or from the latter to the former according to which way the wheel is moving. The cam action is accomplished during the movement of a single tooth.

Superposed on the cam wheel 176 is a sleeve 176$^a$ flanged at 176$^b$ for engaging with a driving shaft leading to the instrument carriage as hereinafter described.

*The ratio wheels.*

The ratio wheels generally denoted by L, Figures 1 and 2, and shown in detail, Figures 24 to 27, comprise a number of rings 184 of the cross section shown in Figure 27. One half of the periphery carries a series of projecting members or studs 185, while the other forms a flange to receive screws 186 by which the rings are secured side by side upon a shell which is secured to a drum 187 by screws such as 188 which drum, common to all of the rings, is keyed upon a shaft 189 supported in suitable bearings in the frame 12. The drum is driven from the shaft 131, which actuates the reversing mechanism, by means of a train of wheels 190, 191 and 192. The first wheel 190 is not fixed to the shaft 131 but is forced to rotate by a short spiral spring 193 which absorbs any irregularities of motion of the drive shaft, this also being assisted by a flywheel 194 included in the train of gearing to the drum shaft 189 to constantly and rapidly rotate it. The wheel 192 is insulated from the shaft, and the bearings for the shaft are also insulated.

Each ratio wheel runs in contact with a wiper 195 comprising a flat brass spring, one being shown detached in Figure 26. The wipers are all attached separately at 196 to metal carriers 197, adjustment being provided for by a slot 198. Each carrier is of inverted L-shape, the upper limb fitting in a groove 199 formed in a block 200 of insulating material, while the lower end of the vertical limb is fastened at 201 to the block 200 which is also of inverted L-shape. The said lower end is reduced to afford a certain amount of flexibility allowing a small amount of adjustable sliding movement in the groove 199 under the control of two screws 202, 203, of which the latter passes with clearance through the carrier and engages with a tapped hole in the insulating block 200, while the former 202 engages a tapped hole in the carrier and presses against the block 200. By means of these screws each carrier 197 is forced forward or backward and accuracy of make and break by each wiper is assured.

A scraper 204 is hinged at 205 to the insulating block 200 and rests on the surface of the ratio wheels to keep the contact studs clean and efficient. The scraper bears a plate of insulating material 206 which supports the wipers 195 as they pass from one to the other of the various studs so as to ensure a positive momentary break as the ratio wheels revolve. To prevent the scraper 204 dropping too far it is adapted to be supported by a bracket 207 attached to the insulating block. By extending the end of each wiper 195 more or less beyond the edge of the support 206, the time during which the wiper is in contact with a ratio stud is increased or diminished. The contacts may be fixed in a roughly adjusted position by means of screws 196 and then finally adjusted by means of the screws 202—203 to obtain the best effect.

The insulating block is carried on a frame 208 pivotally supported on pins or a shaft 209, supported on a bracket 210 of the frame 12, so that said block with its wipers and carriers can be bodily tilted clear of the ratio wheels for convenience in repairing, replacement, or other adjustment necessary. This is effected by the lever 211 centred on the bearing pin or shaft 209, the said lever being extended in the form of a tail 212 which is adapted to be engaged by the point of a screw 213 supported by the frame 12 and having a milled head 214 by which the block, the wipers and the frame 208 may be locked in operative position.

Electric flexible circuit leads 215 passing to the various studs on the direction wheel are attached to the reduced lower end of each carrier 197, use being made for this purpose of the pin 201. To bring all the ratio wheels into proper electrical connection with the return electrical circuit a wiper 216, Figure 2, is provided on the bracket 210 to which an electric lead 217 is connected, the said wiper being in constant rubbing contact with the drum 187.

Each ratio wheel bears a different number of teeth or studs 185 to the other, and each wheel is in electrical circuit with one contact of each of the two groups of contacts 161 arranged in connection with the direction wheel above described. The ratio wheels may be arranged in two groups to correspond or may be arranged as a single block of wheels as in Figure 2, it being understood that this figure being more or less diagrammatic only indicates a few of the wheels. During the rotation of the direction wheel two contacts 161, one from each group, will be electrically connected respectively with two ratio wheels, which two will be changed as the direction wheel rotates and make other contacts. If desired, fifteen wheels may be used for the ratio wheels and these may be used in couples or separately to obtain for example the following series of ratios and their reverse, or according to the number of contacts shown in Figure 18, twenty-three wheels may be used in couples or separately to obtain for instance the following series of ratios and their reverse:—

$$\frac{100}{0} \frac{100}{7} \frac{99}{13} \frac{98}{20} \frac{96}{26} \frac{94}{32} \frac{92}{38} \frac{90}{43} \frac{86}{50} \frac{83}{55} \frac{79}{60} \frac{75}{65} \frac{70}{70}$$

or fifteen wheels to give the following and the reverse:—

$$\frac{100}{0} \frac{100}{10} \frac{98}{20} \frac{96}{29} \frac{93}{38} \frac{89}{47} \frac{83}{56} \frac{77}{64} \frac{71}{71}.$$

Thus for example, if the ratio $\frac{94}{32}$ be chosen, one ratio wheel brought into circuit will give 94 impulses for a definite period of rotation, while the other ratio wheel, during the same period will give 32 impulses, and these two sets of impulses will be transmitted to the escapement magnets K, K to permit the escapement cones to turn for a distance equal to ninety-four and thirty-two teeth respectively or at that proportional rate. This causes a corresponding differential movement of the lead screws which causes the pen or other implement to trace a resultant line due to the said differential movement.

The teeth of those ratio wheels which bear the larger numbers are advisably proportioned of a thickness of about one-half the space between them, i. e. one-third of the circumferential pitch. This proportion should be increased for those wheels having the smaller numbers of teeth. The preferred arrangement for the sake of simplicity is to keep the spaces between the teeth the same on each wheel until the thickness of the various teeth equals the space between, after which the proportions should remain equal.

With reference to the train of wheels 190, 191 and 192 for driving the ratio wheels from the shaft 131, the gearing ratio should be such that the ratio drum runs at such a speed as to enable the lead screws to turn at the maximum speed required: e. g., if one revolution of a lead screw requires twelve oscillations of the smallest escapement wheel, then if the ratio wheel is driven with a gear ratio of $\frac{1}{9}$, the spring acting on the escapement wheel will always be kept wound up, the greatest speed of the escapement not being sufficient to overtake the winding action.

*The record mechanism.*

The perforated moving record may comprise a plurality of bands S, arranged side by side and carried wound up on separate reels 218, Figures 28 to 30, or on a single reel common to all. A single band S which is preferred, is shown in Figure 2, but it will be understood that when the machine is to be used for reproducing letter press and numerals, a separate band S may be provided for each letter of the alphabet and the numerals nought to nine. Referring to Figures 28, 29 and 30, from reel 218 the band is led over idle pulleys 219 and 220 and wound up on a driven reel 221. Such reel is carried on shaft 222 in between the frame members 13, and one end of the shaft projecting beyond the frame carries a spur wheel 223 which is adapted to be driven through change speed gearing from the drive shaft 14, Figure 2. For this purpose, the spur wheel 223 is constantly in gear with a wheel 224 (Figures 3, 4 and 28) such wheel being carried by a sleeve 225 which also bears a pinion 226, the sleeve being loosely mounted on a fixed stub shaft 227. In the adjusted position of the change speed gearing shown in Figure 4, the wheel 224 is in engagement with a wheel 228 on a sleeve 229 which also carries two other wheels 230 and 231, and such sleeve is loosely and adjustably mounted on a fixed stud 232 bolted or otherwise mounted on the frame 11 of the escapement gearing. The two frames butt against one another and are bolted together as indicated at 233, Figures 3 and 4. The wheel 228 normally is in gear with a wheel 234 on a sleeve 235 which also bears a gear 236, the sleeve 235 being loosely and adjustably carried by a stud 237 fixed on the frame 11. The wheel 236 is shown in engagement with a broad faced pinion 238 carried on the drive shaft 14. To change the gearing, the sleeves 229 and 235 are adapted to be longitudinally shifted on the stub shafts by plugs similar to that shown at 47, Figure 13, operated by finger levers 239.

Through the foregoing train of gearing, the reel 221 is rotated at the desired speed to receive the band as it unwinds from the reel 218, and the outer end of the record band is as usual stiffened or strengthened by cardboard or a thin metal strip to which is attached a short cord ending in a hook 240, Figures 31 and 32. To attach the end of the band to the reel 221, the hook is secured in a hole 241 in the reel and a groove 242 serves to accommodate the cord, a recess 243 being also provided in the circumference of the reel to receive the stiff end of the record so that the smoothness with which the record should wind around the roller will not be affected.

The reel 221 is loosely mounted on its shaft 222, and is driven from the said shaft by a slidable clutch member 244 carrying a finger 245 adapted to engage with a pin 246 projecting from the reel. It is to be noted that a single pin 246 is used on the reel to engage with the single finger on the clutch member for a purpose to be afterwards explained. Said clutch is operated by means of the lever 247 fulcrumed at 248. Any suitable means may be used to prevent the record band from being overwound.

To enable the reel 218 to be taken out for the substitution of another band, the shaft 249 which carries it is at one end fitted with a disc 250, which engages a pin 251 projecting from a boss 252 keyed on a stub shaft 253 supported in a bearing in one frame member 13. The boss 252 is apertured at 254 to receive one end of the reel shaft, the other end of which is supported in a slot 255 in the other frame member 13. To retain it in the slot a lever 256 is employed having a hook 257 to take over the reel shaft 249, the said lever being fulcrumed at 258. The lever is sufficiently retained in locking position by its own friction, a spring tongue 259 pressing upon the end of the reel shaft retains the end of the reel shaft in the aperture 254.

For re-winding the record band after it has been fully unwound, the stub shaft 253 projects beyond the frame and loosely carries a driving pulley 260 which may be clutched to the shaft by a clutch element 261, which is operated by a lever 262, fulcrumed at 263 upon a bracket 264 on the frame 13. The pulley 260 is driven by a belt 265 from a large pulley 266 the shaft 267 of which carries a pinion 268 which is in mesh with a spur wheel 269 on the unwinding shaft 222. With the clutch 261 out of action, the band will be unwound from the reel 218 by the action of shaft 222, but when this clutch is in operation and the clutch lever 247 declutched, the reel shaft 218 will be rotated in the reverse direction by the pulleys 260 and 266 and the gears 268 and 269 from the shaft 222. The pulleys will provide for slip in the case of re-winding too far.

The reel 221 and the idle pulley 220 are each fitted at one end with toothed rims 270. These are for the purpose of enabling a narrow single record band of a length greater than that which could normally be taken by the machine to be used. Such record band is provided with perforations which are adapted to be engaged by the teeth of the rims so that the band may be drawn through the machine and passed on to a storing roller or the like (not shown) instead of being wound on the reel 22.

The pulley 220 hereinafter referred to as the take off roller, Figures 47 and 48, is of conducting material insulated from the frame and runs in contact at its lower side with a wiper 271 connected to a circuit lead 272. The upper part of the take-off roller 220 (see Figures 47, 48 and 49) completes a circuit when a perforation in the band S comes between the top of the roller and one of the three wipers 273, 273$^a$, 273$^b$ secured beneath and insulated from the front end of a sliding member 274 pivoted upon a spindle 275 which extends between and is supported by, the frame members 13. The wipers 273, 273$^a$ and 273$^b$ are clamped by screws 275$^a$ to maintain contact with leads 276, which distribute the current to the electro magnets concerned through a flexible cable 276$^a$. The sliding member 274 in order to take its weight off the wipers, is supported by friction rollers 277 mounted in ears 278 projecting down from the member 274, the rollers riding on the take-off roller 220. The member 274 is adapted to be slidden along the spindle 275 to register with the particular part of the record band S required, a tongue and groove 279 preventing relative rotation between the member and the spindle. The tail end of the member 274 carries a projecting finger 280 to engage a series of notches 281 corresponding to the various positions required which are formed in a locking bar 282, which may be marked with letters of the alphabet or other symbols corresponding with the various record bands. By means of the handle 283 attached to the member 274 it may be raised clear of the band, the finger 280 at the same time being disengaged, so that the member may be slidden to a new position required. It is maintained in either of its two positions by a curved extension 284 which is acted upon by a blade spring 285 (see Figures 28 and 49).

In order to prevent the three wipers being in contact with the record while it is being re-wound, a safety device is introduced comprising a lug 286 on clutch lever 247 and a finger lever 287 attached to one end of the spindle 275 and extending in the path of the clutch lever when being operated to throw out the clutch 244 preliminary to re-winding. It is therefore impossible to throw out the clutch until the sliding member 274 is raised, this action also raising the finger lever so that it cannot interfere with the action of the clutch lever 247, and so long as the clutch remains in position for re-winding, the sliding member cannot be fully lowered owing to the finger lever engaging with the lug 286, but keeps the wipers just clear of the record. Such a position is of course convenient for adjusting the sliding member to another letter, the finger 280 being free to allow this, as will hereinafter be described, and, as shown separately in Figure 48a, the record mechanism also comprises an arm 544 fixed by one of its ends on the rocking shaft 275. Such arm, which is not movable laterally with arm 274, is arranged at one end of the shaft to engage special perforations on one edge of the record, and carries a special contact member 414 for a purpose which will be referred to.

The instrument carriage.

Referring to Figures 2, 4, and 41 and 33 to 43a the machine table 10, carries a pair of parallel lead screws 288 supported at each end in suitable bearings, one end of each screw carrying a toothed bevel wheel 289, which is in gear with a corresponding bevel wheel 290, both carried on a shaft 291a. One of the said wheels 290 is in gear with a bevel wheel 291 keyed upon the end of shaft 45a forming part of the escapement gear already described. The parallel lead screws 288 are thus driven at equal speeds and in the same direction, preferably at the same speed as the shaft 45a and imparts one primary motion to the instrument carriage A in a backward or forward direction. The transverse lead screw 292 for giving the other primary motion to the carriage A is supported at its ends in bearings 293 (Figures 41 to 43) formed in brackets 294 attached by screws 295 or otherwise to each end of an L-shaped bar 296, upon the horizontal limb of which the instrument carriage is supported. Each bracket 294 carries a pair of rollers 297 of V or other suitable profile running upon a groove formed on a track member 298 attached to each side of the table 10, and also provides a bracket 299 constituting a box-like cavity closed on one side by a removable plate 299a, which cavity slidingly supports a segmental nut 300. The lower surface of the nut is threaded to ride upon the threads of the parallel lead screws 288, whilst its upper surface receives the lower end of an upright shank 301, the upper end of which is supported by the bent over end of a bracket 302. The lower end of the shank is threaded to receive a screwed washer 303, serving as an abutment for one end of a spring 304 coiled around the shank and abutting at the other end against the bent end of bracket 302. Such an arrangement allows the segmental nut 300 to yield slightly to any inequalities of the lead screws 288 against the spring 304 and the force of which may be adjusted by the screwed washer 303. Thus as the parallel lead screws are rotated at equal speeds, the transverse lead screw 292, the bar 296 and the brackets 294 are bodily moved backward or forward according to their direction of rotation.

In order to rotate the transverse lead screw 292 on its own axis, one extended end of the screw is fitted with a bevel gear wheel 305 which is in mesh with a complemental bevel wheel 306 carried on a sleeve 307 adapted to rotate with and slide longitudinally upon the shaft 45 driven from the escapement gear. As shown, the shaft 45 is formed with two longitudinal grooves 308 to form tracks for rollers 309 at the respective ends of the sleeve 307 to run upon, and act instead of suitable keys to rotate the sleeve.

The instrument carriage A Figures 33, 34 and 35 comprises a body part forming an open rectangular frame 310 arranged upright, the lower side carrying rollers 311 running in a grooved track 312 formed in the horizontal limb of the L-shaped cross bar 296. One vertical member of the frame is extended on one side as a bracket 312a carrying a segmental nut block 313 engaging the threads of the transverse lead screw 292, whilst from the other side of the frame is extended an arm ending in a ring 315, having a downward extension ending in another ring 315a which supports the pen or other instrument denoted generally by B. Within the frame 310 is carried an electro-magnet 316 upon an insulator 317, the armature 318 of which is pivoted at 319a to the vertical side of the frame and the free end is adapted to lift the pen or allow it to drop.

The pen is supported in a tube 319 which is provided with a flat collar 324 at its upper end and slides in the rings 315 and 315a and the rotating collar 320. The upper end of the tube is splined at 321 to keep it from rotating in the collar 320 but allowing to move vertically therein. Fixed to the collar 320 there is mounted a spur wheel 322, and within the upper end of the tube is placed a funnel 323. The funnel as shown in dotted lines extends for some distance down into the tube and ends close to a shield or chute 325 forming a part of the pen structure.

Referring to Figures 36 to 39 the pen comprises a tubular holder 326 which fits within the open lower end of the tube 319 and secured thereto by a bayonet or other catch 327 (Figure 34). On one side the tubular holder 326 is formed with a rectangular recess 328 to accommodate a square core 329 which is rounded off on opposite sides and ends in a flat or chisel point 330, the sides of which have a number of fine grooves 331 to assist the flow of ink. It is to be noted that the inner corner of the broad point is exactly in a line with the centre of the tubular holder 326 for a reason that will hereinafter appear. Two opposite sides of the core are grooved at 332 to receive a pair of spring nibs 333 the points of which curve inward and end close on each side of the chisel point, with a clearance which is adjustable by the two screws 334. The centre of the core is bored with a conical hole 335, said hole terminating in a cross bore 336 opening on to the circumference at opposite points so that ink will be supplied to each nib 333. It should be noted that the screws 334 regulate the flow of ink, but the thickness of the line is regulated by the width of the chisel point 330.

The supply of ink is not kept up automatically, but instead, a small bottle 337 is carried on an arm 338 extending from the body part 310 of the carriage with a stopper 339 bearing a nozzle or dropper 340 preferably hollow and having an attached pneumatic bulb 341. The operator supplies the writing fluid when required by allowing a drop or drops to fall into the open end of the funnel 324, from whence it passes to the shield 325 which guides it into the bore 336 and on to the nibs. A syringe may be fitted into the conical bore to clean the nibs when required. To prevent ink falling on the work a gutter or channel 342 extends between the bottle 337 and the funnel. It is to be understood that the pen tube 326 may be adapted to receive any other construction of pen than that described for instance, the simple ruling pen 343 Figure 40, or a set of pens giving graduated thickness of lines. By the construction described the pen structure may be bodily removed from the ring 315 for cleaning, repair, changing the pen and so forth.

During the working of the machine, it will be necessary to periodically raise the pen from the working surface or to allow it to fall so as to commence marking. This is effected by the action of the electromagnet 316. The free end of the armature 318 carries at 344 a pawl 345, the lower or tail end 346 of which is adapted to engage the tail 347 of a triangular lever 348 fulcrumed at 349 on the fixed frame arm 314. A hair spring 350 is firmly fastened by one end to the lever 348 and its other end is free to press on the tail 346. The upper end of the pawl 345 is hooked as at 351 to engage with the rear extension 352 of a lever 352$^a$ fulcrumed at 353, a forward extension of which lever carries a hook 354 adapted to engage in turn with a shoulder 355 or a tooth 356 on one corner of the triangular lever 348, whilst the other corner of such lever is formed with two projecting fingers 357 and 358. A spring 359 has one end attached to the triangular lever 348 and its other end fastened to the ring 315$^a$.

In Figure 34 the dotted position of the above described parts corresponds with the pen as applied to the working surface, and the full lines indicate the position of the parts when the armature 318 is raised after having lifted the pen to the position shown. Suppose that the pin is in a position applied to the working surface, then, on the actuation of the armature 318 the pawl 345 is moved down and its tail end 346 being engaged with the tail 347 of the triangular lever, causes the finger 358 to raise the flat collar 324 and so raise the pen, this corresponding with the full line position. The lever is retained in this position by the shoulder of lever 348 engaging beind the hook 354 of lever 352$^a$. In this position the tail 346 of the pawl is thrust away by the free end of the hair spring so that the lever 348 remains unaffected on the next operation of the armature, the hook 351 being ready to engage the rear extension of lever 352$^a$. When it is desired to again drop the pen, the magnet is again energized and the downward movement of the armature will draw down the pawl 345, the hook 351 of which will now depress the rear extension of lever 352$^a$ disengaging its hook 354 from shoulder 355 and allowing the pen to fall by its own weight, the parts then assuming the position shown in Figure 43$^a$ where it will be seen that the tail 346 clears the end 347 of the lever. There is a danger that if the pen should fall heavily a blot will result; therefore the drop of the pen is limited by the tooth 356 being caught by the hook 354 on the lever 352$^a$, the position of the pen then being that it is just resting on the working surface. It is necessary even in this arrangement however, for the pen to be so light that there would be danger of the line being broken. The movement of the lever 348 is therefore arranged to add the pressure due to the tension of the spring 359 to the weight of the pen shortly after it is dropped owing to the fact that the spring causes a shoulder 357 to press downwards on plate 324. This is allowed to occur when the armature again rises by the de-energizing of the magnet, which finally releases the tooth 356, by the hook 351 releasing the rearward extension of lever 352$^a$ as the pawl 345 rises with the armature. At the same time the hair spring 350 ceases to press on the tail 346, which being weighted swings in and engages the notched tail 347 of the lever 348, which corresponds with the dotted position Figure 34.

When using a nibbed drawing pen of either of the forms shown, it is necessary to adjust the pen with the changing direction of the line which is being drawn. Thus with the simple pen shown in Figure 40 its nibs must be kept parallel with the line, and therefore the pen must be intermittently rotated. The pen as shown in Figures 36 to 38, is intended for large work such as that indicated in Figure 45ª which represents for example the upper part of the capital letter D. The thick line shown corresponds with the recorded shape and one corner of the pen follows this rigidly, the rest of the pen lying within the thickness of the letter. Therefore as the direction of the thick line changes the plane of the chisel point of the pen must also be changed to keep it at a right angle with the line being drawn.

The pen is given a movement of partial rotation in unison with the step by step movement of the direction wheel N by the following gearing. The sleeve 176ª (Figure 23) is flanged at 176ᵇ and such flange is perforated to engage with two pins 360 projecting from a crosshead 361 loosely and adjustably mounted on the lower end of a light vertical shaft 362 Figure 2, supported at its upper end by a bracket 363 attached to a rigid column 364 on the machine table. The top of the column has a cap 364ª which is forked and by means of knuckle joints 365 the fork members are pivoted to the similarly forked ends of a light horizontal bracket arm 366 which reaches out over the working surface and approximately above the centre thereof. The bracket arm 366 ends in two bearing members 367 arranged the one above the other, to afford space as well as a support for a pair of bevel wheels one of which is on a light horizontal shaft 369 and the other is on a depending light shaft 370. A pair of bevel wheels 371 conveys the rotation of shaft 362 to the horizontal shaft 369. The depending shaft 370, in the length of which is interposed two Hooke's or other universal joints 372 and 373, is extended down to the instrument carriage A and ends in close proximity to the upper end of the pen tube 319, where it is supported by a bearing in the arm 374. The shaft is terminated by a gear wheel 375 which is in mesh with the wheel 322 carried on the upper end of the pen tube. The pen is thus constantly adjusted by the direction wheel, so that if a broad pen is being used as in Figure 45ª it will be at a right angle to and within the line being drawn, or if a fine pen is used it will always be in proper drawing position. Moreover, owing to the universal joints, and the freely swinging bracket arm 366, the pen is always under control, no matter what position it may have been moved to by the lead screws. It is to be noted that the axis of the knuckle joint intersects the line of contact of the pitch circles of the bevel gears 371 so that the slight angular movement of the arm 366 does not interfere with the gearing.

From the foregoing description of the means for actuating the pen carriage from the escapement gearing, it will be seen that the lead screws are actuated by a series of ratchet-like movements, and therefore each line is drawn by a series of jerks, the length of which depends upon the design of the machine. In the case of lines which are parallel to either of the two primary motions the jerks are all in one direction and only one of the motions is effective. When however a line is to be drawn at an angle less than 90° to either of the primary motions, for example, assuming that a line is to be drawn which requires the use of the two ratio wheels 98 and 20, the machine in such case will make 98 jerks on one lead screw to 20 on the other. The resulting line therefore is not truly straight but wavy, but the undulations are however reduced to such small proportions by the effect of dampening due to the friction and weight of the parts and by the viscosity of the ink when used, that these undulations will be invisible under normal conditions. If it is assumed that the length of each wave or undulations is .01 of an inch which will be small enough for poster work and that the escapement magnets are energized at the rate of 100 impulses per second, the machine will draw one inch of line per second.

From the foregoing description it will be understood that the parts of the machine which are in constant movement comprise the record band, the reversing shaft and the ratio wheels, of which latter in the ordinary way two are in circuit by means of the direction wheel with the two escapement magnets by which a differential speed is imparted to the instrument carriage and it draws a resultant line of any desired length until the next perforation on the record band moves the direction wheel one tooth to change the two ratio wheels which were in circuit. The new speed ratio now produces another differential movement of the instrument carriage and another resultant line will be drawn the angle of which is different to the foregoing line. A series of short connected lines may be thus produced in mutual angular relation, the angle for each differing by 3.75°, for example, from the next line, and the length of each line may be the same or may be different depending upon the space allowed between the several perforations on the record band; Figure 44 shows an example of such a line. If the direction wheel is allowed to make a single regular revolution in one direction, a polygonal figure approximating to complete circle will be drawn.

In this connection reference is directed to Figure 45 which shows such a circle in relation to the direction wheel contacts which are shown in dotted outline. Assuming that the circle commences with a short vertical line, this being a movement due to the lead screw indicated by the arrows X. At the point $X^1$ the direction wheel is moved by one tooth, the two new ratio wheels driving the screw X slower and operating the screw Y, and producing the next angular line, $X^1$ $X^2$ and so on, the points $X^1$, $X^2$, $X^3$, $X^4$, $X^5$ representing a step movement of the direction wheel. At each step the screw X is driven slower, and screw Y faster, and when the change $X^5$ is made, there is no movement of screw X and reversal of the drive of this screw then takes place as the cam wheel step 177 on the direction wheel Figure 17 is at this moment opposite the zero position between the two series of contacts.

All of the above steps are possible by one row of perforations on the record band but two other rows of perforations are also provided on the record band to deal with other changes in the line that may be required. For example, it will be necessary to reverse the movement of the direction wheel to draw a double or S-shaped curve to lift or drop the pen; to provide for small circles, or to allow proper spacing between the letters, numerals or other forms. These various adjustments are provided by intermittent acting devices as follows:—

*Electrical circuits and intermittent motions.*

Referring to Figure 46, the record band S is shown at the bottom of the figure, the wiper or take-off 273 being used to effect the primary movement. Only eight ratio wheels are shown for convenience. The intermittent movement devices are shown on the right hand of the figure, are numbered and indicated $T^1$ and $T^5$ and generally comprise magnetically operated ratchet wheels which are severally brought into circuit by the action of a switch wheel 376 by the record band take-off $273^a$, but, the circuit is not actually completed until the third take-off $273^b$ makes contact through a perforation in the third row. This energizes a magnet 377 for the purpose. Thus for example, if the intermittent motion $T^3$ is required, the switch wheel 376 is first moved two steps by two preliminary impulses, but the desired adjustment is not accomplished, until the circuit is completed by magnet 377.

The intermittent movement $T^1$ serves to regulate the right or left hand rotation of the direction wheel by alternately closing and opening two circuits. Assuming that the wipers 156, 157 on the direction wheel N are in contact with the studs shown, and that the first wiper 273 on the record band closes the circuit, the current passes through the lead 378 to the direction wheel magnet R for clockwise rotation, thence by lead 379 to intermittent movement $T^1$, through the lead 380 to battery 381 and by the return lead 382 to the record band. At the same time the two escapement magnets K, K are energized, through the leads 383, 384, the current then passing by lead 385, through battery 381, thence through $T^5$, $T^3$, $T^4$, and lead 386 to the ratio wheels L, and back to the studs on the direction wheels. If it is necessary to reverse the movement of the direction wheel to draw the stroke $386^a$ Figure 44 which initiates a new change in the general direction of the line, the switch wheel being normally in the position that the stud $t^1$ is in circuit with the lead $393^a$ it is only necessary to have a single perforation whereby the take off $273^b$ will energize the magnet 377, to complete the circuit. The current then passes by lead 387 to the reversing magnet 388, the armature 389 of which is then closed and the ratchet wheel of $T^1$ thereby moved one step in a clockwise direction. The current then passes through lead 393, battery 381, leads 382 and 391, and thus through switch 392 and lead $393^a$ to contact stud $t^1$.

The movement of the ratchet wheel of $T^1$ one step, cuts out lead 379 and clockwise magnet R from the circuit previously referred to, and brings the lead 390 into circuit and thereby the counter clockwise magnet R. Otherwise, the circuit is the same as before, and the change only effects a rotation of the direction wheel in a counter clockwise instead of a clockwise direction. It should be noted that on de-energizing of magnet 436, the switch wheel 376 is released as is hereinafter described and swings back to normal position. It is to be noted that the studs $t^1$ to $t^5$ are fixed and the switch wheel 376 with its contact member $393^a$ moves relatively to the said studs.

The magnet for lifting and dropping the pen of the instrument carriage has already been described and comprises the second intermittent movement $T^2$. For bringing this movement $T^2$ into circuit, the switch wheel is moved one step in a clockwise direction by the armature and pawl of magnet 433 energized from the second take-off $273^a$. By this movement the stud $t^2$ is brought into circuit, and on the circuit being finally completed by the third take-off $273^b$ the current passes by stud $t^2$, lead 392 to the instrument carriage magnet, lead 393, battery 381 and lead 391 as before described back to the stud.

By the third intermittent motion $T^3$, the lead screws are started and stopped, as when it is desired to draw a right angled corner, see Figure 45ª where the forward movement of the pen for drawing the vertical side of the letter must be stopped when the pen reaches the corner. After the pen has swung back in the direction of the arrow 394, by the step-wise movement of the direction wheel, the lead screws again resume their movement, or one of them only as the case may be, to either draw the horizontal line as shown in the figure or an angular line. To operate this intermittent action, the switch wheel is turned two steps until the stud $t^3$ is in circuit, and upon the circuit being completed, the current passes by lead 395 to energize the magnet 396, the armature 397 of which then turns the corresponding ratchet wheel to break the circuit of the ratio wheels L and stopping the lead screws. The direction wheel keeps on turning thus actuating the pen, until the second take-off 273ª brings $t^3$ again into circuit, and the third take-off completes same, so that the step-wise movement of $T^3$ restores the circuit of the ratio wheels to again start the lead screws.

In cases where the circle to be drawn is of small radius, the intermittent action $T^4$ is utilized to cut out one, two or more of the angles or lines. Similar to the action $T^1$ the ratchet wheel makes and breaks two circuits, of which the lead 386 provides the normal connection to the ratio wheels, but when this is broken a lead 398ª is connected up, and a loop 398 thereby opened and closed to the ratio wheel through a contact arm 175, Figures 46 and 17. The contact breaker arm is pivoted at 399 and alternately makes and breaks contact with a contact piece 400 which is adapted to alternately complete the two leads 398 and 398ª by its free end engaging with the notches 174 on a wheel 173 carried on the direction wheel, or interrupt the said leads when the contact arm is forced out of the notches by the rotation of the direction wheel. As shown in the diagram the pitch between two notches is equal to the pitch of three teeth 135 of the direction wheel, so that when the contact arm is disengaged from the notched disc 173 the circuit for the ratio wheels is broken and no movement of the lead screws will take place until two teeth 135 have passed. The circuit is then again completed by the next notch 174. The contact 400 is shown in detail Figure 17, and as shown it comprises a spring pivoted at one end, the other free end carrying alongside of it an insulating button 400ª so that the free end of the contact breaker 175 makes contact at one stroke, but not on the return stroke.

This intermittent movement $T^4$ is actuated in a similar way to the others, by the switch wheel bringing the stud $t^4$ into circuit, the subsequent circuit completion energizing the magnet 401 through lead 402, the armature 403 breaking the normal lead 386 to the ratio wheels and opening the lead 398ª and loop 398. The reverse will occur when the stud $t^4$ is again brought into circuit, and cutting out the intermittent action altogether.

The intermittent action $T^5$ to provide the proper spacing between the letters comprises a ratchet wheel which carries a pair of contacts 404 and 405 shown in detail Figure 50. They are insulated from each other and the contact 404 in the position shown makes contact between the two wipers 406 and 407. The former is connected to a lead 408 which passes to the ratio wheels L through the intermittent actions $T^3$, $T^4$, and thence to the escapement magnets. The other contact 405, shown in Figure 50 as resting upon the block 409, serves to make contact between the two wipers 410 and 411 respectively attached to leads 412 and 413. The latter is connected to an additional take-off 414 at one side of the record band S, see Figure 48ª, whilst the former 412 has a connection 415 through the spacing magnet 416, the armature 417 of which actuates the ratchet wheel for the action $T^5$, and passes away to the battery 381. Thus the magnet 416 will be energized by means of special take-off 414, and also by means of the usual take-off 273ᵇ, that is, the usual control as before described through the switch wheel. The spacing wheel in the position shown in Figure 46 connects the two wipers 406 and 407, whilst at the same time contact is broken between the contacts 410 and 411, and this is the normal position whilst the letter is being drawn. If the wheel is turned through only one tooth as by the action of the switch wheel 376, the pen cannot move again until it has made a complete revolution and so arrived again at normal position.

*Spacing mechanism.*

In hand drawn lettering great attention is paid to the relative distances between the letters. In type lettering the problem of "spacing" is usually considered to be the problem of so spreading out the letters as to fill a certain length of line. In lithography or such like reproduction, the spacing problem is merely a matter of drawing the letters wider or narrower and in the present machine the facilities for altering the size of work provides means to this end. The term "spacing" in this description is used only to denote the apportioning between the letters, such relative amounts of space as will appear to the eye to be equal. Consider for example the word BAT. This will only look correctly spaced if the T is brought much nearer to the A than B, and in fact an examination of almost any example of lithographic or engraved lettering will reveal such differences.

It is convenient to consider each letter as being enclosed in a parallelogram erected on the base of, and with its sides touching, the sides of the letter. In general this idea is adopted in recording letters on the machine according to this invention. The pen starts from the left hand bottom corner of the parallelogram and if necessary travels lifted clear of the drawing surface until some part of the letter is reached when it falls and traces out the shape required and in the end is left over the right hand bottom corner. Before starting on the next letter, therefore, the pen must be moved a distance corresponding to the amount of space required between the parallelograms, respectively enclosing the preceding letter and the one about to be drawn. With such a pair of letters as AT the two parallelograms often overlap, so that the extra movement must be negative or backward. With a pair of letters such as HT however, there is a distinct space between the two parallelograms, so that the movement must be positive or forward.

To provide for this variation automatically, there is recorded for each letter according to the invention the movements required to give the right amount of space between it and the letter which happens to precede it.

If every possible pair of letters were alloted a separated spacing movement, there would have to be swenty-six or even fifty-two items for each letter, this last if capitals and small letters were to be used together. It is possible however to reduce this number considerably. For this purpose the letters are grouped into classes having sufficiently similar shapes as regards the right hand side, to be considered as the same for spacing purposes. For example if the right hand sides of a Roman alphabet in capitals are considered, it is possible to put them into seven classes. All the letters having a straight perpendicular right hand side obviously form one class. These is no reason for example in the pairs HO IO MO and NO why the spacing should not be the same in each case. It is therefore necessary to assign only one movement to the letter O to adjust its position when any of these letters has preceded it. In the case of a pair of letters such as HA however, if they are given a space adjustment which will look to the eye the same as in the pair HO, it will be found that the amount of adjustment is actually different, but it is found that this new adjustment will serve for a similar series of pairs of letters, i. e., HA IA MA and NA. The same principle will apply throughout the alphabet.

U and J can also be added to the group, although not with exactness, because as regards the letter A, for example, the spacing will not be quite correct. This group or class is numbered 3 on the diagram Fig. 54, which will be explained later. The letters CDOQ have a similarly rounded right hand side and form another group. With the letter O they form, for example, a series of pairs CO DO OO QO where the spacing will be in each case the same, but such space is not the same as that found for HO etc. Thus for the letter O there must be accorded one movement for HO IO, etc., and another for CO DO, etc., and similarly for the other classes. With the alphabet divided into seven classes, therefore, seven different movements have to be recorded for each letter.

In the following description of the spacing method the word "record" refers to the three lines of perforations making up the record of one letter. The record of the complete alphabet is referred to as the "record band". That part of a record relating to the movements of the pen within the imaginary parallelogram above described, is referred to as the "body" of the record. Before this part comes a "preliminary" record on which is provided the spacing movements.

Referring now to Figs. 54, 54$^a$, 54$^b$, 54$^c$ these illustrate respectively a diagram or chart used in preparing the preliminary records of three letters A, B, and C and the three preliminary records prepared therefrom. The diagram and records are divided into eight compartments and the figures in the centre of the compartments of the diagram indicate the amounts of movement which are to be imparted to the pen by the corresponding compartment of the record.

The beginning of the records is shown at the top in these figures. This first compartment does not relate to any class, but the following compartments refer respectively to classes 7–1. The class of the compartment is indicated on the diagram together with the letters which are contained in that class. The first compartment passes under the take-offs first and then the compartments of the seven classes in their reverse order. One or more of these compartments may be cut out in the manner hereinafter described and the combined effect of those remaining, controls the amount of preliminary movement given to the pen. For example, if all are cut out except classes 2 and 1 the pen will receive, supposing the letter A is to be drawn, a movement first of $\frac{1}{16}''$ and then of $\frac{3}{16}''$ giving a total of $\frac{1}{4}''$. If the letter to be drawn is B the take-offs will pass through the compartments under B, giving first a minus movement of $\frac{1}{16}''$ and then a plus movement of $\frac{1}{4}''$, resulting in a total of $\frac{3}{16}''$. The minus movement is given by reversing the pen movement, the $\frac{1}{16}''$ being a movement of the pen to the left instead of to the right.

By cutting out one or more of the said compartments a selection is made of the effective starting point of the record. The means for effecting this cutting out comprises the intermittent action $T^5$ Fig. 46 which operates in the manner previously described, for breaking the circuit through the escapement magnets when in a position other than normal. By thus breaking the said circuit, all traveling movement of the pen is prevented.

The intermittent action $T^5$ can be set in a series of non-normal positions and the number of compartments in the preliminary portion of the record which are cut out depends upon in which of these non-normal positions the action $T^5$ is set. Assuming that the machine is dealing with seven classes of letters then the action $T^5$ is adapted to be moved into seven non-normal positions and one normal position. The seven non-normal positions correspond respectively with the seven classes, the position in which the action is set depending upon the class of letters which has been last traced. The operation is as follows:—

At the end of the record of every letter there is provided a set, or a series of sets, of perforations to operate $T^5$ for setting it in a position corresponding to the class of the letter which the previous part of the record has caused to be traced. Each set comprises four holes in the second row of perforations for the take-off $273^a$ to bring the stud $T^5$ and electromagnet 416 into circuit, and one hole in the third row of perforations for completing the circuit. One set of such perforations will move the action $T^5$ one step and thus set it for class 1, two of such sets will move the action $T^5$ two steps and thus set it for class 2, and so on, up to seven sets which are necessary to move the action seven steps for setting it for class 7. On the completion of the setting of the action $T^5$ the record is finished with and can be re-wound leaving behind as it were, an indication of the class to which the letter traced by the record, belongs, owing to the action $T^5$ having been set in the position corresponding to the class of the letter.

The record of the next letter being now started upon, it will be found that at first, although as the take-offs pass through the successive compartments of the preliminary record, perforations in them will alternately set the start and stop wheel $T^3$ into its starting and stopping position, there will be no resulting movement of the pen, for the circuit controlling such movement is broken at the space wheel $T^5$. Referring to Figs. $54^a$, $54^b$, $54^c$, a number of dots are seen on the right hand side of the figures. These represent holes in the band which come under the special take-off 414 (see Figs. 46 and $48^a$). It has been explained how through this take-off a circuit can be made including the spacing magnet 416 independently of the switch wheel 376. Now if the space wheel has only been set one step from the normal by the preceding letter because that letter belonged to the first class, then the space wheel will require seven more movements before it comes again to normal, for all its movements are in one direction only. The special take-off causes the same kind of movement of the intermittent action $T^5$ as the usual intermittent action. It will thus be seen from the said figures that by the time seven holes have passed the special take-off of the last compartment will be reached, that is to say, the one which is marked "class 1".

Now every compartment of the preliminary record which is adapted to effect a movement of the pen, that is, every compartment with the exception of those corresponding to the compartment of the diagram Fig. 54 having an "o" in the centre thereof, contain two sets of perforations, for controlling the movement of intermittent action $T^3$. The first set puts $T^3$ in its "start" position and the second set puts $T^3$ in its "stop" position, and the distance between the perforations in the third row of perforations in each set controls the amount of movement imparted to the pen. The holes for the special take-off occur at the end of each compartment and thus after each pair of sets of perforations for controlling $T^3$. When therefore the space wheel $T^5$ is brought to normal the "start" and "stop" wheel $T^3$ will at the moment be in the stop position. Almost immediately it will be put into the start position and there will be nothing now to prevent the pen moving. It will therefore travel on until by the further unwinding of the record the perforations will again bring about the stopping of the pen. The take-offs will now pass onto the body of the record and proceed to draw the letter required. If the preceding letter had belonged to another class, say class 3, and had accordingly set $T^5$ through three steps the preliminary record will start moving the pen by the time the compartment marked class 3 is reached as there will only be required five more movements of $T^5$ to bring it to normal. Three times, therefore, after $T^5$ is brought to normal the start and stop wheel $T^3$ will be put in its alternative positions measuring three separate motions to be added to the pen. But it will be noted that in the meantime two more holes have passed the special wiper. It has been before described, however, that when the spacing wheel is in the normal position the circuit is broken between the leads 412 and 413. Therefore these holes will have no effect and the wheel remains at normal till the end of the record when it is reset through the medium of the switch wheel 376 and the take-offs 273$^a$ and 273$^b$.

In connection with the above description two things must be carefully noted. The first is that a letter is only classified in its relation to the letter following. Take for example the word "space." The space between "s" and "p" is considered as class 1 (s) and letter "p." The next is class 7 (p) and letter "a." That is to say the class to which "p" belongs has nothing to do with its distance from "s" if that is the preceding letter. On the other hand its class is the only thing that concerns the space between it and the succeeding letter "a." This is why the class of a letter is recorded at the end of its record. It forms one of the factors in deciding the spacing movement afterwards made by the pen. The other factor is simply the position to which the take-offs 273$^a$ are moved by the operator, that is to say, the record which is next selected for action. The second point is that each record has its own set of perforations at the end to set the space wheel according to its class, but the series of holes for the special take-off are not repeated for each record. The take-off remains always in the same position near the edge of the band and all the compartments relating to one class are of the same length, so that the position of these holes is correct in every case.

The action will now be described in detail of the spacing of a complete word. The word CAB all in capitals is chosen as containing the letters comprised in Figure 54. It will be assumed that there is no reduction from the size as recorded so that the figures in the diagram represent the actual movements.

The operator having decided the position in which the letters are to be drawn brings the pen to the left hand bottom corner of the base line indicating the position. He also puts the direction wheel in position to give a motion parallel to this base line and towards the right. Generally all the intermittent actions except the space wheel will have been left by the last record used, in the position required. That is, $T^1$ will give an anti-clockwise turn to the direction wheel; the pen will be raised, $T^3$ will be in stop position and $T^4$ will be in its inoperative position. $T^5$ however will probably have been set according to the class of letter last drawn but as the operator is now starting on a new word and has already put the pen in the starting position he does not want any spacing movement. $T^5$ must therefore be turned to normal which can be done by simply depressing the armature till it is seen that the right position has been gained. Assuming the record band in place ready for action, it is now only necessary to move the take-off carrier to the letter required (i. e., C), drop it on to the record, put in the clutch for unwinding the record and start the machine.

Now the space wheel being at normal, the pen will start moving as soon as the take-offs reach the first perforation acting on the start and stop wheel $T^3$. But as the first letter of a word is about to be drawn no movement is required. It is to be noted that if the movements indicated in the centre of all the compartments under C (in Figure 54), except the top, are added together the total will be found to be $\frac{3}{16}''$ which is the movement required by class seven and is indicated by the figure in the bottom right hand corner of that compartment. As the first letter of a word is about to be drawn no spacing movement is required and this is indicated by $0''$ in the corner of the top compartment, but as class seven will afford a plus movement of $\frac{3}{16}''$, it is necessary to neutralize this by a reverse movement of $\frac{3}{16}''$, therefore a minus movement of $\frac{3}{16}''$ is recorded in the centre of the top compartment. The perforations to effect these adjustments will now be described with reference to Figure 54$^a$. In this figure the line $a$ of holes operates through take-off 273 (Figure 46) to move the direction wheel. The line $b$ operates through 273$^a$ to move the switch wheel 376 while the line $c$ operates through 273$^b$ to actuate the circuit completing magnet 436. The dotted cross lines are in line with the special take-off holes not indicated.

The first thing the take-offs meet as the record unrolls, is a number of holes in line $a$ sufficient to turn the direction wheel through 180°. Eight holes only are shown but forty-eight are required as at present designed in the actual machine. This is required because the first movement is to the left, while the direction wheel was originally set for a movement to the right. Next come two holes in line $b$ to set the intermittent action switch for the circuit through the stud $t^3$ (see Figure 46) then a hole in the line $b$ energizes the circuit completing magnet so causing intermittent action $T^3$ to act, so completing the circuit through the escapement magnets. A minus movement of the pen is thus started according to which ratio wheels have been put in circuit by the direction wheel. Of course if the movement required is parallel to one of the primary motions, one escapement magnet and one ratio wheel only is in circuit. The record is now unwinding while the pen is moving proportionately. Before the pen has moved the minus distance of $\frac{3}{16}''$ required, two more holes in line $b$ will again set the switch wheel to stud $t^3$ and just as the pen reaches the limit of $-\tfrac{3}{16}''$ a hole in line $c$ passes under the take-off $273^b$, so causing the intermittent action $T^3$ to again act, this time breaking the circuit previously made by it and the pen stops. As the record unwinds to the position indicated by a broken line in Figure $54^a$ the first hole (not shown) at the side of the record band passes under the special take-off 414. The space wheel will not turn however as the circuit is broken by the space wheel. The next motion recorded is a plus motion of $\tfrac{1}{16}''$ (class seven) that is, it is to the right. Holes, therefore, in line $a$ turn the direction wheel through another 180° back to its first position. A set of perforations then follows to initiate starting of the pen, which set is then repeated to stop the pen after a shorter interval than the first case because only $\tfrac{1}{16}''$ movement is required. The next compartment (class six) requiring no movement is therefore left blank. The next following compartment (class five) having a minus movement of $\tfrac{1}{8}''$ requires again a set of holes in line $a$ to set the direction wheel correctly before the usual start and stop actions effect the desired minus movement of $\tfrac{1}{8}''$. The next compartment (class four) bears a similar series being again of opposite sign to the preceding movement and providing for a plus movement of $\tfrac{1}{16}''$. Two blank compartments (classes two and three) then follow and finally the last compartment for class 1 is reached. This compartment provides for the usual starting and stopping for a plus $\tfrac{3}{16}''$ movement. The direction wheel not requiring to be turned. The pen will now be back at the starting point having moved a total of plus $\tfrac{3}{16}''$ and neutralizing its original adjustment of $-\tfrac{3}{16}''$. Passing from this last compartment the body of the record commences. First is a record of the starting action $T^3$ next a hole in line $c$ alone energizes the completing circuit magnet without the switch wheel being previously actuated. The circuit through $t'$ (see Figure 46) will thereby be completed, and $T'$ is shown in this position in Figure 46. One hole now in line $a$ gives a movement of one step in a clockwise direction to the direction wheel so that the pen now moves at a small angle with the base line. The remainder of the record for this letter C is not shown and need not be described. The last mentioned movement of the pen is necessary because round bottomed letters like C are generally drawn to extend below the general base line of the other letters. When the pen has moved far enough away another hole in line $c$ brings the other direction wheel magnet R in circuit and a hole in line $a$ next operates to turn the wheel one step in an anticlockwise direction, so causing the pen to again travel parallel to the base line but a little way from it. Shortly afterwards the pen reaches the bottom of the letter C and the pen is dropped and a series of holes in line $a$ guide the pen round the shape required. The action of drawing the letter will not be further described. It suffices to mention that after finishing it the pen is raised and it is moved to the right hand bottom corner of the parallelogram which has been imagined to enclose the letter. The pen movement then stops, the direction wheel is put in the position from lines to the right parallel to the base line and $T'$ is set for anti-clockwise turning of the direction wheel supposing of course these parts are not already in such position. The letter C is in the second class. Consequently, there now occurs four holes in line $b$ setting the switch wheel 376 to the stud $t^5$ and one hole in line $c$ completes the circuit as before described and the space wheel $T^5$ turns through one step. The same set of perforations is repeated to move $T^5$ another step, so setting $T^5$ for class two. The record is now at the end and the operator lifts the take-offs clear, throws out the unwinding clutch and puts in the rewinding clutch to bring the record band back to starting point and then moves the take-offs to the letter A which is next to be drawn.

The preliminary record for this next letter A is shown in Figure $54^b$. Although the motion of the pen is now cut out the other actions are still affected by the record and therefore the direction wheel will be turned by the holes in line $a$ and $T^3$ put alternatively in start and stop position as the record unwinds. The holes for the special take-off 414 will also have effect in turning the space wheel $T^5$. As this wheel has previously been set round by the foregoing letter, two steps from the normal, six holes must pass the special take-off 414 before the wheel $T^5$ again comes to normal by completing a revolution. Six compartments will therefore have passed without effecting any pen movement, and the compartment marked "Class two" is therefore now about to be passed through, and will be the first to cause pen movement. The bottom corner of the compartment concerned (see Figure 54 under A) shows that a total movement of $\tfrac{1}{8}''$ is required. The next compartment (class one) shows a movement of $\tfrac{1}{16}''$. As this compartment also will affect the pen only a movement of $\tfrac{1}{16}''$ will be required in class two compartment to ensure the desired amount. Referring back over the record, it will be seen that the direction wheel has been set for negative movement. Therefore, the first item in compartment two must be holes in line $a$ to turn the direction wheel back. Next come the start and stop actions giving $\tfrac{1}{16}''$ plus movement, and after a hole has passed the special take-off without effect owing to T⁵ having broken the circuit concerned, the next compartment is entered on and as this records a movement in the same direction there are merely the start and stop actions recorded at an interval causing 3/16″ plus motion being imparted to the pen. After now passing on to the body of the record the pen is dropped before it is started moving, as the bottom corner of the A will coincide with the imaginary parallelogram enclosing it. The letter A belongs to class 5, therefore the end of its record set T⁵ round five steps by five repetitions of the necessary perforations. The operator now again intervenes, rewinding the record band and starting the record for the letter B, (see Figure 54ᶜ). This time the movement of the pen is allowed so far as T⁵ is concerned as soon as three compartments have passed and class five reached, but it will be seen that the movement required for this class is the same as that required for class four. There will therefore be no modification of the movement recorded in this space, so it is left blank. The movement recorded in the next compartment reached is minus 1/16″ but the direction wheel has been last set for negative movement so that only the start and stop actions are recorded here. The rest of the action follows on the same lines as have already been described and the total spacing movement will be the 1/4″ plus movement required. At the end of the record the space wheel will be set for class one to which B belongs, but as B is the end of the word it is not required, and as described above the operator before starting another word will generally bring the wheel T⁵ to normal.

The space wheel may have a larger number of steps than is required for the classes of the alphabet being used. For example, there may be twelve steps on the wheel T⁵ while the alphabet being used is divided only into seven classes. In this case the space wheel is set round from normal one to seven steps exactly as described above in recording the class of letter. The extra steps are allowed for by adding to the holes for the special take-off 414, four more before the first hole indicated in Figure 54. Thus five holes will cause five steps to the space wheel before class seven is reached and if the wheel has previously been set round seven steps for this class the wheel will now be right round to normal again.

The intermittent action T′, (Figures 51 and 52) in detail comprises a ratchet wheel 417 mounted on spindle 418 and is driven step-wise by the armature 389 of magnet 388 (Figure 46). Said axle carried by bearings 419 on a base 420, also carries a contact wheel 421 which alternately makes and breaks contact with the wipers 422 and 423 attached to the respective circuit leads 379 and 390 of the direction wheel magnets R. Discs 424 of insulating material arranged one on each side of the contact wheel 421 support the wipers when not in contact, and the spring detent 425 not only prevents backward movement of the contact wheel, but also improves the electrical connection between the wheel and the bearings 419 which are fixed on the base 420 of insulating material and forms part of the electric circuit. The above description applies equally to the intermittent movemnet T³ and T⁴ and the centres of the two ratchet wheels thereof being connected by a circuit lead 435. The magnets for the intermittent actions T′, T³ and T⁴ must be insulated from the pawls carried on their armature, and this is effected in the present design by making the pawls themselves of insulating material.

Referring more particularly to Figure 53, this illustrates in detail the switch wheel 376 and the circuit completing device 392. The insulating base member 426 supports a bearing member 427 which carries the spindle 428 of a ratchet wheel 429. The spindle also carries a contact arm 430 adapted to slide successively over the contact studs $t'$ to $t^5$ according to the step-like rotation of the ratchet wheel. The latter is actuated by a pawl 431 carried on the armature 432 of a magnet 433 (Figure 46) which is in circuit by means of lead 434 the second take-off 273ᵃ of the record band and lead 382 with the battery 381. To complete the circuit for any one of the studs, the magnet 436 is energized by a lead 437 from the third take-off 273ᵇ of the record band S, the armature 392 of which carries a vertical arm 438, one end of which carries a fork 439, to engage a lever 440 pivoted at 441 on bracket 427, and weighted at 442. Such lever carries a detent 443 which is normally in engagement with the ratchet wheel 429 thus normally preventing backward rotation of such ratchet wheel. The lower end of the vertical arm carries an insulating button 444 adapted, when the armature 392 is actuated, to press the spring 445 from one circuit lead 393 connected electrically with the spindle 428, into contact with the other circuit 391 from the battery. When the magnet 436 is de-energized, the spring 445 throws the vertical arm upward, and the momentum thereof by means of the fork 439 momentarily raises the detent 443, and the ratchet wheel 429 immediately returns to its normal position by a spring, not shown. The inertia of the weight 442 prevents the detent from falling back too quickly and so checking the ratchet wheel before it has reached its normal position. The pawl 431 carried by the armature 432 rises sufficiently when not in action to be clear of the ratchet wheel. All of the ratchet wheel mechanisms for the intermittent movements are arranged on the right-hand corner of the table 10 as shown in Fig. 2ᵃ.

Record originating.

In order to originate a record band, the machine is, as it were, worked backwards. That is to say, all the parts of the machine are set in motion as in using a record with certain exceptions, but the record is run through in blank, the wipers or take-offs being removed, and punches being used instead to make perforations in the blank record by means of electro-magnets actuating them. Figure 55 is a diagram of the electric circuits used for this alternative use of the machine, the dotted parts being the more important of those already described and the full lines indicate the parts which are added to make a perforated record. Such added parts comprise a set of three punches denoted generally by U to perforate the record band S; a group of punching keys V to control the punches, and a hand operated steering wheel W to adjust the direction wheel N relatively to its contacts. A blunt pointer or tracer is carried by the instrument carriage and this is guided or steered over the design to be recorded by means of the steering wheel, the necessary changes such as are effected by the introduction of intermittent movements being effected by the operator depressing from time to time the several punching keys as is hereinafter fully described.

Referring first to Figures 56 and 57, the steering wheel W is a horizontal wheel carried on a suitable vertical shaft 446 which terminates at its upper end in a crank arm 447. Above this is arranged a two-part crank handle 448 formed of two slotted and screwed members which may be slidably adjusted and locked to obtain the necessary length of handle and permit folding up. One end of the two-part crank handle is fitted with the usual knob and the other is loosely carried on the vertical shaft 446, the movement of the handle being transmitted to the shaft for clockwise or counter-clockwise movement by pins 449 and 450 carried upon the end of the crank arm 447 and projecting upward to engage the sides of the two-part crank handle. These pins are so spaced as to permit a certain amount of free movement to the crank handle 448. The steering wheel periphery is formed with V-shaped teeth 451, equal in number to those on the direction wheel, and said teeth successively engage a single tooth 452 carried by a horizontal lever 453 fulcrumed at 454 by one end, whilst its opposite end forms a contact point 455. As the steering wheel is rotated step by step, each tooth 451 presses the lever 453 outward, so that its contact 455 momentarily strikes against another contact 456 pivoted at 456$^a$ steadied by one end of a spring arm 457, whose other end is rigidly held at 458. Said contact is in the form of an inverted triangle and has a slight oscillating movement around its pivot 456$^a$ against the force of a leaf spring 457 pressing on its base, and tending to retain the contact in vertical or mid-position. The spring is rigidly held to a suitable support at 458, and may be fitted with an adjusting screw if necessary. The contact 456 forms part of a circuit lead 459 from battery 460 (Figure 55) to the direction wheel magnets R which are under the control of the intermittent action T' as before. As the lever swings to the left, (Figure 57) it does not make contact owing to the interposed insulating button 462. As it swings back this button does not interfere with a momentary contact with 456. The circuit thus momentarily completed includes the direction punching magnet 463, and is equivalent to the circuit including the direction take-off previously described.

To ensure the above contact being of sufficient duration to enable the punch to work and yet not be so slow as to cause the band in which the hole is made to be torn by the punch remaining therein, a speed control is provided as shown more particularly in Figures 56 and 57. The lever 453 is connected by link 464 to a connecting rod 465 which in turn is pivoted at 466 to a rocking arm 467 loosely mounted upon a spindle 468 supported by a bearing 469. The spindle carries a ratchet wheel which is driven continuously from a moving part of the machine, in the direction of the arrow, the teeth of which engage a pawl 470 spring mounted on the free end of the rocking arm. In this way the rocking arm 467 cannot move faster in the direction of the arrow than the ratchet wheel and in this way controls the period of contact between 455 and 456. By allowing a small amount of play between the crank handle 448 and the steering wheel the latter is able to clear its teeth quickly and allow the lever 453 to move inwards by the pull of the spring 446$^a$ without constraint.

With the instrument carriage lead screws, the ratio escapement wheels, and the record band, all in operation as described with reference to the tracing of a letter and having the circuits connected up as indicated in Fig. 55, the operator causes the pointer or tracer to follow the desired lines or profiles of the letter or the like of which a record is required. This is effected by moving the steering wheel tooth by tooth and thereby correspondingly moving direction wheel which controls the movement of the pen or the like. When however, a reversal of the movement of the direction wheel is required to effect the desired movement of the pointer, this is not effected by reversing the steering wheel—though for convenience, the steering wheel is reversed—but the operator must depress one of the punching keys, viz., V¹, which operation has the effect of actuating the intermittent motion T¹ and also of actuating the particular punch for recording it on the record band, in the manner hereinafter described. The various other changes required from time to time which are normally effected through the intermittent movement T²—T⁴ are effected by depressing the several keys V²—V⁴ which respectively effects the bringing into operation of the desired intermittent movement and also the requisite punching of the record band, in the manner hereinafter described.

The punching keys.

Referring to Figures 58 to 61, a set of six keys V' to V⁶ inclusive, to give six intermittent actions and record them on the band S, are provided in upstanding relation to a punching frame denoted generally by 471 and carried en bloc with all their co-acting parts on a base 472, which in turn is carried on a suitable part of the table but which is not shown. All of the keys are provided with means for automatically controlling their rate of make and brake. Each key is carried on a stem 473 which slides in slots 474 and 475 respectively provided in plates 476 and 477. The lower end of the stem is rounded and bears on a plate 478 of insulating material common to all the stems and carried by a pair of arms 479 which project from, and are keyed or otherwise secured to a shaft 480. Said shaft also carries two contact arms 481 and 482 oppositely arranged to the arms 479, and of these contact arms 481 is at its end toothed to make successive contact with a spring 483 which is of the rectangular form shown, and secured by its lower end at 484 to a post 485 secured to the base 472. Screws 486 and 487 serve to adjust the spring to make contact at the proper point and for the proper period. This pair of contacts 481 and 483 are actuated when any of the keys are depressed, but each key can be depressed to a different extent by means of stop pins 488 set at relatively different positions in the stems, so that by means of the teeth on the contact 481 each key will give a number of impulses depending upon the number of teeth passing the contact spring 483, both in the downward and upward direction.

The arm 482 has at its free end a contact point 489, and an insulating button 490 and as it moves upward it makes contact with the triangular contact 491, pivoted at 492 and maintained in normal central position by a spring 493 acting on base of the triangle. On the return or downward stroke the insulating button 490 intervenes to prevent contact being made. To regulate the speed of movement of the parts a continuously rotating ratchet wheel 494 on shaft 494ª is used as with the steering wheel, the rocking arm being actuated by a crank arm 495 mounted on shaft 480, through a connecting rod 496, but the rocking arm and its pawl are duplicated at 180° apart so that both the up and down movements are controlled. It will be necessary for the operator to promptly relieve his pressure on the key as soon as the stop pin comes against the plate 476, so as to allow the key and the co-acting parts to return by means of the spring 496ª which is secured to the base 472 at one end and to the arm 495 at the other. The contacts 481 and 483 control the magnet for punching the holes which normally control the selection of the intermittent motion while the contacts 489 and 491 control the magnet for punching the holes which normally control the completion of the intermittent motion circuit.

The various stems of the keys are "boxed" in an open sided frame, top and and bottom of which is comprised by the guide plates 476 and 477, whilst one long side is formed by an insulating plate 497, the other long side being bridged by an insulated bar 498. A number of spring tongues 499 on the bridge are at one end in circuit with the battery 381, whilst their other ends are each bent to form a nose 500 to slide against the corresponding stem to maintain electrical connection and engage a notch 501 therein when the key is in its uppermost position to retain it in such position. On the other side of each stem is a notch 502, which serves to make and break contact with the free ends of spring tongues 503, the other ends of which are all clamped upon the top edge of which insulating plate 497 and by means of circuit leads 504 to 507 are in connection with the various intermittent actions T' to T⁴. T⁵ is not connected in recording; it only requires to be punched without being actuated.

Record perforating punches.

Referring to Figures 62 to 64, the punching magnets denoted generally by the letter U are supported by a base plate 508 perforated for the punches and can be mounted as a self-contained unit which bridges the two frame members 13 of the record band mechanism (Figure 2) and is secured in position over the record band S upon shoulder pieces 509 and there secured by milled headed screws 510. In the space between the shoulder pieces are arranged the end supports 511 for the punching plate 516. This just touches the record band which passes over it, and is pierced with a series of sets of hole, three holes 514, 515 and 516 being in each set and such holes having the same position relative to each other as the punches 525, 526 and 527 operated respectively by the magnets 519, 520 and 521.

The position of these punches, and consequently of the holes, is such as to effect the punching of the record band in three longitudinal lines as indicated in Fig. 54a. The record band moves forward in the direction indicated by the arrow in Fig. 62 and the punches 525, 526, and 527, respectively punch the line of holes on the left, on the right and in the centre. As will be seen from Fig. 62, the punches 525 and 526, and consequently the holes 514 and 515, are arranged in line at right angles to the direction of movement of the record band. The third punch 527 is set forward of the punch 526, relatively to the direction of travel of the record band, so as to allow of the full complement of four holes in the centre line of the record for bringing into operation the intermittent action T⁵ as previously described, in front of the hole punched by the punch 526. This is necessary since the said hole is for the purpose of completing the intermittent motion circuit whose selection is controlled by the aforesaid holes in the centre line, and therefore must not be brought into operation until all the associated holes in the centre line have passed by the take-off 273a.

Upon the base plate 508 there is adjustably arranged the magnet supporting plate 512, the under surface of which carries projecting pins 513 which engage one line of perforations 576 so as to correctly align the plate 512 with the punches which are carried thereby directly about the corresponding set of holes in the plate 508. The said magnet plate 512 is adjustably secured to the base plate 508 by milled headed screws 517 threaded into the plate 512 and having expanding clamping heads 518 taking against the lower surface of the base plate. This adjustable connection allows of the plate being moved relatively to the base plate 508 in a direction at right angles to that of the movement of the record band so that the punches may be positioned for punching the holes for different letters of the alphabet on the record band side by side.

Vertically arranged on the plate 512 are three electro-magnets 519, 520, 521 the hinged armatures of which 522, 523, 524 by means of a small knuckle joint carry at their free ends the punches 525, 526, 527 which extend downwardly through the plates 508 and 512. In addition to the usual armature lifting springs, the armatures are also each influenced by a somewhat stronger leaf spring 528, only one of which is shown. These stronger springs bear against the armature bobbins and only act through a minute distance to quickly disengage the various punches from the holes in the punching plate where they are likely to jam. Close beside each magnet is a post 529, the upper end carrying a turn button 530, which when it overlaps the corresponding armature prevents it rising too far. When it is desired to bodily shift the magnet plate 512 to a new position, the buttons are turned outward to allow the armatures to rise sufficiently for the lower ends of the punches to clear the guide holes in the base plate.

Referring to Figures 55 and 58, the key V' carries on its stem a contact plate 529 insulated from the stem, which in the upper position of the key connects two wipers 530 and 531, attached to circuit leads 532 and 533a, the former of which is in circuit with the switch magnet 520, whilst the latter 533 extends to the contact 483. When the key V' is depressed, the contacts 530 and 531 are cut out, and the key completes a circuit through lead 504 to actuate the magnet for intermittent action T', lead 532a, battery 381, lead 535, and contact spring 499 back to the key. Also the arm 482 completes a circuit through contact 491, lead 533, circuit completing magnet 521, lead 537, battery 381, leads 535 and 534 back to arm 482 thus effecting the operation of punch 527.

Upon depressing key V², the first of the teeth on the arm 481 gives a single impulse through the spring contact 483, lead 533a, wiper 531, contact plate 529, wiper 530a, lead 532 to the switch magnet 520 actuating punch 526 and thence through the lead 537, battery 381, and leads 525 and 534 back to contact 483. At the same time the arm 482 gives an impulse through contact 491, lead 533, circuit completing magnet 521, actuating punch 527, and thence through the lead 537, battery 381, and leads 535 and 534 back to contact 483. Also a circuit is completed through wiper 503, lead 505, intermittent acting magnet T² for lifting the pen, lead 532a, battery 381, lead 535, and wiper 499 back to the key.

When key V³ is depressed the toothed contact arm 481 gives two impulses through the magnet 520 thereby causing punch 526 to punch two perforations, arm 482 gives an impulse through magnet 521 thus actuating punch 527, and the circuit through intermittent acting magnet T³ is completed.

When key V⁴ is depressed punch 526 is operated three times by means of the toothed contact arm 481, punch 527 is operated by means of arm 482, and the circuit through intermittent acting magnet T⁴ is completed.

Key V⁵ corresponds to the intermittent acting device T⁵ which normally controls the spacing between the letters. As the object however, of this intermittent device is only to cut out of action one or more sections of the spacing controlling perforations at the beginning of a record (according to the classes of the two letters which are adjacent each other) the intermittent acting device has no direct control over the movement of the pen and there is consequently no necessity of its being actuated during the originating of a record. At the end of a record therefore where the perforations which control the setting of $T^5$ should occur, $V^5$ is actuated a number of times in accordance with the class of the letter for which the record has just been made.

Each operation of $V^5$ actuates the toothed contact arm 481 so as to effect the operation of the punch 526 four times and also actuates the contact arm 482 so as to effect a single operation of punch 527.

The punching of the perforations at the beginning of the record are effected in accordance with the diagram illustrated in Fig. 54. Suppose for instance, the record for letter B is being originated. The marking implement has to be caused to move backwards $\frac{1}{4}''$ as indicated in the first square under column B, therefore the steering wheel is moved through 180°, thus operating punch 519 in the manner previously described, and also setting the direction wheel for moving the marking implement in a negative direction. Key $V^3$ is then actuated punching the record band in the manner previously described and starting the movement of the marking implement. After this has moved $\frac{1}{4}''$ the key $V^3$ is again actuated thus perforating the record band and stopping the pen. The next movement of the pen has to be in a positive direction therefore at the beginning of the next section on the record band the steering wheel is again moved through 180° thus perforating the record band and setting the direction wheel. Key $V^3$ is again actuated punching the record band and starting the movement of the marking implement. After the implement has moved through a distance of $\frac{1}{16}''$, the distance indicated in the second square of column B of said diagram, the key $V^3$ is again actuated with the consequent results. The further actuations of the steering wheel and key $V^3$ are then continued in accordance with the diagram until the holes have been punched in all the seven sections. When these have been completed, the marking implement will be back at starting point since the distance which the pen travels according to the first compartment is equal but opposite to the combined distances according to the remaining compartments. It is then positioned for commencing the tracing of letter B preferably by actuation of key 539 (Fig. 55) which effects a movement of the pen independently of the record band in the manner hereinafter described.

If desired however, since the pen is in the same position at the beginning and end of the punching of the preliminary spacing perforations, the positioning of the pen for the tracing of letter B may be effected before punching such perforations.

In many cases such as when it is desired to move the pen from one letter to another when originating records as previously mentioned or when it is desired to bring the pen into position for commencing work, it is convenient to be able to cause a movement of the pen independently of the record band. For this purpose the key 539 (Fig. 55) is provided. This key, though illustrated on the diagram giving the electric circuits for controlling the perforating punches is adapted to close the circuit through the escapement magnets and thus obviate the necessity of the movement of $T^3$ into its "starting" position which is normally effected by the record band. The circuit is as follows:—

Battery 381, lead 380, key 539, lead 380ª, ratio wheels L, direction wheel N (Fig. 46) escapement magnets K and lead 385 back to the battery.

An alternative method would be to provide a handle for $T^3$ so that it could be moved to the "starting" position independently of the record band.

If the direction wheel is set by hand for the correct direction of movement of the pen, then, by operating key 539, or turning $T^5$ by hand to its "starting" position, the pen can be moved into the position desired. When the required movement has been made the key 539 is moved to its break position or $T^5$ is moved to its stop position.

The key 539 is normally kept in its break position by means of a spring 540, and for the convenience of setting the direction wheel by hand, the latter is preferably provided with a dial showing the direction of movement of the pen for any setting of such wheel.

Reducing and enlarging.

From the description already given of the escapement cones, it will be understood that for similar running distances of the record band, the various escapement wheels 15 will rotate the lead screws a greater or lesser amount, and therefore from the same record a larger or smaller drawing may be made. The numbers of teeth on the various wheels vary from forty to fifty-six and the levers of the escapement can be adjusted opposite any one of the wheels and there fixed, so that one revolution of the escapement cone shaft can be made the result of any number of oscillations of the escapement from forty to fifty-six. As the extent of movement of the primary motions is proportional to the revolution of their respective escapement wheels, it follows with a reduction of the drawing, that the same number of oscillations can be made to give a motion varying in the proportion of $\frac{1}{40}$ to $\frac{1}{56}$ or 1 to $\frac{5}{7}$ approximately. The number of oscillations of the escapement that occurs for a given movement of the record depends on the gearing of the latter with the ratio wheels. For this purpose the change speed gear train 224—238 (Figure 4) as already described, is provided so that the number of oscillations is reduced proportionately from $\frac{1}{1}$ to $\frac{5}{7}$. The effect therefore secured by using the original gearing and the escapement wheel of fifty-six teeth can be also produced by using the wheel with forty teeth and altering the gearing as described. The remainder of the escapement wheels are now available to still further reduce the drawing, nearly by one-half and further gearing can be introduced for still further reduction, the whole forming the system of obtaining a series of reductions by small steps without undue multiplication of wheels and susceptible of simple manipulation. The proportions above referred to are those it is preferred to use, but they may be varied as desired.

The above reduction applies both to the width and the height of the letter, numeral or other form, but it may be desirable to decrease either relatively to the other. If relative reduction of width is required, the gear train 43, 44, 46, 20 and 21 is used, as already described in connection with Figure 4. B this means a graduation of proportions from $\frac{1}{1}$ to $\frac{5}{7}$ can always be secured. Greater reduction of width will generally introduce undesirable distortion of the letters so that for narrower letters another record should be provided.

The sets of wheels 234, 236; the set 228, 230, 231; and 224, 226 give the different reductions of $\frac{1}{1}$, $\frac{5}{7}$, $\frac{1}{2}$, and $\frac{5}{14}$ and this with the $\frac{5}{7}$ reduction by escapement wheels gives a range to nearly one-fourth. The relative sizes of the wheels of the above three groups are: for the first, six and seven; for the second, six, five and eight; and for the third, six and four.

General.

In the case of a letter or numeral which has a small inner curved corner such as 538 (Figure 45ª) caused by the thickness on a corner, if this requires to be square this may be filled in by hand. In general a letter with acute angled corners cannot be drawn without leaving some additions to be made by hand unless drawn in a fine line or unless special arrangements are made involving additional intermittent actions. The above applies to open letters drawn with a thick pen.

When a letter or numeral is to show up light on a darker background, the pen should be turned as by disengaging, turning and replacing the fork pins 360 (Figure 23) through 180° from the usual position so that the thickness lies on the outside of the recorded shape. In drawing for a coloured background to a letter, the shape should overlap the edge of the letter. For this purpose it is useful to have a pen turning centrally so that the thickness is drawn on each side of the recorded shape.

Various other adjustments are possible with the machine. For instance, the work may be drawn on its side instead of vertical, and this may be effected by advancing the direction wheel 90° before commencing work. Or if it is necessary to reverse the drawing or engraving, as when drawing direct on the printing stone or plate, the operator may change the direction of movement of the direction wheel at the start by depressing once the armature of the magnet of the intermittent action T' after which every indication on the record of reversing direction will have the opposite effect. From this it will be obvious that care must be taken that the direction wheel, all the intermittent actions and so forth are all in their right position at the start.

By having an auxiliary ratchet wheel attached to each ratchet wheel of the intermittent motions, such auxiliary ratchet wheel having half as many teeth as the other, a key can be arranged to move the auxiliary ratchet wheel so that the motion may be definitely set at the correct position for starting.

Fig. 52ª shows such an arrangement after the controlling key has been operated to correctly position the motion.

The auxiliary ratchet wheel 417ª has half as many teeth as the main ratchet wheel 417. Suitably disposed adjacent the ratchet wheels, is a press key 417ᵇ adapted to be held in its raised position clear of the teeth of the ratchet wheel 417ª by a spring 417ᶜ. The lower end of the key is shaped so as to engage with the teeth of the ratchet wheel 417ª, and the downward movement of the key is limited by the shoulder 417ᵈ on the key engaging with the bearing member 417ᵉ. As has been previously described, the intermittent motions are such that each is alternatively moved from one to the other of two positions by single steps forward of the ratchet wheel 417, the correct starting position being one of such two positions. The key 417ᵇ is so arranged that when the motion is in its correct starting position as shown in the drawing, a downward movement of the key will not engage with a tooth of the ratchet wheel 417ᵃ until it reaches the bottom limit of its movement, and therefore will not effect any movement of the wheel. If the motion is not in its correct starting position, the ratchet wheel 417 will be one tooth in advance of the position shown in Fig. 52ᵃ and will require one step forward to move the motion into its correct starting position. The ratchet wheel 417ᵃ will be half a tooth in advance of the position shown in the drawing and a tooth thereof will be in the line of movement of the press key 417ᵇ. On the operation of the key the end thereof will engage with the said tooth and the ratchet wheel 417ᵃ will be carried forward the distance of half a tooth in the position shown in the drawing and the motion will be correctly positioned for starting.

Consequently by effecting a single operation of press key 417ᵇ the operator will know that the associated intermittent motion is correctly positioned for starting whether actual movement of the ratchet wheel 417 has occurred or not. For the machine to give accuracy in result, the run of the record must have the same relation each time it is used, not only to the speed of the ratio wheels but also to its position, that is, if the record is made with its starting point when a certain part of the ratio wheels is passing the wipers, this must always be the case each time it is used. This is provided for by making the record reel revolve at the same rate as the ratio drum and the clutch 250, 251, Fig. 29 is arranged with only one engaging position, this applying when the normal transmission or running gear is in action. Where strict accuracy is important the change speed gear can be placed between the escapements and the lead screws.

If a general alphabet record is used, the capitals and small letters are recorded on the same band, the capitals following the small letters so that the operator can pass easily from one to the other.

If desired, the rows of perforations in the record band which control the movement of the instrument carriage may be replaced by equivalent devices; for instance a record band made of this metal or the like may be provided with embossed projections which are adapted to actuate co-acting spring arms or the like which at each actuation close an electric circuit. In such an arrangement the contacting surface of the spring arms would be suitably insulated. As another alternative method a record band of strong paper or the like could be provided with metal studs preferably in the form of small rivets and these may be adapted to co-act with wipers as previously described or with spring arms of suitable switches as aforementioned. Also the record band may be of metal provided with spots or projections of insulating material adapted to intermittently break subsidiary circuits and thereby close the actuating circuits.

Record bands of any of these types could be originated by the method hereinbefore described by a suitable modification of the punches 525, 526 and 527 and their associated mechanisms.

What I claim is:—

1. A drawing or engraving machine, comprising in combination, a work support, a marking implement, lead screws which are adapted to co-operate and move said implement in any desired direction over said support, a plurality of impulse wheels for driving the lead screws independently at variable speeds, and means whereby any two of such wheels are adapted to control the operation of the screws.

2. A drawing or engraving machine, comprising in combination, a work support, a marking implement, escapement driven lead screws adapted to co-operate and move said implement in any desired direction over said support, a plurality of constantly driven variable impulse wheels to control the escapement movement of each lead screw, and means whereby any two of such wheels are selected to permit such lead screws to intermittently and independently rotate at the speeds desired.

3. A drawing or engraving machine, comprising in combination, a work support, a marking implement, escapement driven lead screws adapted to co-operate to move said implement in any desired direction over said support, an electromagnetic controller for each lead screw, circuit leads to each controller, a plurality of make and break contact ratio wheels of variable frequency, circuit leads therefor, a selector for making an electric circuit between each ratio wheel and one of the electromagnetic controllers, and means for rotating the ratio make and break contact wheels, whereby the wheel selected imparts its impulse frequency to the controller.

4. A drawing or engraving machine, comprising in combination, a work support, an implement, escapement driven lead screws adapted to co-operate to move said implement in any desired direction over said support, an electro-magnetic controller for each lead screw, a wiper in electrical circuit with each controller, a group of contact studs for each wiper, a group of make and break contact wheels of variable frequency and corresponding to said stud groups, electrical circuit leads between each contact wheel and stud in each stud group, means for adjusting each wiper so as to close an electric circuit between a contact wheel, a stud, and a controller, and means for rotating the contact wheels.

5. In a drawing or like machine having a selector as claimed in claim 3, the combination therewith of an electro-magnet for operating said selector, an electric circuit for said magnet and a moving record band adapted to intermittently make and break said circuit, whereby as definite points on said band successively reach a determined position, the selector is operated to vary the number of impulses each magnetic controller receives.

6. As a new article of manufacture, a member having a lithographic drawing surface, an implement for marking said surface, a moving record band, and electrical means whereby said implement is controlled in its movements by the said moving record.

7. A machine of the character described, comprising a work support, a marking implement, escapement driven lead screws for actuating said implement and moving same over said support, an electrical controller for each screw, a rotary selector, independent electric leads extending from each controller to the selector, two groups of contact studs, means on the selector to make independent contact with one stud of each group at a time, a group of ratio impulse wheels of variable frequency and corresponding to said stud groups, electrical circuit leads between each contact wheel and stud, an electro-magnet for stepwise operating the selector, an electric circuit for said magnet, and a moving record band adapted to intermittently make and break said circuit, so that as definite points on the band successively reach a determined position, the selector is operated one step to electrically connect another pair of ratio make and break wheels with the electromagnetic controllers, for the purpose described.

8. A machine of the character described, comprising a work support, a marking implement, escapement driven lead screws for actuating said implement and moving same over said support, an electrical controller for each screw, electrical means to allow each controller to intermittently stop and release the escapement driven lead screws at a determined frequency, and means to progressively change the frequency whereby the marking implement may draw a series of lines having a constant angular difference, the said series forming an approximation to a curved line.

9. A machine of the character described, comprising a work support, a marking implement, escapement driven lead screws for actuating said implement and for moving same over said support, an electrical controller for each screw, a rotary selector, a circuit lead from each controller both in permanent independent connection with the selector, two groups of contact studs, a group of make and break contact ratio wheels of different frequencies, a circuit lead connecting each stud with each ratio wheel, means on the selector for simultaneously completing two circuits each including an electric controller, a contact stud and a ratio wheel, means for rotating the group of ratio wheels, means for stepwise rotating the selector to successively change the value of the studs and ratio wheels which are in circuit, whereby the approximation to a circle will be drawn on the working surface, and means whereby the screws are reversed at the proper time to complete the circle.

10. A machine of the character described, comprising the combination with a selector as claimed in claim 9, of a ratchet wheel, two pawls for actuating such wheel in relatively opposite directions, an electromagnet for operating each pawl, an electric circuit for each magnet, means for bringing one of the circuits into operation according to which direction the ratchet wheel is to be turned, and a moving record band which makes and breaks the selected circuit.

11. A machine of the character described, comprising the combination with a selector as claimed in claim 9, of a ratchet wheel, two pawls for actuating such wheel in relatively opposite directions, an electromagnet for operating each pawl, and means for energizing one of the said electromagnets to determine the direction of the line to be drawn.

12. A machine of the character described, comprising a work support, a marking implement, escapement driven lead screws for actuating said implement and moving same over said support, an electrical controller for each screw, electrical means to allow each controller to intermittently stop and release the escapement driven lead screws at a determined frequency, means to change the frequency whereby the marking implement may draw a series of lines approximating to a circle, and automatic means to reverse the rotation of the lead screws as desired.

13. The combination with a machine as claimed in claim 9, of a rotary selector, two groups of contact studs in circuits of varying frequency, a neutral separating member between each group, wipers on the selector to make simultaneous contact with a stud in each group, means for progressively moving the wipers so as to select studs of increasing frequency in one group and studs of decreasing frequency in the other group, means for reversing both of the lead screws, and cams moving with the wipers, which, when one of such wipers is in contact with a stud giving maximum frequency and the other is on said neutral separating member, simultaneously operate one of said reversing means.

14. A drawing or engraving machine comprising in combination, a work support, a marking implement, two lead screws which co-operate in actuating said implement and moving same over said support, spring mechanism for driving each screw, a plurality of graduated escapement wheels for each screw, an oscillatory escapement to control an escapement wheel of each screw, and means for adjusting the escapement opposite any desired escapement wheel for each screw.

15. A drawing or engraving machine comprising in combination, a work support, a marking implement, two lead screws which co-operate in actuating said implement and moving same over said support, spring mechanism for driving each screw, a plurality of graduated escapement wheels for each screw, an oscillatory escapement to control an escapement wheel of each screw, means for varying the speed of oscillation of such escapement, and means for adjusting said escapement opposite any desired escapement wheel for each screw.

16. A drawing or engraving machine, comprising in combination, a work support a marking implement, two lead screws that co-operate in actuating said implement and moving same over said support, spring mechanism for driving each lead screw, a prime mover shaft, clutches through which said prime mover shaft winds up the spring for each screw, means to de-clutch the winding-up action when either of the springs is fully wound, an oscillatory escapement for each screw, and means for controlling such escapement.

17. A drawing or engraving machine, comprising in combination, a work support, a marking implement, two lead screws which co-operate in actuating said implement and moving same over said support, spring mechanism for driving each screw, a plurality of graduated escapement wheels for each screw, an electrical escapement to control each screw, a group of electric make and break contact wheels in circuit with the electrical escapement for each screw to allow it to be intermittently rotated at a desired frequency, a moving record band to change the frequency, and means whereby for the same amount of travel of the record band, the degree of rotation of each lead screw is varied so that the scale of the work produced may be changed.

18. A drawing or engraving machine, comprising in combination, a work support, a marking implement, two spring driven lead screws which co-operate in actuating said implement and moving same over said support, a toothed escapement wheel for each screw, a pivoted escapement lever, a pair of pivoted pawls which alternately engage the teeth of said wheel and each act on respectively opposite sides of the escapement lever pivot, and an electrically operated controller for the escapement lever.

19. The combination with a machine as claimed in claim 18, of a plurality of toothed graduated escapement wheels for each screw, a controller bar extending alongside of each group of escapement wheels, a bearing trunnion for each end of said bar, an escapement lever and pawls arranged between the controller bar and the escapement wheels, means for adjusting said lever and pawls relatively to the controller bar into register with any one of the escapement wheels, and electrical means for oscillating said controller bar.

20. The combination with a machine as claimed in claim 19 of a carriage alongside of the graduated escapement wheels, a pivoted escapement lever and a pair of pivoted pawls supported on said carriage, a rigid bed on which the carriage may be slidden, a channelled controller bar engaging one end of the pivoted escapement lever, a trunnion bearing for each end of the controller bar, and an electro-magnet for oscillating the controller bar.

21. The combination with a machine as claimed in claim 20, of a fixed bed, having a plurality of recesses in the surface thereof, a carriage slidable on said bed, a pair of pivoted pawls on the carriage, and a spring operated locking pin also on the carriage to engage any one of the recesses to retain the carriage in a definite position on the bed, and a lever to release the pin to permit the carriage to slide.

22. The combination with a machine as claimed in claim 21, of a bed, a carriage slidable on the bed, a pair of pivoted pawls and a locking pin on the carriage, pivoted supports for said bed, means for adjusting the bed by its pivotal supports so as to adjust the pawls, and means for swinging the bed and the parts carried thereon away from the escapement wheels.

23. The combination with a machine as claimed in claim 20, of a channelled controller bar, a trunnion support for each end of the bar, an electro-magnet, a pivoted armature therefor of short leverage to permit rapid oscillation, an extension from said armature of longer leverage than the armature, a lug on the controller bar, and a tie rod connected to said lug at one end, and to said extension at the other end.

24. A drawing or engraving machine comprising in combination, a work support, a marking implement, two lead screws adapted to co-operate with and move said implement in any desired direction over said support, escapement mechanism for driving each screw, and a change speed gear interposed between each lead screw and its associated escapement mechanism.

25. A drawing or engraving machine comprising in combination, a work support, a marking implement, two lead screws adapted to co-operate with and move said implement in any desired direction over said support, escapement mechanism for driving each screw, a change speed gear interposed between each lead screw and its associated escapement mechanism, a shaft in each gear adapted to drive each screw, and automatic means for reversing the said shaft.

26. The combination with a machine as claimed in claim 25, of a lead screw, a shaft for driving such screw, a reversing clutch on said shaft, a pull rod and a push rod coupled with said clutch, means whereby when one rod is out of action the other rod is ready to operate, and control mechanism for releasing such other rod.

27. The combination with a machine as claimed in claim 25, of a lead screw, a shaft for driving such screw, a reversing clutch on said shaft, an actuating rod for said clutch, a pull rod and a push rod both coupled with said actuating rod, a hooked end to such pull and push rod, a constantly rotating toothed member above such pull and push rods, means whereby such toothed member moves one of the rods by its hooked end in one direction to actuate the clutch, and means whereby the other rod is moved from an inoperative position to one in which it is ready to operate.

28. A reversing mechanism for a machine as claimed in claim 27, comprising in combination, a base with grooves therein, pull and push rods arranged in said grooves respectively, a spring beneath each rod, a pivoted crosshead extending transversely above the rods, a cam controlled rod for oscillating such crosshead into one of two positions, so as to press one rod down into its groove, and permit the other to rise, a hooked end on each rod, a constantly rotating toothed member above said rods to engage whichever rod is raised, and a clutch actuating rod coupled to both the pull and push rods.

29. The combination with a reversing mechanism, as claimed in claim 28, of a pull and push rod, a hooked oblique end to each rod, a grooved base to receive each rod, and an overhanging stop on said base for said rods to press each down into its groove.

30. A machine of the character described, comprising in combination, a work support, a marking implement, relatively right angled lead screws co-operating to move said implement over said support, an escapement for driving each screw, an electromagnet controlling each escapement, a group of rotating electrical make and break impulse wheels of different frequencies, two groups of contact studs each stud being in electric circuit with a wheel, a neutral separating member of zero value between the two groups of studs, the impulse value of each stud being progressively higher in opposite directions away from the separating member, a rotary selector, and two wipers thereon at a constant distance apart to electrically circuit a stud in each group with its corresponding electromagnet for controlling the escapement, so that a definite proportional frequency ratio will be imparted to such magnets.

31. In a machine as claimed in claim 30, the combination of an insulated base, a centre axle thereon, a rotary selector on said axle, two insulated collector rings on the base, two groups of insulated contacts in the base around the collector wheels, a group of rotating make and break impulse wheels, each wheel being in circuit with an insulated contact, two wipers on the rotary selector, each engaging one of the collector rings, one wiper engaging an insulated contact in one group, while the other engages an insulated contact in the other group, and two lead screw escapement magnets each electrically connected with one of the collector rings.

32. In combination with a machine as claimed in claim 30, a shaft adapted to drive each lead screw, a reversing clutch on said shaft, a cam disc supported on the rotary selector having two cam steps at 180° apart, a pair of reversing levers arranged at 90° apart and the position of each corresponding with that of the zero member between the two groups of studs, and means whereby the actuation of a reversing lever by a cam effects the reversal of its associated lead screw.

33. In a machine as claimed in claim 30, the combination of an insulated base, a centre axle thereon, two insulated collector rings on the base, two groups of insulated contacts in the base, such groups being arranged in a half circle concentric with the collector rings; a group of rotating make and break impulse wheels, each wheel being in circuit with an insulated contact, a rotary selector on the central axle, a pair of contact members at 180° apart for engaging with an insulated contact of one group, another pair of contacts also at 180° apart for engaging an insulated contact of the other group, a contact fitted to each pair of contacts for sliding respectively on the two collector rings, and two lead screw escapement magnets each electrically connected with one of the collector rings.

34. In a machine as claimed in claim 30, the combination of a rotary selector, a ratchet wheel, electrically operated pawls for driving such wheel step by step in either direction, means whereby the step by step movement of the ratchet wheel alters the frequency ratio imparted to the magnets controlling the escapement, a toothed wheel having a number of teeth which are in a determined proportion less than those of the ratchet wheel, and means actuated in conjunction with such toothed wheel so that the magnets controlling the escapement are not energized during some of the step movements of the rotary selector.

35. In a machine as claimed in claim 30, the combination of a rotary selector, a ratchet wheel, electrically operated pawls for driving such wheel step by step in either direction, means whereby the step by step movement of the ratchet wheel alters the frequency ratio imparted to the magnets controlling the escapement, a toothed wheel having a number of teeth which are in a determined proportion less than those of the ratchet wheel, a perforated moving record band, a switch member adapted to be brought into circuit with the impulse wheels and the escapement magnets, means controlled by the record band for bringing the switch member into circuit, a pivoted lever in operative engagement with the toothed wheel, and means whereby the operation of such lever by the toothed wheel effects the opening and closing of the said switch member so that the magnets controlling the escapement are only energized during a definite proportion of the step movements of the rotary selector.

36. In a machine as claimed in claim 30, the combination of a group of rotating electrical make and break impulse wheels, a series of teeth on each wheel the number of teeth differing for each wheel, a wiper mounted adjacent each wheel so as to have sliding contact with the teeth thereof, and an electrical connection between each wiper and one stud of each group of contact studs.

37. In combination with a machine as claimed in claim 36, a holder for each of the wipers, a frame member upon which each holder is mounted, means for insulating the said holders, a pivotal connection between the frame and the machine, and means whereby the frame may be tilted to bodily remove all the wipers from the ratio wheels.

38. In combination with a machine as claimed in claim 3, spring mechanism for driving each lead screw, a prime mover shaft for winding up the spring mechanism for each screw, means to de-clutch the winding up action when either of the springs is fully wound, and means for driving the ratio wheels at such speed that the driving of the lead screws will not overtake the winding up of the spring mechanism.

39. A drawing or engraving machine comprising in combination, a work support, a marking implement, a carriage in which such marking implement is mounted, a frame member on which the carriage is mounted, a transverse lead screw parallel to such frame member, a pair of parallel lead screws at right angles to such frame member, means for driving the transverse and the two parallel lead screws respectively independently and at variable speeds, a driving connection between the parallel lead screws and the frame member so that the frame member may be moved longitudinally of such screws, and a driving connection between the marking implement carriage and the transverse lead screw so that the said carriage may be moved longitudinally of the frame member.

40. In a machine as claimed in claim 39, the combination with the transverse lead screw of a pair of inter-engaging bevel wheels, one of which is mounted on such screw, a drive shaft arranged parallel to the two parallel lead screws, a sleeve on one of the bevel gears, and means whereby such sleeve may slide longitudinally upon said drive shaft and rotate therewith so that the two bevel gears may drive the transverse lead screw from the said drive shaft.

41. In a machine as claimed in claim 39, the combination with the marking implement of a tubular support therefor, and means whereby such tubular support is rotatably mounted in the implement carriage.

42. In a machine as claimed in claim 39, the combination with the marking implement of a tubular support therefor, the centre axis of such support coinciding with one side of the pen, and means whereby such tubular support is rotatably mounted in the implement carriage.

43. In a machine as claimed in claim 39, the combination with the marking implement of a tubular support therefor such support forming a funnel for the supply of ink, and a chute arranged at the upper end of the marking implement such chute communicating with the funnel so that the ink is delivered to the marking implement.

44. In a machine as claimed in claim 30, the combination of a carriage in which the marking implement is mounted, a support for such marking implement rotatably mounted in the carriage, and means whereby such support is intermittently rotated in unison with the rotary selector wheel.

45. In a machine as claimed in claim 30, the combination of a carriage in which the marking implement is mounted, a support for such marking implement rotatably mounted in the carriage, a vertical rod in driving connection with the rotary selector wheel, a substantially horizontal rod, a pivotal driving connection between one end of such horizontal rod and the upper end of the vertical rod, a depending rod, a driving connection between such depending rod and the horizontal rod, a universal joint in the upper portion of such depending rod, and a driving connection between the lower end of such depending rod and the support for the marking implement.

46. In a machine as claimed in claim 30 the combination of a pair of pawls for stepwise actuating of the rotary selector in one or other direction, a pair of electromagnets for actuating the pawls, a moving record band having a plurality of rows of perforations therein, electric circuits for the aforesaid magnets, a wiper connected to the aforesaid circuits, means whereby the wiper is mounted adjacent the record band so as to co-act with one row of perforations, and means whereby, on a perforation passing beneath the wiper, an electric circuit is completed through one of the magnets and the rotary selector thereby moved one step.

47. In a machine as claimed in claim 46, the combination with the perforated record band of an intermittent acting device, means whereby such device is adapted to alternately make and break the circuits to the two rotary selector magnets, an electromagnet adapted to operate such device, an electric circuit for such magnet, a wiper mounted adjacent the record band, so as to co-act with one row of perforations therein, and means whereby on a perforation passing beneath the wiper the electric circuit through the magnet of the intermittent acting device is completed, the intermittent acting device is actuated, and the circuit controlling the rotary selector is connected through the desired rotary selector magnets.

48. In a machine as claimed in claim 47, the combination with a perforated record band of a second intermittent acting device adapted to control the raising and lowering of the marking implement, an electromagnet adjacent the marking implement, means operated by such magnet for raising or lowering the marking implement, an electric circuit for energizing such magnet, a wiper mounted adjacent the record band so as to co-act with one row of perforations therein, and means whereby on a perforation passing beneath the wiper the circuit through the magnet adjacent the marking implement is completed and the marking implement thereby actuated.

49. In a machine as claimed in claim 48, the combination with the magnet adapted to effect the raising and lowering of the marking implement, of means whereby the implement is first lifted into its raised position, is then allowed to drop to an intermediate position in which it just touches the working surface, and means for then pressing it down on to the working surface.

50. In a machine as claimed in claim 49, the combination with the magnet adapted to effect the raising and lowering of the marking implement, of a tubular support for the implement, a flange at the upper end of such support, an armature adapted to be operated by the magnet, a spring controlled lever adapted to engage in turn with the upper and lower surfaces of the flange, a detent for locking such lever in turn in a raised and in an intermediate position, a lever pivoted to the armature, means whereby on the first operation of the armature the spring controlled lever is caused to raise the marking implement, and means whereby on the second operation of the armature the locking detent is operated first to allow the implement to drop into an intermediate position in which it just touches the marking surface, and second to allow the first lever through the intermediary of its spring to press the marking implement on to the working surface.

51. In a machine as claimed in claim 48, the combination with the perforated record band of a third intermittent acting device adapted alternately to make or break a connection in the circuit through the impulse wheels and escapement magnets to start or stop the travelling of the marking implement, an electromagnet adapted to operate such intermittent acting device, an electric circuit for such magnet, a wiper mounted adjacent the record band so as to coact with one row of perforations therein, and means whereby, on a perforation passing beneath the wiper the circuit through the magnet operating the intermittent acting device is completed and the device thereby actuated.

52. In a machine as claimed in claim 51, the combinatiton with the perforated record band of a switch member, a fourth intermittent acting device adapted alternately to put in or cut out of the circuit through the impulse wheels and escapement magnets the said switch member, means associated with such switch member whereby when it is in circuit only a certain proportion of the step movements of the rotary selector effect any actuation of the lead screws, an electromagnet adapted to operate the said intermittent acting device, an electric circuit for such magnet, a wiper mounted adjacent the record band so as to co-act with one row of perforations therein, and means whereby on a perforation passing beneath the wiper the circuit through the magnet operating the intermittent acting device is completed and the said device thereby actuated.

53. In a machine as claimed in claim 52, the combination with the perforated record band of a fifth intermittent acting device adapted to break the circuit through the rotary selector wheel, the impulse wheels, and the escapement magnets, an electromagnet adapted to operate such intermittent acting device, an electric circuit for such magnet, a wiper mounted adjacent the record band so as to co-act with one row of perforations therein, and means whereby, on a perforation passing beneath the wiper, the circuit through the magnet operating the intermittent acting device is completed and the said device thereby actuated.

54. In a machine as claimed in claim 53, the combination with the perforated record band and the intermittent acting devices, of a selector switch, an electromagnet for operating such switch, an electric circuit for such magnet, a wiper in such circuit mounted adjacent the record band and adapted to co-act with a row of perforations therein so that on a perforation passing beneath such wiper the selector switch is actuated for selecting the intermittent acting device which it is desired to bring into operation, and means for closing the circuit of the actuating magnet of the selected intermittent acting device after such selection.

55. In a machine as claimed in claim 53, the combination with the perforated record band and the intermittent acting device, of a selector switch comprising a contact arm and a series of contact studs, electric connections between the contact arm and the electromagnets actuating the intermittent acting devices, electric connections respectively between the contact studs and said magnets, a ratchet wheel adapted to move the contact arm relatively to the contact studs, a pawl for operating such wheel, an electromagnet for operating such pawl, an electric circuit for such magnet, a wiper in such circuit mounted adjacent the record band and adapted to co-act with a row of perforations therein, means whereby the number of consecutive perforations which pass beneath the wiper controls the number of steps which the ratchet wheel is moved, means whereby the movement of such ratchet wheel controls the position of the contact arm relative to the contact studs and thereby selects the desired intermittent acting device, and means for closing the circuit of the magnet of the selected intermittent acting device after such selection.

56. In a machine as claimed in claim 53, the combination with the perforated record band and the intermittent acting devices of a selector switch, an electromagnet for actuating such switch, a circuit for such magnet, a wiper in such circuit mounted adjacent the record band and adapted to co-act with a row of perforations therein, means whereby the number of consecutive perforations which pass beneath the wiper controls the actuation of the selector switch for selecting the desired intermittent acting device, a switch member in the circuits of the magnets actuating the intermittent acting devices, an electromagnet for actuating such switch member, an electric circuit for such magnet, a wiper in such circuit mounted adjacent the record band and adapted to co-act with another row of perforations therein, means whereby a perforation in said other row passes beneath the wiper after the desired intermittent acting device has been selected, and means whereby the passage of such perforation effects the actuation of the said switch member and thus closes the circuit through the magnet actuating the selected intermittent acting device.

57. In a machine as claimed in claim 56, the combination of a ratchet wheel for rotating the selector switch, a detent for engaging such ratchet wheel and preventing backward rotation thereof, means whereby, on the de-energizing of the magnet which operates the switch member for closing the circuit for actuating the selected intermittent acting device, the detent is momentarily disconnected from the ratchet wheel to allow the selector switch to be returned to normal position.

58. In a machine as claimed in claim 56, the combination of a ratchet wheel for rotating the selector switch, a detent normally engaging such ratchet wheel and preventing backward rotation thereof, a pivoted lever connected to such detent, a counter weight on such lever normally tending to press the detent into engagement with the ratchet wheel, a fork member engaging such lever, a connecting member between such fork member and the armature of the magnet which actuates the switch member for closing the circuit which actuates the selected intermittent acting device, and means whereby on the de-energizing of the said magnet the counterweighted lever is thrown upwards so that the inertia thereof will retain the detent in the release position while the selector switch is returning to normal position.

59. In combination with a machine as claimed in claim 30, a record band having a plurality of rows of perforations therein, a rotary selector for controlling primary movements of the marking implement, a plurality of intermittent acting devices for controlling intermittent movements of the marking implement, a selector switch for controlling the selection of the intermittent acting devices, a wiper adapted to co-act with one row of perforations of the record band for controlling the movement of the rotary selector, a second wiper adapted to co-act with a second row of perforations of the record band for controlling the movement of the selector switch, a third wiper adapted to co-act with a third row of perforations of the record band for closing the actuating circuit of the selected intermittent acting device after its selection, a frame for mounting such wipers, and means whereby such frame may be adjusted transversely of the record band.

60. In a machine as claimed in claim 59, the combination of a pivoted arm carrying the wipers, a transverse shaft forming the pivotal support for such arm, means whereby the said arm may be adjusted longitudinally on such shaft, and means whereby the said arm is locked against such longitudinal movement when the wipers are placed in position for co-acting with the perforations of the record band.

61. In a machine as claimed in claim 59, the combination of a pivotal arm for carrying the wipers, a roller carried by such arm and adapted to rest upon the record band to take the weight of the said arm, a transverse shaft for forming the pivotal support for such arm, means whereby such arm may be adjusted longitudinally of such shaft, and means whereby the said arm is locked against such longitudinal movement when the wipers are placed in position for co-acting with the perforations of the record band.

62. In combination with a machine as claimed in claim 30, a perforated record band, a rotary selector for controlling primary movements of the marking implement, a plurality of intermittent acting devices for controlling intermittent movement of the marking implement one of which controls the lifting and lowering of said implement, a rotary switch member for each of the said intermittent acting devices with the exception of the one controlling the lifting and lowering of the marking implement, a ratchet wheel for rotating such rotary switch member, a pawl for actuating such ratchet wheel, an electromagnet for operating such pawl, and means whereby the rotation of the rotary switch member effects the desired change in the circuits of the associated intermittent acting device.

63. In a machine as claimed in claim 1, the combination of a record band adapted to control the operation of the marking implement, a prime mover shaft, change speed mechanism, and means whereby the record band is driven from the prime mover shaft through the said change speed mechanism.

64. In a machine as claimed in claim 1, the combination of a record band adapted to control the operation of the marking implement, a prime mover shaft, change speed mechanism, clutch mechanism, a roller for supporting the record band, means for operating the clutch mechanism for driving the said roller through the change speed mechanism from the prime mover shaft, and means whereby such clutch mechanism has only one engaging position.

65. In a machine as claimed in claim 59, the combination of a roller for supporting the record band, driving mechanism for such roller for effecting the unwinding of the record band, clutch mechanism controlling such driving mechanism, a clutch lever for operating such clutch mechanism, means for effecting the re-winding of the record band, means whereby the aforesaid lever cannot be operated to permit of the re-winding of the record band until the wipers are moved into an inoperative position, and means whereby said wipers cannot be moved back to normal position while the re-winding is being effected.

66. A drawing or engraving machine comprising in combination, a work support, a marking implement for marking a surface on a member supported on said support with a series of designs, escapement driven lead screws which are adapted to co-operate and move said implement in any desired direction, a plurality of constantly driven impulse wheels to control the escapement movement of each lead screw, selective means associated with such impulse wheels whereby the lead screws are permitted to intermittently and independently rotate at the speeds desired, means for controlling the movement of the marking implement for effecting the correct marking of the design, and means whereby the spacing between the designs is automatically effected.

67. A drawing or engraving machine comprising in combination, a work support, a marking implement for marking a surface on a member supported on said support with a series of designs, relatively right angled lead screws co-operating to move said implement, an escapement for driving each screw, an electromagnet for controlling each escapement, a group of rotating electrical make and break impulse wheels of different frequencies, two groups of contact studs each stud being in electric circuit with a wheel, a rotary selector for electrically circuiting a stud in each group with its corresponding electromagnet for controlling the escapement and thus imparting the primary movements to the marking implement, a plurality of intermittent acting devices for controlling the intermittent movements of the marking implements, a perforated record band, means whereby a series of perforations in such record band controls the operation of the rotary selector and intermittent acting devices to effect the correct marking of the device, and means whereby a series of perforations in such record band at the beginning and end of the aforesaid series of perforations controls the operation of said rotary selector and intermittent acting devices for effecting the correct spacing between the designs.

68. In a machine as claimed in claim 67, the combination with one of the intermittent acting devices of a wheel adapted to control the spacing between the designs, means whereby the perforations in the record band at the end of the record effect the setting of the said spacing wheel in a definite position corresponding to the class or nature of the design last marked on the working surface, and means whereby the perforations in the record band at the beginning of the record effect the moving of the spacing wheel to its normal position and then effect the movements of the marking implement to obtain the correct spacing between the design last marked on the working surface and the design to be next marked thereon.

69. In a machine as claimed in claim 67, the combination with one of the intermittent acting devices of a wheel adapted to control the spacing between the designs, means whereby the perforations in the record band for controlling the spacing are adapted for use with a definite number of classes of designs so as to effect different spacing between designs of different classes, means whereby the series of perforations at the beginning of the record is adapted to impart to the marking implement a number of separate movements which is one more than the number of classes of designs, means whereby the series of perforations at the end of the record is adapted to set the spacing wheel in a definite position according to the class of design which has been marked on the working surface, and means whereby a certain number of the aforesaid separate movements adapted to be imparted to the marking implement are rendered inoperative in accordance with the position in which such spacing wheel has been set by the previous record so that the correct spacing between the designs is assured.

70. In a machine as claimed in claim 69, the combination of a record band having four rows of perforations, means whereby the first row controls the primary movements of the marking implement, means whereby the second and third rows of perforations control the setting of the spacing wheel, and means whereby the fourth row of perforations controls the movement of the spacing wheel into its normal position.

71. In a machine as claimed in claim 70, the combination with the spacing wheel of a switch member adapted normally to make a connection in the electric circuit which controls the primary movement of the marking implement, means whereby, on the aforesaid spacing wheel being moved out of its normal position such connection will be broken, an auxiliary circuit for effecting the operation of the said spacing wheel for moving it again into its normal position, a second switch member adapted, when the spacing wheel is not in its normal position to make a connection in said auxiliary circuit, and means whereby such second switch is operated to break the connection in such auxiliary circuit when the spacing wheel is moved into its normal position.

72. In a machine as claimed in claim 70, the combination with the spacing wheel of a ratchet wheel attached thereto, an armature and pawl for operating such ratchet wheel, an electromagnet for operating such armature and pawl, an electric circuit for energizing such magnet, means whereby, when the spacing wheel is in its normal position such electric circuit is adapted to be closed through the intermediary of the second and third rows of perforations in the record band, a second electric circuit for said electromagnet and means whereby, when the spacing wheel is not in its normal position, such second electric circuit is adapted to be closed through the intermediary of the fourth row of perforations in the record band.

73. In a machine as claimed in claim 69, the combination of means whereby the separate movements of the marking implement for effecting the desired spacing between two designs may be in a forward or backward direction, means whereby, for effecting a movement of the implement in the backward direction, the rotary selector is rotated through 180, and means whereby after the aforesaid backward movement is effected the rotary selector is brought back to normal.

74. The combination with a machine as claimed in claim 4 of means for originating a record for controlling such machine comprising means for travelling a blank record, punches for perforating such record, a steering wheel, and means whereby the operation of such steering wheel effects the guiding of the marking implement over the design for which the record is to be made.

75. The combination with a machine as claimed in claim 4 of means for originating a record for controlling such machine, comprising means for travelling a blank record, punches for perforating such record, electromagnets for operating such punches, means for energizing such magnets, a steering wheel for guiding the marking implement over the design for which a record is to be made, means whereby such steering wheel may be moved step by step, and that such movement imparts a similar movement to the rotary selector, and means whereby each step by step movement of the steering wheel actuates a punching magnet to perforate the record, thereby recording such movements.

76. The combination with a machine as claimed in claim 59 of means for originating a record for controlling such machine, comprising means for travelling a blank record band, punches for perforating such record band, electromagnets for operating such punches, electric circuits for such magnets, a steering wheel for controlling the rotary selector to effect the correct primary movements of the marking implement for tracing over the design for which a record is to be made, a plurality of press keys each adapted to bring into operation an intermittent acting device when an intermittent movement of the marking implement has to be provided for, means whereby the steering wheel may be moved step by step, and that such movement imparts a similar movement to the rotary selector, means whereby each step by step movement of the steering wheel effects the closing of the electric circuit of one of the punch magnets to operate the associated punch and perforate the record band, and means whereby, when the marking implement has to be operated by an intermittent movement, the operation of a press key brings the necessary intermittent acting device into operation, and also effects the closing of the circuits for operating the necessary punches for perforating the record band in a manner which will normally bring the aforesaid intermittent acting device into operation.

77. In a machine as claimed in claim 76, the combination with the punch keys of a pivotal switch member adapted to be operated by the depression of the said keys, a series of contact teeth on such switch member, a spring contact adapted to make contact with each contact tooth in succession both during the forward and reverse movement of the pivotal switch member, means whereby each contact between the spring contact and a contact tooth is adapted to effect the operation of a punch for perforating the record band, means whereby the operation of the first key will not effect any operation of such punch, means whereby the remaining punch keys may each be depressed a different amount, the amount varying in accordance with the distance of the particular key from the first key, and means whereby the amount of movement of the pivotal switch will vary in accordance with the amount of depression of the punch key, so that the depression of the second key will effect one contact between the aforesaid toothed switch and spring contact, the depression of the third key will effect two contacts and so on.

78. The combination with a machine as claimed in claim 76 of means whereby the speed of making and breaking contact is controlled substantially as described.

79. In a machine as claimed in claim 77, the combination of a second pivotal switch member, a spring contact therefor, means whereby such pivotal switch is operated by the depression of a punch key, means whereby contact between such second switch member and the spring contact is only effected on the return movement of the switch member, and means whereby such contact effects the operation of a different punch for perforating the record band to the one operated by the toothed switch member.

80. In a machine as claimed in claim 76, the combination of a perforated base plate, a perforated punching plate below such base plate, means whereby the record band may travel between such plates, three punches, two of which are arranged side by side at right angles to the direction of movement of the record band and the third is arranged to the side but to the rear of such two punches, electromagnets for operating such punches, a frame member for carrying such punches and electromagnets mounted upon the aforesaid base plate, means whereby the said frame may be adjusted on said base plate transversely of the direction of movement of the record band, and means whereby when the said frame is adjusted the punches will always coincide with holes in the base plate.

81. In a machine as claimed in claim 80, the combination with the punches of armatures controlled by the electromagnets for operating such punches, and means associated with such armatures for quickly returning the punches to normal position to prevent the tearing of the record band.

82. A machine of the character described comprising in combination, a work support, a marking implement, relatively right angled lead screws co-operating to move said implement over said support, an escapement for driving each screw, an electromagnet controlling such escapement, a group of rotating electrical make and break impulse wheels of variable frequencies, two groups of contact studs, each stud being in electric circuit with a wheel, a rotary selector, two wipers thereon at a constant distance apart to electrically circuit a stud in each group with its corresponding electromagnet for controlling the escapement and thereby the primary movement of the marking implement, intermittent acting devices for controlling the intermittent movements of the pen, and means whereby the position at which the rotary selector is placed preliminary to the machine commencing to mark a design, controls the angle at which the work shall be reproduced so that a design may be drawn in its normal position at an angle thereto, or reversed.

83. In a machine as claimed in claim 2, the combination with the impulse wheels thereof, of a driving shaft, a toothed wheel on such shaft for driving the said impulse wheels, and a spring connection between such toothed wheel and the aforesaid driving shaft.

84. In a machine as claimed in claim 7, the combination with the electromagnets controlling the escapement, of means whereby such magnets may be operated independently of the record band and the marking implement thus positioned as desired.

85. The combination with a machine of the character specified for drawing symbols, of spacing means and a plurality of records, each record having a set of perforations at each end, such that, the set of perforations at the rear end of one record co-operates with the set of perforations at the commencing end of the next record to be used, to automatically space the symbol about to be drawn from that already drawn.

86. The combination with a machine of the character specified for drawing symbols, of a drawing implement, means for imparting primary movements to such implement, means for imparting intermittent movements to the said implement, means for controlling the spacing between the symbols, and a plurality of records each having four rows of perforations therein, such that the first row automatically controls the primary movements of the marking implement, the second and third rows co-operate so as to control intermittent movements, and the fourth row of perforations co-operates with some of the perforations of the other rows so as to control the spacing between the symbols.

87. The combination with a machine as claimed in claim 86 of a plurality of record bands each band forming a single record having four rows of perforations therein.

88. The combination with a machine as claimed in claim 86 of a single record band forming a plurality of records each having a series of four rows of perforations therein.

89. The combination with a machine of the character specified for drawing symbols of a series of punches, means for moving a blank record band adjacent such punches, and means for operating such punches so as to originate a record adapted to operate the machine to reproduce the symbol desired.

90. The combination with a machine of the character specified for drawing designs, of a marking implement, a series of punches, a blank record, means for moving the blank record adjacent the said punches, means for guiding the marking implement over a design on the working surface of the machine, and means associated therewith for operating the punches so as to originate a record adapted to operate the machine to reproduce the aforesaid design.

91. The combination with a machine of the character specified for drawing designs, of a marking implement, a moving record band, means controlled from such record band whereby the marking implement can be raised or lowered, means also controlled from the band whereby the marking implement may be rotated on its axis, and band controlled means for causing the marking implement to travel on the marking surface in any desired direction.

92. The combination with a machine of the character specified for marking designs, of a work support, a marking implement, two lead screws which co-operate in travelling said marking implement over the said support, a prime mover shaft, spring mechanism for driving each screw from said prime mover shaft, a plurality of graduated escapement wheels for each screw, an electrically operated escapement to control each screw, a group of electric make and break contact wheels for controlling the frequency of the intermittent movement of the escapement, a moving record band for controlling the operation of the machine, change speed gear for driving said record band from the prime mover shaft, means whereby the two electrically operated escapements may be adjusted opposite corresponding escapement wheels of their respective groups so as to alter the scale at which the design is marked on the working surface, and means whereby the change speed gear between the record band and the prime mover shaft can be operated so as also to alter the scale at which the design is marked on the working surface.

93. The combination with a machine of the character specified for marking designs, of a work support, a marking implement, two lead screws which co-operate in travelling said marking implement over the work support, spring mechanism for driving each screw, a plurality of graduated escapement wheels for each screw, an electrically operated escapement to control each screw, a group of electrically operated make and break contact wheels for controlling the frequency of the intermittent movement of the escapement, a moving record band for controlling the operation of the machine, and means whereby the two electrically operated escapements may be adjusted opposite escapement wheels of different sizes in their respective groups so that the height and breadth of the symbols to be reproduced may be altered relatively to each other as desired.

In testimony whereof I have signed my name to this specification.

WALTER WILKINS.